US011437921B2

(12) United States Patent
Sakakibara

(10) Patent No.: US 11,437,921 B2
(45) Date of Patent: Sep. 6, 2022

(54) DIRECT POWER CONVERTER AND CONTROL DEVICE TO IMPROVE AN INPUT POWER FACTOR

(71) Applicant: DAIKIN INDUSTRIES, LTD., Osaka (JP)

(72) Inventor: Kenichi Sakakibara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/279,931

(22) PCT Filed: Sep. 20, 2019

(86) PCT No.: PCT/JP2019/036885
§ 371 (c)(1),
(2) Date: Mar. 25, 2021

(87) PCT Pub. No.: WO2020/066867
PCT Pub. Date: Apr. 2, 2020

(65) Prior Publication Data
US 2021/0313903 A1 Oct. 7, 2021

(30) Foreign Application Priority Data

Sep. 27, 2018 (JP) .............................. JP2018-181940
Sep. 27, 2018 (JP) .............................. JP2018-182108

(51) Int. Cl.
*H02M 5/458* (2006.01)
*H02M 1/42* (2007.01)
(Continued)

(52) U.S. Cl.
CPC ......... *H02M 5/458* (2013.01); *H02M 1/4225* (2013.01); *H02M 7/219* (2013.01); *H02M 7/48* (2013.01)

(58) Field of Classification Search
CPC ........ H02M 1/12; H02M 1/42; H02M 1/4208; H02M 1/4225; H02M 5/458; H02M 5/40;
(Continued)

(56) References Cited

U.S. PATENT DOCUMENTS 6,198,240 B1    3/2001 Notohara et al.
6,556,462 B1 *  4/2003 Steigerwald .......... H02M 5/458
                                                                                                 363/89
(Continued)

FOREIGN PATENT DOCUMENTS

EP    2 908 422 A1    8/2015
JP    2003-189689 A   7/2003
(Continued)

OTHER PUBLICATIONS

International Search Report issued in PCT/JP2019/036885 (PCT/ISA/210), dated Nov. 19, 2019.
(Continued)

*Primary Examiner* — Gustavo A Rosario-Benitez
(74) *Attorney, Agent, or Firm* — Birch, Stewart, Kolasch & Birch, LLP

(57) ABSTRACT

A direct power converter includes a converter that rectifies a single-phase AC voltage, converts AC power into DC power, and outputs first instantaneous power; a power buffer circuit that receives and supplies power between the converter and a DC link and that performs buffering second instantaneous power; and an inverter that converts a DC voltage at the DC link into a second AC voltage and outputs the second AC voltage. A period for which a current that flows from the converter to the power buffer circuit continuously flows in a period shorter than a half-period of the AC voltage is longer when third power input to the inverter, fourth power output by the inverter, or an average value of the first instantaneous power decreases to a value which is
(Continued)

less than a first threshold, from a value which is greater than or equal to a second threshold that is greater than or equal to the first threshold.

12 Claims, 34 Drawing Sheets

(51) Int. Cl.
*H02M 7/219* (2006.01)
*H02M 7/48* (2007.01)

(58) Field of Classification Search
CPC ............ H02M 5/42; H02M 5/44; H02M 5/45; H02M 5/451; H02M 5/452; H02M 5/453
See application file for complete search history.

(56) References Cited

U.S. PATENT DOCUMENTS

| | | | |
|---|---|---|---|
| 9,906,156 B2 | 2/2018 | Sakakibara | |
| 10,804,811 B2 | 10/2020 | Sakakibara | |
| 2011/0228573 A1 | 9/2011 | Yoshida | |
| 2015/0236606 A1* | 8/2015 | Sakakibara | H02M 5/458 363/37 |
| 2015/0280601 A1* | 10/2015 | Sakakibara | H02M 1/12 363/37 |
| 2016/0126742 A1* | 5/2016 | Ayai | H02M 3/158 307/82 |
| 2016/0268890 A1* | 9/2016 | Ayai | H02M 7/48 |
| 2016/0294300 A1* | 10/2016 | Sakakibara | H02M 7/48 |
| 2017/0201202 A1* | 7/2017 | Yamashita | H02P 27/08 |
| 2017/0229978 A1* | 8/2017 | Ayai | H02M 7/48 |
| 2017/0279372 A1* | 9/2017 | Sakakibara | H02M 5/458 |
| 2017/0310235 A1* | 10/2017 | Sakakibara | H02M 1/15 |
| 2017/0324348 A1* | 11/2017 | Yamashita | H02M 1/4266 |
| 2019/0044428 A1* | 2/2019 | Okumura | H02J 3/383 |
| 2019/0222135 A1 | 7/2019 | Sakakibara | |
| 2019/0312521 A1* | 10/2019 | Cao | H02M 5/4585 |
| 2021/0155100 A1* | 5/2021 | Khaligh | H02M 7/797 |

FOREIGN PATENT DOCUMENTS

| | | |
|---|---|---|
| JP | 2010-136492 A | 6/2010 |
| JP | 5874800 B1 | 3/2016 |
| JP | 2016-082680 A | 5/2016 |
| JP | 6265297 B1 | 1/2018 |
| JP | 2018-61422 A | 4/2018 |
| WO | WO 2018/062261 A1 | 4/2018 |

OTHER PUBLICATIONS

Uesgi et al., "Single-Phase Twice voltage PFC Converter for air conditioner", IEEJ Transaction on Industry Applications, 1999, vol. 119-D, No. 5, pp. 592-598.

International Preliminary Report on Patentability and Written Opinion of the International Searching Authority for International Application No. PCT/JP2019/036885, dated Apr. 8, 2021, with an English translation.

Extended European Search Report dated Jun. 27, 2022 in counterpart European Application No. 19865086.3.

Sridharan Srikanthann et al: "Optimizing variable DC link voltage for an induction motor drive under dynamic conditions", 2015 IEEE Transportation Electrification Conference and Expo (ITEC), IEEE, Jun. 14, 2015, pp. 1-6, XP033180924.

* cited by examiner

F I G. 3 0
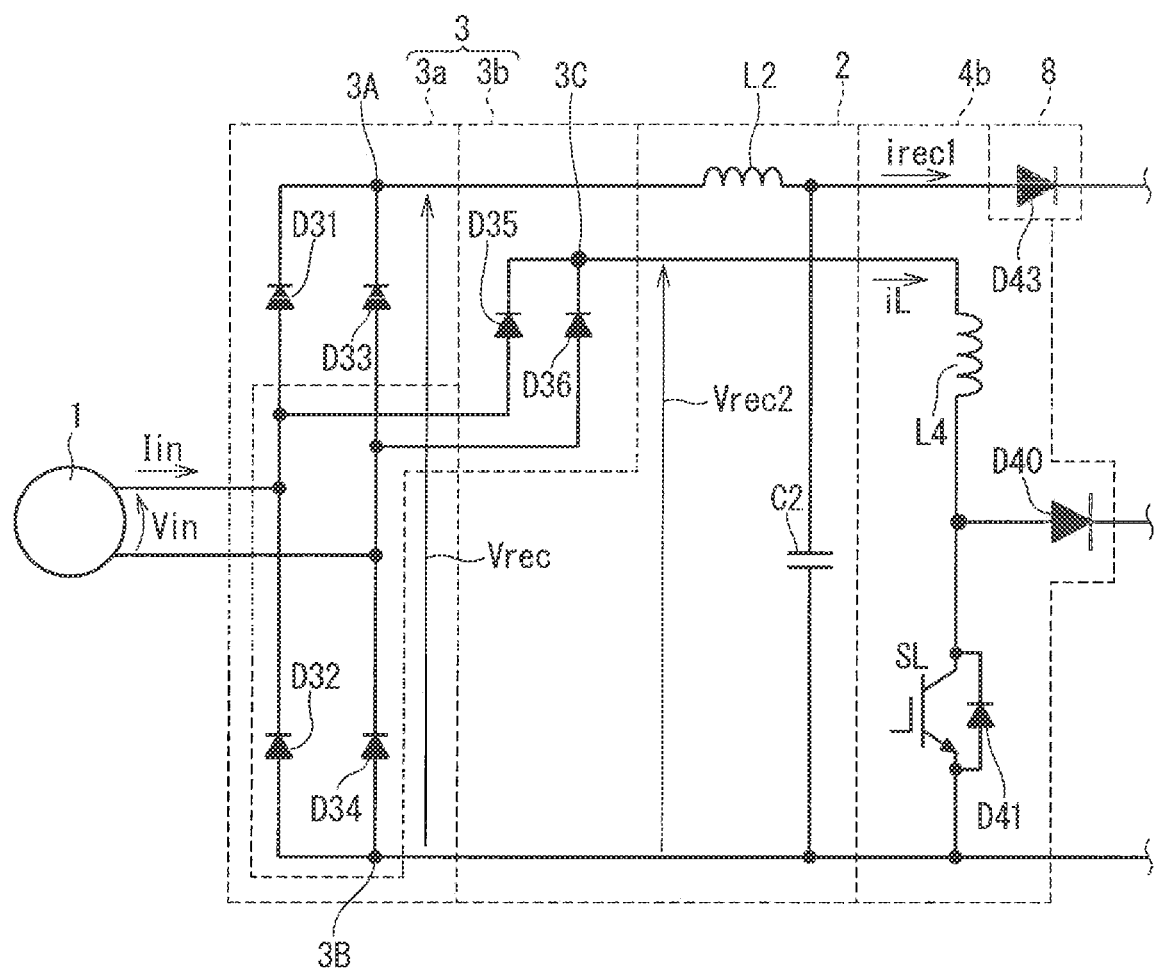

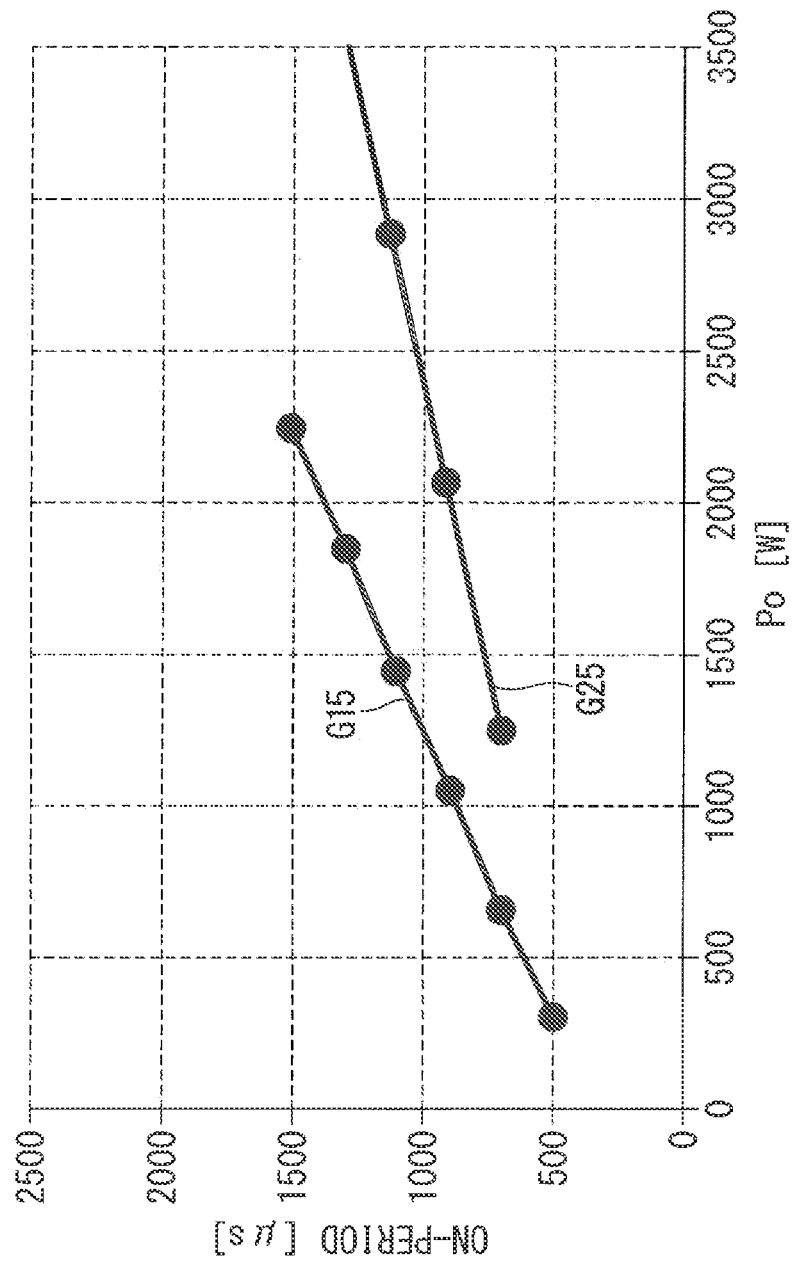
F I G. 38

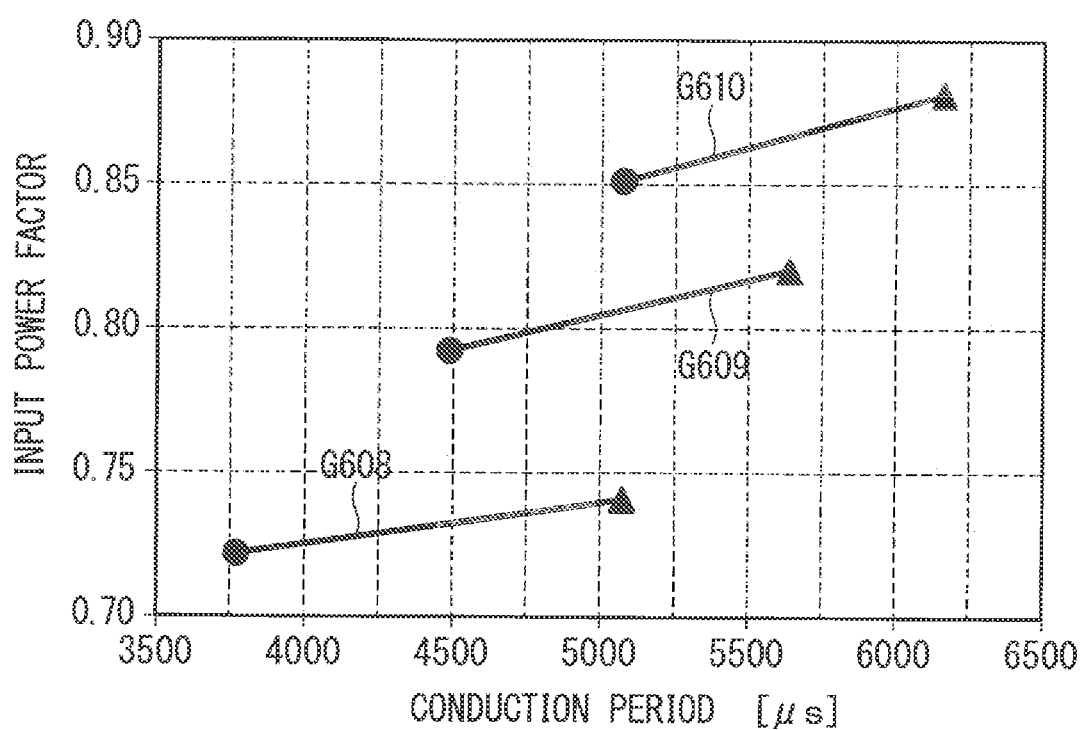
F I G. 47

DIRECT POWER CONVERTER AND CONTROL DEVICE TO IMPROVE AN INPUT POWER FACTOR

TECHNICAL FIELD

The present disclosure relates to a direct power converter and a control device.

BACKGROUND ART

Japanese Patent No. 6265297 discloses a control device for a direct power converter. The direct power converter adopts a power buffer circuit. The power buffer circuit includes a capacitor, a charge circuit that charges the capacitor, and a discharge circuit that causes the capacitor to discharge.

SUMMARY OF INVENTION

Problem to be Solved by the Invention

When a load of the direct power converter is small, a period in which no current is input to the charge circuit increases in a half-period of an AC voltage input to the direct power converter. In such a case, the input power factor of the direct power converter tends to decrease.

The present disclosure proposes a technique of improving an input power factor of a direct power converter in the direct power converter.

Means to Solve the Problem

A first aspect of the present disclosure is a direct power converter (100) including a DC link (7); a converter (3) that rectifies a single-phase AC voltage (Vin), converts AC power into DC power, and outputs first instantaneous power (Pin); a power buffer circuit (4) that receives and supplies power between the converter and the DC link and performs buffering with second instantaneous power (Pbuf); and an inverter (5) that converts a DC voltage at the DC link into a second AC voltage and outputs the second AC voltage.

A period for which a current (iL) that flows from the converter to the power buffer circuit continuously flows in a period shorter than a half-period of the AC voltage (Vin) is longer when third power (Pdc) input to the inverter, fourth power (Po) output by the inverter, or an average value (Pi) of the first instantaneous power is less than a first threshold (Pth, ph1) than when the third power, the fourth power, or the average value is greater than or equal to a second threshold (Pth, ph2) that is greater than or equal to the first threshold.

A second aspect of the present disclosure is a control device (10) that controls the direct power converter (100) according to the first aspect. The power buffer circuit includes a capacitor (C4), a charge circuit (4b) that charges the capacitor, and a discharge circuit (4a) including a first switch (Sc) that connects the capacitor to the DC link. The control device 10 includes a discharge control unit (102), and a charge control unit (103).

The discharge control unit outputs a first control signal (SSc) for controlling conduction of the first switch. The charge control unit controls the charge circuit (4b) to charge the capacitor to a voltage (Vc) whose ratio to an amplitude of a rectified voltage (Vrec) output by the converter is equal to a boost ratio ($\alpha$).

The boost ratio set when the third power (Pdc), the fourth power (Po), or the average value (Pi) is less than the first threshold (ph1) is smaller than the boost ratio set when the third power, the fourth power, or the average value is greater than or equal to the second threshold (ph2).

A third aspect of the present disclosure is a control device (10) that controls the direct power converter (100) according to the first aspect. The power buffer circuit includes a capacitor (C4), a charge circuit (4b) that charges the capacitor, and a discharge circuit (4a) including a first switch (Sc) that connects the capacitor to the DC link. The control device includes a discharge control unit (102), and a charge control unit (103).

The discharge control unit outputs a first control signal (SSc) for controlling conduction of the first switch. The charge control unit controls the charge circuit (4b) to charge the capacitor to a voltage (Vc) whose ratio to an amplitude of a rectified voltage (Vrec) output by the converter is equal to a boost ratio ($\alpha$).

The charge circuit (4b) includes a reactor (L4) that accumulates energy in the capacitor (C4), and a second switch (SL) that connects the converter to the reactor and causes the reactor to accumulate energy. The current (iL) that flows from the converter to the power buffer circuit flows through the reactor.

The charge control unit (103) includes a boost ratio setting unit (1032) that selectively outputs two values ($\alpha1$, $\alpha2$) as the boost ratio ($\alpha$) in accordance with a modulation index (ks) of the inverter (5); an on-period calculation unit (1034) that sets an on-period which is a period for which the second switch is in conduction from the boost ratio and from the average value (Pi), the third power (Pdc), or the fourth power (Po); and a pulse generation unit (10B) that outputs a second control signal (SSL) for controlling conduction of the second switch in the on-period. The boost ratio set when the modulation index is less than a third threshold is smaller than the boost ratio set when the modulation index is greater than or equal to a fourth threshold that is greater than or equal to the third threshold.

A fourth aspect of the present disclosure is a control device (10) that controls the direct power converter (100) according to the first aspect. The power buffer circuit includes a capacitor (C4), a charge circuit (4b) that charges the capacitor, and a discharge circuit (4a) including a first switch (Sc) that connects the capacitor to the DC link. The control device includes a discharge control unit (102), and a charge control unit (103).

The discharge control unit outputs a first control signal (SSc) for controlling conduction of the first switch. The charge control unit controls the charge circuit (4b) to charge the capacitor to a voltage (Vc) whose ratio to an amplitude of a rectified voltage (Vrec) output by the converter is equal to a boost ratio ($\alpha$). The boost ratio decreases in response to a decrease in an input power factor (4100) of the direct power converter from a value that is greater than or equal to a predetermined threshold (pfh) to a value that is less than the predetermined threshold.

A fifth aspect of the present disclosure is a control device (10) that controls the direct power converter (100) according to the first aspect. The power buffer circuit includes a first capacitor (C4), a charge circuit (4b) that charges the first capacitor to a predetermined voltage (Vc), and a discharge circuit (4a) including a first switch (Sc) that connects the first capacitor to the DC link. The control device includes a discharge control unit (102) that outputs a first control signal (SSc) for bringing the first switch into conduction at a first duty (dc). A value (d1) of the first duty set when the third power (Pdc), the fourth power (Po), or the average value (Pi) is less than the first threshold (Pth, ph1) is greater than a value (d2) of the first duty set when the third power, the fourth power, or the average value is greater than or equal to the second threshold (Pth, ph2).

A sixth aspect of the present disclosure is the control device according to the fifth aspect, in which the value (d1) of the first duty (dc) set when the third power (Pdc), the fourth power (Po), or the average value (Pi) is less than the first threshold (Pth, ph1) is equal to 1.

A seventh aspect of the present disclosure is the control device according to the sixth aspect, in which when the third power (Pdc), the fourth power (Po), or the average value (Pi) is greater than or equal to the second threshold (Pth, ph2), an average value of instantaneous power (PL) input to the power buffer circuit is half the average value (Pi) of the first instantaneous power (Pin).

An eighth aspect of the present disclosure is the control device according to any one of the fifth aspect to the seventh aspect, in which the first duty set when the modulation index (ks) of the inverter (5) is less than a third threshold is greater than the first duty set when the modulation index (ks) of the inverter (5) is greater than or equal to a fourth threshold that is greater than or equal to the third threshold.

A ninth aspect of the present disclosure is a control device (10) that controls the direct power converter (100) according to the first aspect. The power buffer circuit includes a first capacitor (C4), a charge circuit (4b) that charges the first capacitor to a predetermined voltage (Vc), and a discharge circuit (4a) including a first switch (Sc) that connects the first capacitor to the DC link. The control device includes a discharge control unit (102) that outputs a first control signal (SSc) for bringing the first switch into conduction at a first duty (dc). The first duty increases in response to a decrease in an input power factor (4) of the direct power converter from a value that is greater than or equal to a predetermined threshold ($\xi$th) to a value that is less than the predetermined threshold.

A tenth aspect of the present disclosure is the control device according to any one of the fifth aspect to the ninth aspect, in which the direct power converter (100) further includes a filter (2) including a second capacitor (C2), and a reverse current blocking circuit (8) that is connected between an output side of the filter and the DC link and that blocks a current that flows back from the discharge circuit (4a) to the filter (2). An input side of the filter and an input side of the charge circuit (4b) are connected in parallel with each other on an output side of the converter (3). The charge circuit (4b) includes a reactor (L4) that accumulates energy in the first capacitor (C4), and a second switch (SL) that connects the converter to the reactor and causes the reactor to accumulate energy. The current (iL) that flows from the converter to the power buffer circuit flows through the reactor.

An eleventh aspect of the present disclosure is the control device (10) according to the tenth aspect further including a charge control unit (103).

The charge control unit includes an on-period calculation unit (1034) that sets an on-period which is a period for which the second switch is in conduction, a delay time addition unit (1035) that delays, by a delay amount, a phase at which conduction of the second switch starts relative to a phase at which a rectified voltage (Vrec) output by the converter turns from decrease to increase, and a pulse generation unit (10B) that outputs a second control signal (SSL) for bringing the second switch into conduction in the on-period with delaying by the delay amount. The delay amount is greater than a discharge period of the second capacitor or a reciprocal of a resonance frequency of the filter.

A twelfth aspect of the present disclosure is the control device according to the tenth aspect or the eleventh aspect, in which the converter (3) includes a first diode bridge (3a) that includes a pair of input terminals to which the AC voltage (Vin) is applied and a first pair of output terminals connected to the filter (2) and that performs single-phase full-wave rectification, and a second diode bridge (3b) that includes the pair of output terminals and a second pair of output terminals that supplies the charge circuit with a rectified voltage (Vrec2) obtained through single-phase full-wave rectification of the AC voltage. The first pair of output terminals and the second pair of output terminals are not electrically connected to each other.

A thirteenth aspect of the present disclosure is the control device according to any one of the fifth aspect to the twelfth aspect, in which the predetermined voltage (Vc) set when the third power (Pdc), the fourth power (Po), or the average value (Pi) is less than a fifth threshold is smaller than the predetermined voltage set when the third power, the fourth power, or the average value is greater than or equal to a sixth threshold that is greater than or equal to the fifth threshold.

For example, the control device may further include an inverter control unit (101) that outputs a third control signal (SSup, SSvp, SSwp, SSun, SSvn, SSwn) for controlling an operation of the inverter.

The direct power converter according to the present disclosure improves the input power factor thereof. The control device according to the present disclosure improves the input power factor of the direct power converter.

The objects, features, aspects, and advantages of the present disclosure will become more apparent from the following detailed description and the accompanying drawings.

BRIEF DESCRIPTION OF DRAWINGS

FIG. 30 is a circuit diagram illustrating a configuration of the direct power converter adopted in the second embodiment;

FIG. 38 is a graph illustrating a relationship between the on-period and the power to be converted by the inverter in the second embodiment;

FIG. 47 is a graph illustrating a relationship between the input power factor and the conduction period.

DESCRIPTION OF EMBODIMENTS

[Configuration of Direct Power Converter]

Figure 1:
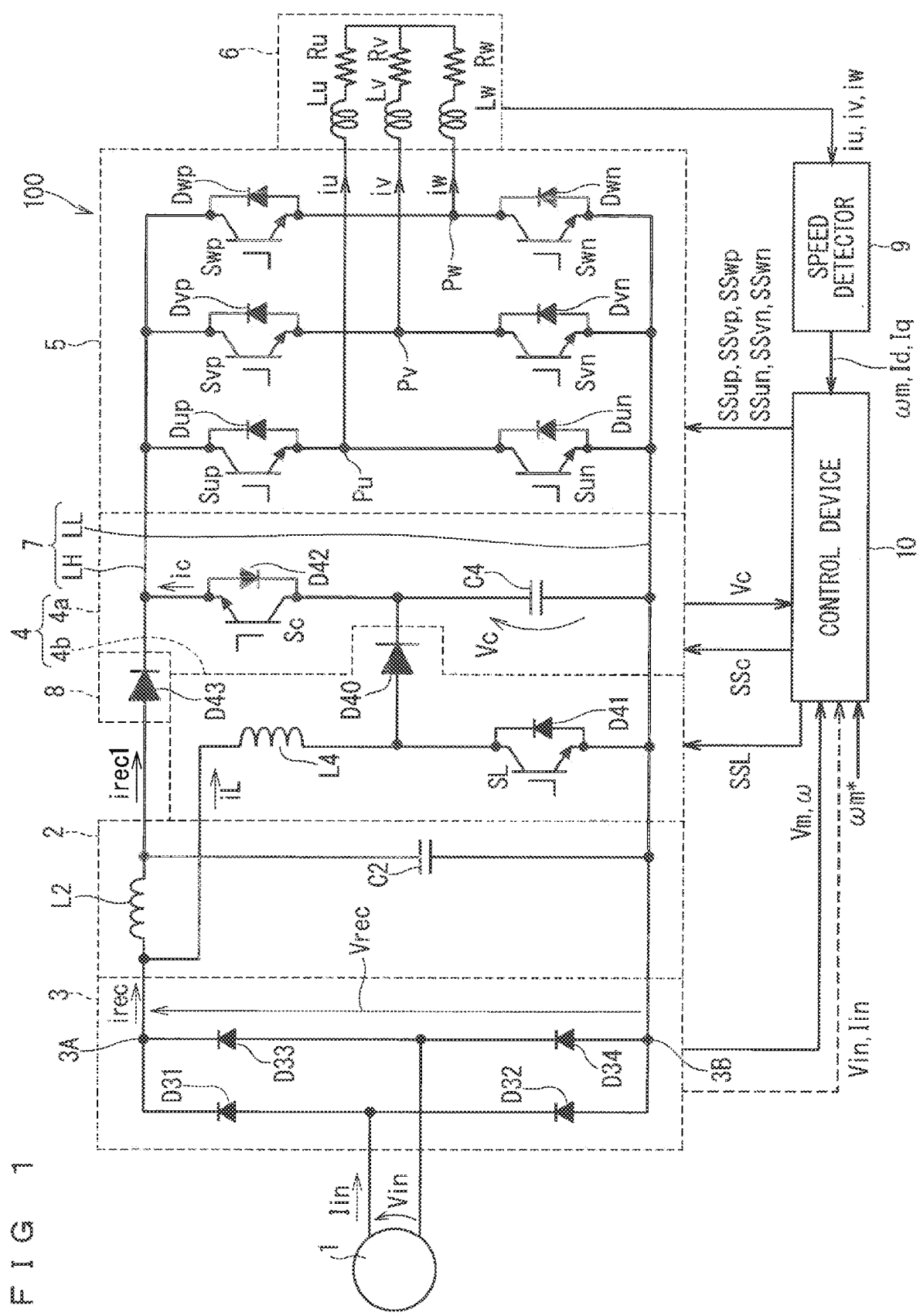
FIG. 1 is a circuit diagram illustrating a configuration of a direct power converter adopted in each embodiment.

FIG. 1 is a circuit diagram illustrating a configuration of a direct power converter 100 adopted in common in embodiments below. Such a configuration is publicly known from, for example, FIG. 1 and FIG. 30 of Japanese Patent No. 6265297.

The direct power converter 100 includes a converter 3, a filter 2, a power buffer circuit 4, an inverter 5, and a DC link 7.

The converter 3 adopts, for example, a diode bridge and includes diodes D31 to D34. The diodes D31 to D34 constitute a bridge circuit. A single-phase AC voltage Vin (=Vm·sin(ωt)) is input to the converter 3 from a single-phase AC power source 1. The converter 3 performs single-phase full-wave rectification on the AC voltage Vin to obtain a rectified voltage Vrec (=|Vin|) and outputs the rectified voltage Vrec to the filter 2 and the power buffer circuit 4.

The filter 2 includes a reactor L2 and a capacitor C2. One end of the reactor L2 is connected to a high-potential terminal 3A on an output side of the converter 3, specifically, to both of a cathode of the diode D31 and a cathode of the diode D33. Another end of the reactor L2 is connected, through the capacitor C2, to a low-potential terminal 3B on an output side of the converter 3, specifically, to both of an anode of the diode D32 and an anode of the diode D34. Thus, in the filter 2, the rectified voltage Vrec is input to series connection of the reactor L2 and the capacitor C2, and a voltage retained by the capacitor C2 is output. Note that the filter 2 functions to remove a high-frequency component of the current. Thus, the voltage retained by the capacitor C2 is also treated to be equal to the rectified voltage Vrec in the description below.

The DC link 7 includes a DC power source line LL and a DC power source line LH which is higher than the DC power source line LL in a potential. The DC power source line LH is connected to the high-potential terminal 3A of the converter 3 through a reverse current blocking circuit 8 (described later) and the reactor L2. The DC power source line LL is connected to the low-potential terminal 3B of the converter 3.

The power buffer circuit 4 includes a discharge circuit 4a and a charge circuit 4b. The power buffer circuit 4 receives and supplies power between the converter 3 and the DC link 7. The discharge circuit 4a includes a capacitor C4 serving as a buffer capacitor. The charge circuit 4b boosts the rectified voltage Vrec and charges the capacitor C4.

The discharge circuit 4a further includes a diode D42 and a transistor (insulated gate bipolar transistor in this case: hereinafter abbreviated as "IGBT") Sc connected in antiparallel with the diode D42. The transistor Sc is connected in series with the capacitor C4 between the DC power source line LH and the DC power source line LL to be closer to the DC power source line LH than the capacitor C4 is.

The antiparallel connection mentioned herein indicates parallel connection with forward directions opposite to each other. Specifically, the forward direction of the transistor Sc is a direction from the DC power source line LL to the DC power source line LH, and the forward direction of the diode D42 is a direction from the DC power source line LH to the DC power source line LL. The transistor Sc and the diode D42 can be collectively regarded as a single switch element (switch Sc). Conduction of the switch Sc causes the capacitor C4 to discharge and provide power to the DC link 7.

The charge circuit 4b includes, for example, a diode D40, a reactor L4, and a transistor (IGBT in this case) SL. The diode D40 has a cathode and an anode. The cathode is connected between the switch Sc and the capacitor C4. Such a configuration is known as a so-called boost chopper.

The reactor L4 is connected between the high-potential terminal 3A and the anode of the diode D40. The transistor SL is connected between the DC power source line LL and the anode of the diode D40. The transistor SL and a diode D41 are connected in antiparallel with each other, and can be collectively regarded as a single switch element (switch SL). Specifically, the forward direction of the transistor SL is a direction from the high-potential terminal 3A to the low-potential terminal 3B, and the forward direction of the diode D41 is a direction from the low-potential terminal 3B to the high-potential terminal 3A.

The capacitor C4 is charged by the charge circuit 4b. A voltage Vc retained by the capacitor C4 is higher than the rectified voltage Vrec. The switch SL conducts to connect the converter 3 to the reactor L4 and to accumulate energy in the reactor L4. Specifically, a current is caused to flow from the high-potential terminal 3A to the low-potential terminal 3B through the switch SL, so that energy is accumulated in the reactor L4. In response to the switch SL being turned off thereafter, the energy is accumulated in the capacitor C4 through the diode D40.

With respective to a phase ($\omega t=0$) at which the rectified voltage Vrec ($=Vm \cdot |\sin(\omega t)|$) has a value of 0, a phase at which conduction of the switch SL starts is referred to as a "conduction start phase" and a phase at which conduction of the switch SL ends is referred to as a "conduction end phase".

Since the voltage Vc is higher than the rectified voltage Vrec, a current does not flow through the diode D42 as a rule. Thus, whether the switch Sc is in conduction or not depends solely on whether the transistor Sc is in conduction or not. Here, the diode D42 ensures a reverse breakdown voltage when the voltage Vc is lower than the rectified voltage Vrec, and brings a current flowing back from an inductive load 6 to the DC link 7 into reverse conduction when the inverter 5 abnormally stops.

Since the forward direction of the diode D41 is a direction from the low-potential terminal 3B to the high-potential terminal 3A, a current does not flow through the diode D41 as a rule. Thus, whether the switch SL is in conduction or not depends solely on whether the transistor SL is in conduction or not. The diode D41 is a diode that provides a reverse breakdown voltage and reverse conduction. Although the diode D41 is illustrated as a diode included in the transistor SL implemented by an IGBT, the diode D41 itself does not involve in operation of the circuit.

The reverse current blocking circuit 8 is provided between the output side of the filter 2 and the DC power source line LH and blocks a current that flows back from the discharge circuit 4a to the filter 2. The reverse current blocking circuit 8 is implemented by, for example, a diode D43. An anode of the diode D43 is connected to the filter 2, more specifically, to the high-potential terminal 3A through the reactor L2. A cathode of the diode D43 is connected to the DC power source line LH.

A current irec1 that is input to the reverse current blocking circuit 8 from the converter 3 through the filter 2 and a current iL that flows from the converter 3 to the power buffer circuit 4, specifically, to the charge circuit 4b, without through the filter 2 are introduced. Then, a current irec output from the converter 3 is a sum of the current irec1 and the current iL.

A current Iin that is input to the converter 3 from the single-phase AC power source 1 is introduced. Then, the current irec is equal to the absolute value of the current Iin. When an input power factor of the direct power converter 100 is controlled to be equal to 1, there can be an expression: Iin=Im·sin($\omega t$).

Since the voltage Vc is higher than the rectified voltage Vrec, the current irec1 takes a value of 0 when the switch Sc is in conduction.

Note that instead of being connected directly to the high-potential terminal 3A, the reactor L4 may be connected through the reactor L2. In such a case, however, not only the current irec1 but also the current iL flows through the filter 2. Thus, a large current-carrying capacity is desired for the filter 2. In other words, from the viewpoint of reducing the current-carrying capacity of the filter 2 and consequently reducing the size of the filter 2, the reactor L4 is desirably connected to a position closer to the converter 3 than the filter 2 is.

The inverter 5 converts a DC voltage in the DC link 7, more specifically, across the DC power source line LH and the DC power source line LL, into an AC voltage and outputs the AC voltage to output terminals Pu, Pv, and Pw. The DC voltage is the voltage Vc when the switch Sc is in conduction. The DC voltage is the rectified voltage Vrec when the switch Sc is not in conduction if a voltage drop at the reverse current blocking circuit 8 and the reactor L2 is ignored.

The inverter 5 is, for example, a three-phase voltage source inverter and includes six switching elements Sup, Svp, Swp, Sun, Svn, and Swn. The switching element Sup is connected between the output terminal Pu and the DC power source line LH. The switching element Svp is connected between the output terminal Pv and the DC power source line LH. The switching element Swp is connected between the output terminal Pw and the DC power source line LH. The switching element Sun is connected between the output terminal Pu and the DC power source line LL. The switching element Svn is connected between the output terminal Pv and the DC power source line LL. The switching element Swn is connected between the output terminal Pw and the DC power source line LL. The inverter 5 constitutes a so-called voltage source inverter and includes six diodes Dup, Dvp, Dwp, Dun, Dvn, and Dwn.

Each of the diodes Dup, Dvp, Dwp, Dun, Dvn, and Dwn is arranged such that a cathode thereof is directed toward the DC power source line LH and an anode thereof is directed toward the DC power source line LL. The diode Dup is connected in parallel with the switching element Sup between the output terminal Pu and the DC power source line LH. Likewise, the diode Dvp is connected in parallel with the switching element Svp, the diode Dwp is connected in parallel with the switching element Swp, the diode Dun is connected in parallel with the switching element Sun, the diode Dvn is connected in parallel with the switching element Svn, and the diode Dwn is connected in parallel with the switching element Swn. A load current iu is output from the output terminal Pu. A load current iv is output from the output terminal Pv. A load current iw is output from the output terminal Pw. The load currents iu, iv, and iw form a three-phase AC current. For example, IGBTs are adopted as all the switching elements Sup, Svp, Swp, Sun, Svn, and Swn.

The inductive load 6 is, for example, a rotary machine, and is illustrated by an equivalent circuit representing an inductive load. Specifically, a reactor Lu and a resistor Ru are connected in series to each other, and one terminal of this series body is connected to the output terminal Pu. The same applies to reactors Lv and Lw and resistors Rv and Rw. Other ends of these series bodies are connected to each other.

A control system is illustrated with the inductive load 6 serving as a synchronous machine. A rotation angular velocity ωm, a q-axis current Iq, a d-axis current Id, information representing a voltage waveform of the AC voltage Vin, for example, an amplitude Vm and an angular velocity ω of the AC voltage Vin (or a phase θ=ωt which is a product of the angular velocity ω and time t), and a command value ωm* of the rotation angular velocity ωm are input to a control device 10.

A case where a speed detector 9 is provided separately from the control device 10 is illustrated here. Since the speed detector 9 is not an element essential to this application, details about reception and supply of signals from and to the speed detector 9 is omitted. FIG. 1 simply indicates that the load currents iu, iv, and iw are input to the speed detector 9 and the rotation angular velocity ωm, the q-axis current Iq, and the d-axis current Id are output from the speed detector 9. Arithmetic processing of the speed detector 9 and arithmetic processing of the control device 10 can be performed in parallel using a microcomputer.

Figure 2:
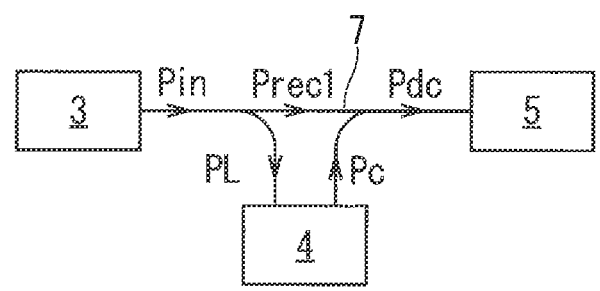
FIG. 2 is a block diagram schematically illustrating power input and output in the direct power converter.

FIG. 2 is a block diagram schematically illustrating power input and output in the direct power converter 100 illustrated in FIG. 1. The single-phase AC power source 1 inputs AC power to the converter 3. The converter 3 converts the AC power into DC power and outputs instantaneous power Pin to the DC link 7 through the reverse current blocking circuit 8 and the power buffer circuit 4. When the input power factor of the converter 3 is set to 1, the instantaneous power Pin is represented by Equation (1).

$$Pin = Vm \cdot Im \cdot \sin^2(\omega t) \quad (1)$$
$$= Vm \cdot Im \cdot \{1 - \cos(2\omega t)\}/2$$

The current iL is input to the charge circuit 4b from the converter 3, and instantaneous power PL (hereinafter, also referred to as "receiving power PL") is input. The current iL flows through the reactor L4. The discharge circuit 4a applies the voltage Vc to the DC link 7 and outputs instantaneous power Pc (hereinafter, also referred to as supply power Pc) to the DC link 7. Thus, the power buffer circuit 4 functions to buffer instantaneous power Pbuf (hereinafter, also referred to as "buffering power Pbuf") which is a power difference (Pc−PL) obtained by subtracting the receiving power PL from the supply power Pc.

Instantaneous power Pdc is input to the inverter 5 from the DC link 7. The instantaneous power Pdc is the sum of instantaneous power Prec1 and the instantaneous power Pc. The instantaneous power Prec1 is instantaneous power obtained by the current irec1 that flows from the converter 3 to the DC link 7 through the filter 2 and the reverse current blocking circuit 8 and by the rectified voltage Vrec. The instantaneous power Pc is instantaneous power obtained by a current ic that flows from the power buffer circuit 4 (more specifically, the discharge circuit 4a) to the DC link 7 and by the voltage Vc. The instantaneous power Pin is the sum of the instantaneous power Prec1 and the instantaneous power PL. The receiving power PL is instantaneous power obtained by the current iL that flows from the converter 3 to the power buffer circuit 4 (more specifically, the charge circuit 4b) and by the rectified voltage Vrec.

Figure 3:
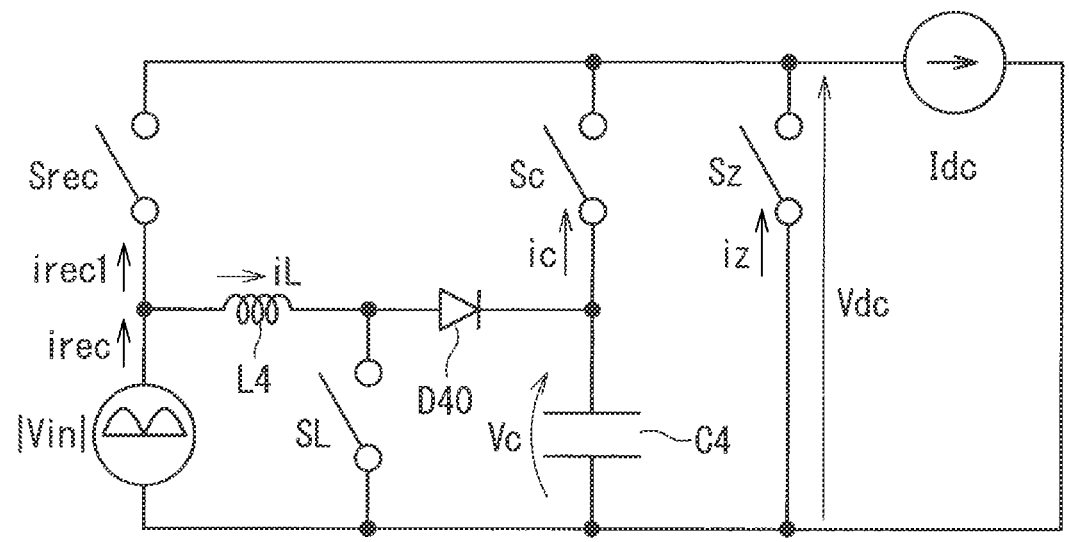
FIG. 3 is a diagram illustrating an equivalent circuit of the direct power converter.

FIG. 3 is a diagram illustrating an equivalent circuit of the direct power converter 100 illustrated in FIG. 1. The equivalent circuit is introduced in Japanese Patent No. 6265297, for example. In the equivalent circuit, the current irec1 is equivalently illustrated as the current irec1 that flows through the switch Srec when the switch Srec is in conduction. Likewise, the current ic is equivalently illustrated as the current ic that flows through the switch Sc when the switch Sc is in conduction.

A current that flows through the inductive load 6 through the inverter 5 when the output terminals Pu, Pv, and Pw of the inverter 5 are connected in common to the DC power source line LH or the DC power source line LL is also equivalently illustrated as a zero-phase current iz that flows through a switch Sz when the switch Sz is in conduction.

FIG. 3 also illustrates the reactor L4, the diode D40, and the switch SL that constitute the charge circuit 4b, and additionally illustrates the current iL that flows through the reactor L4.

In the equivalent circuit thus obtained, a duty drec at which the switch Srec is in conduction, a duty dc at which the switch Sc is in conduction, and a duty dz at which the switch Sz is in conduction are introduced. Note that as is publicly known, for example, from Japanese Patent No. 6265297, 0≤drec≤1, 0≤dc≤1, 0≤dz≤1, and drec+dc+dz=1 hold.

The duty drec is a duty for setting a period in which the converter 3 can cause the current irec1 to flow to the DC link 7. Thus, hereinafter, the duty drec is also referred to as a rectifying duty drec. The duty dc is a duty at which the capacitor C4 discharges. Thus, the duty dc is also referred to as a discharge duty dc. The duty dz is a duty at which the zero-phase current iz flows through the inverter 5 independently from the voltage output by the inverter 5. Thus, the duty dz is also referred to as a zero duty dz.

A DC current Idc is a current that flows through the inductive load 6 through the inverter 5 and can be determined by a publicly known technique (see, for example, Japanese Patent No. 6265297). The current irec1 is a current obtained by multiplying the DC current Idc by the rectifying duty drec. The current ic is a current obtained by multiplying the DC current Idc by the discharge duty dc. The current iz is a current obtained by multiplying the DC current Idc by the zero duty dz. Thus, the current irec1 is an average value in a switching period of the switch Srec. The current ic is an average value in the switching period of the switch Sc. The current iz is an average value in the switching period of the switch Sz. The rectifying duty drec can also be regarded as a current distribution factor of the DC current Idc to the current irec1. The discharge duty dc can also be regarded as a current distribution factor of the DC current Idc to the current ic. The zero duty dz can also be regarded as a current distribution factor of the DC current Idc to the current iz.

When a diode bridge is adopted in the converter 3, the converter 3 is unable to actively perform switching in accordance with the rectifying duty drec. Thus, the inverter 5 performs switching in accordance with the zero duty dz and the switch Sc performs switching in accordance with the discharge duty dc, so that the current irec1 can be obtained.

The rectified voltage Vrec is applied to the DC link 7 by the converter 3 in response to the switch Sc being turned off. The voltage Vc is applied to the DC link 7 by the power buffer circuit 4 in response to the switch Sc being turned on. However, in a period in which the zero-phase current iz flows, the inverter 5 cannot utilize the DC voltage in the DC link 7. Thus, the DC voltage in the DC link 7 utilized in power supply to the inverter 5 has a meaning in power conversion. In other words, instantaneous DC voltage which the inverter 5 does not use in power conversion is meaningless.

In a period corresponding to the zero duty dz, the inverter 5 is insulated from either the DC power source line LL or the DC power source line LH. Thus, the DC voltage Vdc that has a meaning in power conversion can be represented by Equation (2). The DC voltage Vdc can also be regarded as an average value of the maximum value of voltage that can be output by the inverter 5 in a period in which switching of the switch Sc, the switch SL, or the inverter 5 is controlled.

$$Vdc = Vrec \cdot drec + Vc \cdot dc + 0 \cdot dz \qquad (2)$$

The DC voltage Vdc is illustrated in FIG. 3 as a voltage generated across terminals of a current source Idc (the current source Idc causes the DC current Idc to flow) representing the inverter 5 and the inductive load 6. Equation (3) holds.

$$Idc = Pdo/Vdc \qquad (3)$$

Note that when a loss in the inverter 5 is ignored, the instantaneous power Pdc is equal to instantaneous power Pout output by the inverter 5. Thus, the instantaneous power Pdc is represented by Equation (4) when a d-axis voltage Vd and a q-axis voltage Vq are introduced. The d-axis voltage Vd is controlled to follow a d-axis voltage command Vd* which is a command value for the d-axis voltage Vd. The q-axis voltage Vq is controlled to follow a q-axis voltage command Vq* which is a command value for the q-axis voltage Vq.

$$Pdc = Vd \cdot Id + Vq \cdot Iq \qquad (4)$$

The instantaneous power Pin is divided into two, i.e., the instantaneous power Prec1 and the instantaneous power PL. A proportion with which the instantaneous power Pin is divided into two can be appropriately selected. Description will be given below on assumption that the instantaneous power Pin is simply equally divided into two (at this time, the average value of the instantaneous power PL is half the average value of the instantaneous power Pin). In this case, Equation (5) holds in view of Equation (1).

$$\begin{aligned} PL &= Prec1 \\ &= Vm \cdot Im \cdot \sin^2(\omega t)/2 \\ &= Vm \cdot Im \cdot \{1 - \cos(2\omega t)\}/4 \end{aligned} \qquad (5)$$

Accordingly, by setting the instantaneous power Pc in Equation (6), Equation (7) holds. Thus, the instantaneous power Pdc to be converted by the inverter 5 can be handled as the DC power Pdc.

$$Pc = Vm \cdot Im \cdot \{1 + \cos(2\omega t)\}/4 \qquad (6)$$

$$Pdc = Prec1 + Pc = Vm \cdot Im/2 \qquad (7)$$

In this case, the buffering power Pbuf is represented by Equation (8).

$$Pbuf = Pc - PL = Vm \cdot Im \cdot \cos(2\omega t)/2 \qquad (8)$$

The current iL for allowing the receiving power PL to have the value described above can be determined by a publicly known technique, for example, a technique disclosed in Japanese Patent No. 6265297. The current iL is continuous, for example, in a period shorter than a half-period of the AC voltage Vin.

Specifically, the conduction start phase greater than 0 degrees and the conduction end phase less than 180 degrees are adopted. The switch SL is brought out of conduction in a certain phase after the conduction start phase and the switch SL is maintained out of conduction to the phase of 180 degrees. The current iL takes a value of 0 at least in a period from the phase of 0 degrees to the conduction start phase or further in a phase that is greater than the conduction end phase and is less than or equal to 180 degrees. For example, the switch SL may be turned on and off a plurality of times.

First Embodiment

According to, for example, Uesgi and four others, "Single-Phase Twice voltage PFC Converter for air conditioner", IEEJ Transactions on Industry Applications, Vol. 119 No. 5 (1999), in a region equivalent to Vc>Vrec, if the voltage Vc is the same, a power factor of a power-factor improving circuit decreases in response to a decrease in power input to the power-factor improving circuit.

"Single-Phase Twice voltage PFC Converter for air conditioner", IEEJ Transactions on Industry Applications, Vol. 119 No. 5 (1999) indicates that on the other hand, if the power input to the power-factor improving circuit is the same, the power factor of the power-factor improving circuit is improved by decreasing a boosted voltage (decreasing the boosted voltage is implemented by decreasing the conduction end phase).

In the present embodiment, a case is assumed in which the instantaneous power Pin is equally divided into two, i.e., the instantaneous power Prec1 and the instantaneous power PL.

According to the control principle of the present embodiment, the current irec1 in a full-wave rectified waveform flows to the DC power source line LH through the reverse current blocking circuit 8. Thus, a value obtained by converting a conduction period of the reverse current blocking circuit 8 into an input power factor of the direct power converter 100 is equal to 1.

A value obtained by converting a conduction period (or a conduction phase) of the charge circuit 4b into the input power factor of the direct power converter 100 is hereinafter referred to as a "converted power factor". A converted power factor ξ4 and an input power factor ξ100 of the direct power converter 100 in the case where the instantaneous power Pin is equally divided into two, i.e., the instantaneous power Prec1 and the instantaneous power PL are introduced. Then, Equation (9) holds for apparent power.

$$2/\xi 100 = 1/\xi + 1/1 \quad (9)$$

The current irec is obtained through full-wave rectification of the current Iin by the converter 3. Thus, the converted power factor ξ4 is determined by a current (Iin−irec1) (in a period in which the current Iin is positive) or a current (Iin+irec1) (in a period in which the current Iin is negative), and by the AC voltage Vin.

Equation (10) is obtained from Equation (9). Equation (10) indicates that an improvement in the converted power factor ξ4 leads to an improvement in the input power factor ξ100 of the direct power converter 100.

$$\xi 100 = 2/(1/\xi 4 + 1) \quad (10)$$

The present embodiment discloses control for setting, when the power Pdc to be converted by the inverter 5 is small, the voltage Vc to be smaller than the voltage Vc when the power Pdc is large. Such control leads to avoidance of a marked decrease in the converted power factor ξ4, consequently, in the input power factor ξ100 also when the power Pdc is small.

When a loss caused in power conversion in the inverter 5 is ignored, the power Pdc is equal to the DC power input to the inverter 5, is also equal to power Po which is an average value of the instantaneous power Pout, and is also equal to power Pi which is an average value of the instantaneous power Pin. Description will be given using the power Po below.

When the power Po is large, the voltage Vc is increased so as to increase the DC voltage Vdc. In other words, this can be expressed such that a ratio Vdc/Vm (hereinafter, referred to as a "voltage utilization factor R") of the DC voltage Vdc to the amplitude Vm is increased by increasing the voltage Vc.

<Relationship Between Boost Ratio and Input Power Factor and Relationship Between Boost Ratio and Conversion Efficiency>

FIG. 4 to FIG. 7 are examples of graphs obtained in the case where the conduction start phase, which is represented by introducing a coefficient J, is (J×2π+nπ)rad (where J=0.075 and n is an integer). In addition, a rotational speed of a rotary machine in the case where the inductive load 6 serves as the rotary machine is adopted for the horizontal axes of the graphs in FIG. 4 to FIG. 7. Motive power is a product of a rotational speed and a torque. The motive power is directly proportional to power (electric power). For example, when the rotary machine is adopted in an air conditioner, a load torque of the rotary machine is constant. Thus, the rotational speed and the power Po are directly proportional to each other. Description will be given below on assumption that resonance of the filter 2 does not hinder the current iL from flowing.

Figure 4:
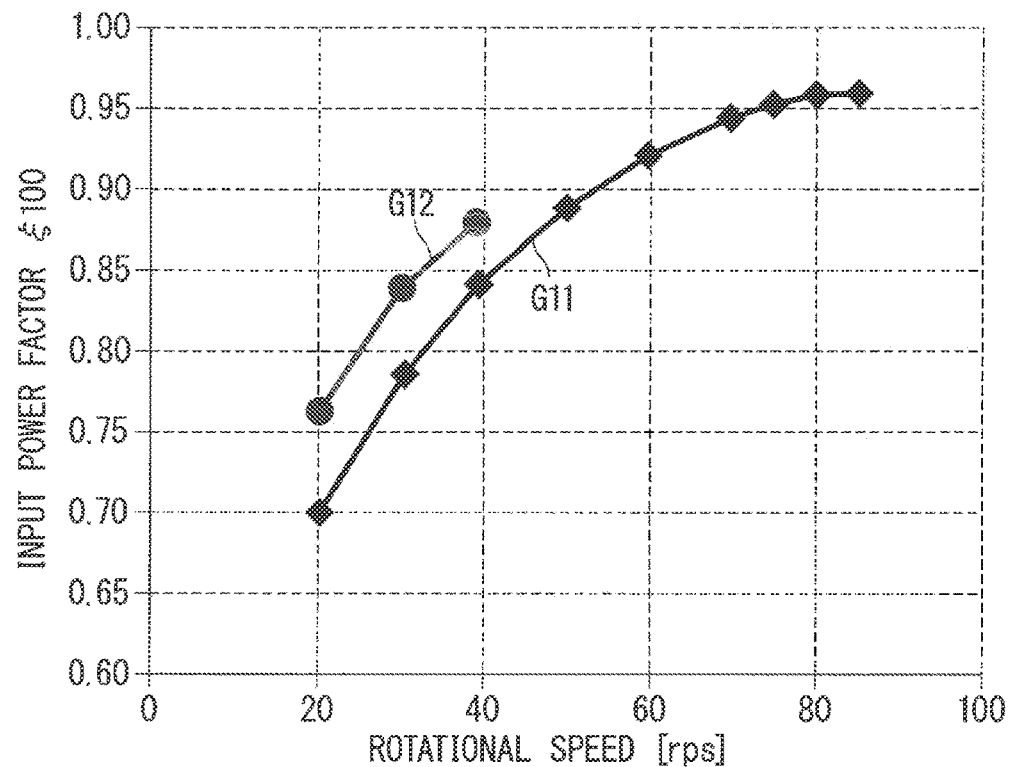
FIG. 4 is a graph illustrating a relationship between a rotational speed and an input power factor of the direct power converter in the first embodiment.

FIG. 4 is a graph illustrating a relationship between the rotational speed of the rotary machine which is the inductive load 6 and the input power factor ξ100 of the direct power converter 100. The power Po is substantially equal to 1400 W when the rotational speed is equal to 40 rps (the same applies to the followings).

A line G11 illustrates a case where the ratio (hereinafter, referred to as a "boost ratio α") of the voltage Vc to the amplitude (the amplitude Vm in this case) of the rectified voltage Vrec is equal to 1.14 independently of the rotational speed. A line G12 illustrates a case where the boost ratio α is equal to 1.05 when the rotational speed is less than 40 rps (specifically, when the rotational speed is greater than or equal to 20 rps and less than or equal to 39 rps). FIG. 4 indicates that the input power factor ξ100 is improved when the voltage Vc is smaller (thus, the boost ratio α is smaller).

Figure 5:
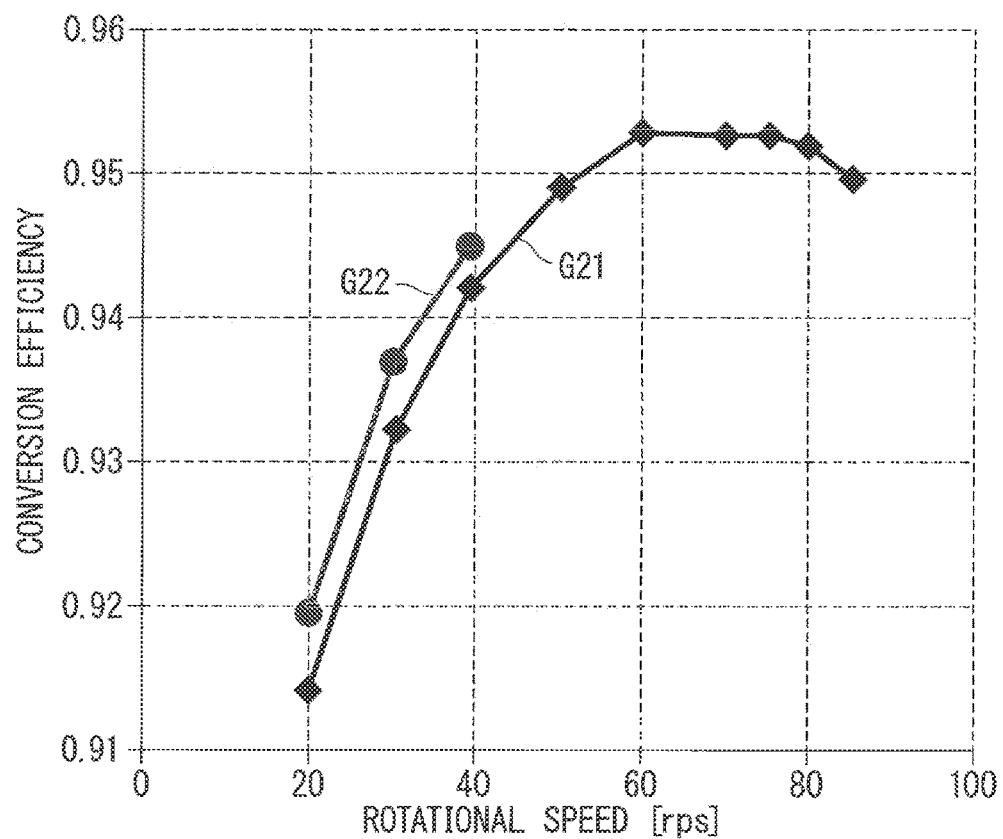
FIG. 5 is a graph illustrating a relationship between a rotational speed and a conversion efficiency of the direct power converter in the first embodiment.

FIG. 5 is a graph illustrating a relationship between the rotational speed and a conversion efficiency of the direct power converter 100. A line G21 illustrates the case where the boost ratio α is equal to 1.14 independently of the rotational speed. A line G22 illustrates the case where the boost ratio α is equal to 1.05 when the rotational speed is less than 40 rps (specifically, when the rotational speed is greater than or equal to 20 rps and less than or equal to 39 rps).

FIG. 5 indicates that the conversion efficiency improves when the voltage Vc is small (thus, the boost ratio α is small). It is considered that such an improvement in conversion efficiency occurs because the input power factor ξ100 of the direct power converter 100 is improved by an increase in the conduction period of the charge circuit 4b and consequently the current Iin decreases.

Figure 6:
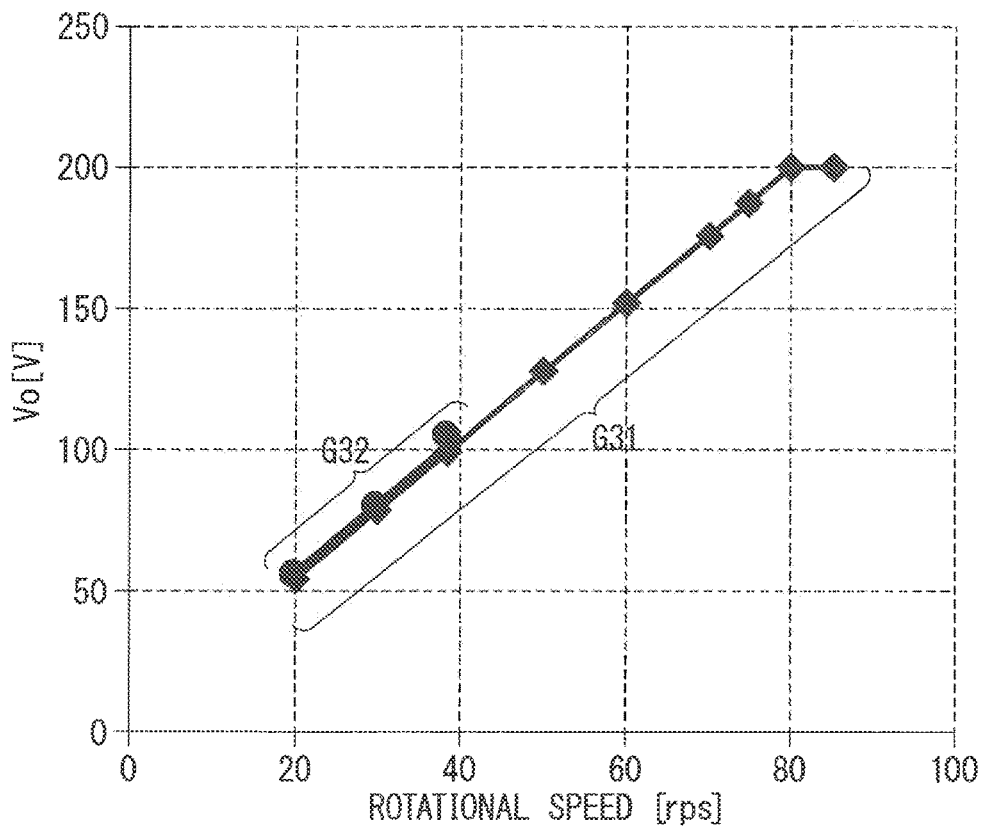
FIG. 6 is a graph illustrating a relationship between the rotational speed and an amplitude of a voltage applied to an inductive load in the first embodiment.
Figure 7:
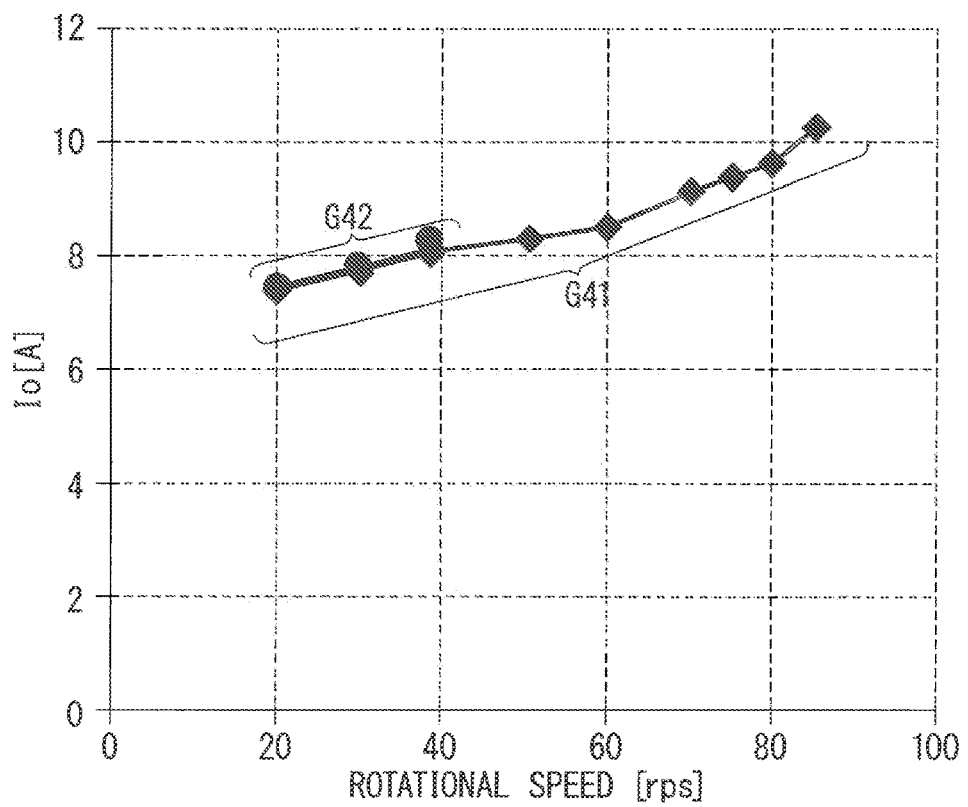
FIG. 7 is a graph illustrating a relationship between the rotational speed and an amplitude of a current that flows through the inductive load in the first embodiment.

FIG. 6 is a graph illustrating a relationship between the rotational speed and an amplitude Vo of a voltage applied to the inductive load 6 (the maximum value of the voltage: hereinafter, referred to as an "output voltage amplitude"). FIG. 7 is a graph illustrating a relationship between the rotational speed and an amplitude Io of a current that flows through the inductive load 6 (the maximum value of the current: hereinafter, referred to as an "output current amplitude").

A line G31 (FIG. 6) and a line G41 (FIG. 7) each illustrate the case where the boost ratio α is equal to 1.14 independently of the rotational speed. A line G32 (FIG. 6) and a line G42 (FIG. 7) each illustrate the case where the boost ratio α is equal to 1.05 when the rotational speed is less than 40 rps (specifically, when the rotational speed is greater than or equal to 20 rps and less than or equal to 39 rps).

The line G32 and the line G31 partially coincide with each other. The line G42 and the line G41 partially coincide with each other. This indicates that neither the voltage applied to the inductive load 6 nor the current supplied to the inductive load 6 is dependent on the voltage Vc. Therefore, an influence of the voltage Vc on the output characteristics of the inverter 5 is small.

FIG. 8 to FIG. 11 are graphs obtained in the case where the coefficient J is equal to 0.125, and respectively correspond to FIG. 4 to FIG. 7.

Figure 8:
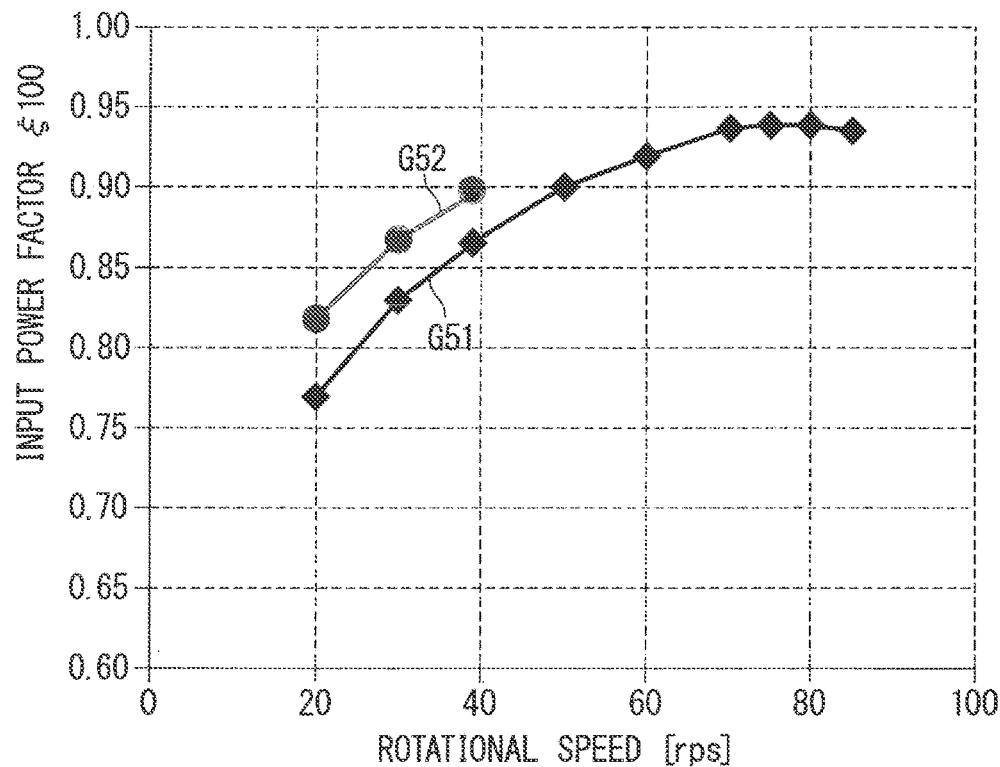
FIG. 8 is a graph illustrating a relationship between the rotational speed and an input power factor of the direct power converter in the first embodiment.

FIG. 8 is a graph illustrating a relationship between the rotational speed and the input power factor ξ100. A line G51 illustrates the case where the boost ratio α is equal to 1.14 independently of the rotational speed. A line G52 illustrates the case where the boost ratio α is equal to 1.05 when the rotational speed is less than 40 rps (specifically, when the rotational speed is greater than or equal to 20 rps and less than or equal to 39 rps). FIG. 8 indicates that the input power factor ξ100 is improved when the voltage Vc is smaller (thus, the boost ratio α is smaller).

It is understood from comparison between FIG. 4 and FIG. 8, specifically, comparison between the lines G11 and G51 and comparison between the lines G12 and G52 that the input power factor ξ100 is improved at a larger conduction start phase angle if the boost ratio α is the same and if the rotational speed is the same (if the power Po is the same).

Figure 9:
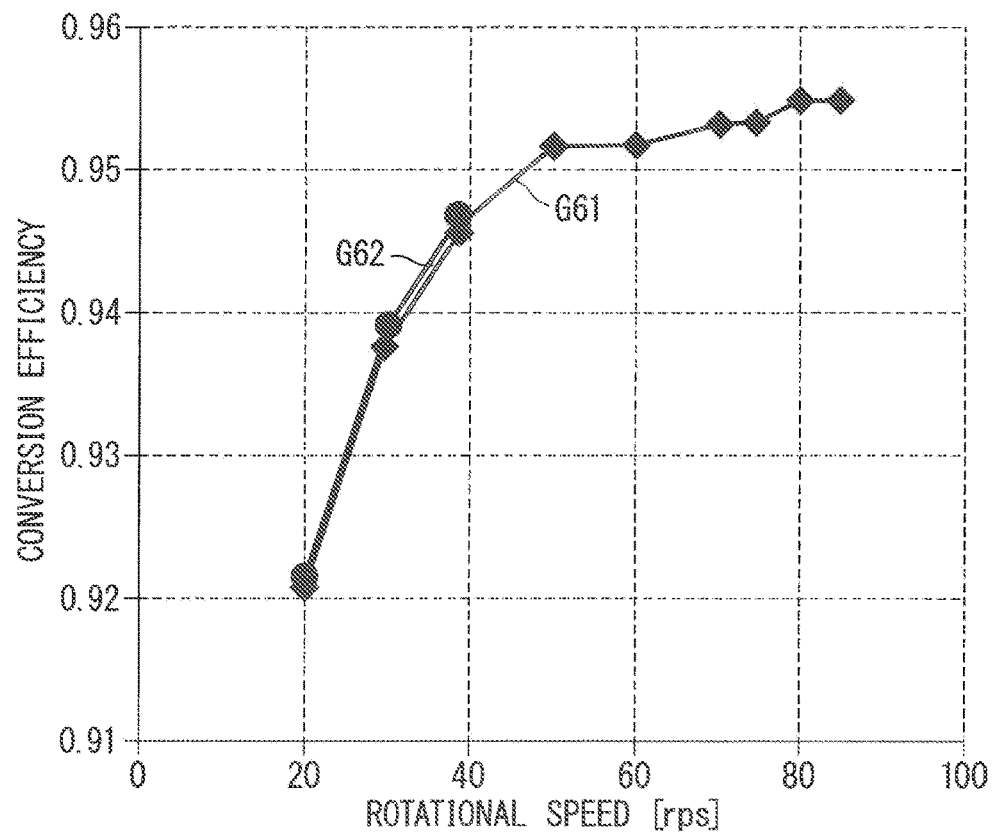
FIG. 9 is a graph illustrating a relationship between a rotational speed and a conversion efficiency of the direct power converter in the first embodiment.

FIG. 9 is a graph illustrating a relationship between the rotational speed and the conversion efficiency of the direct power converter 100. A line G61 illustrates the case where the boost ratio α is equal to 1.14 independently of the rotational speed. A line G62 illustrates the case where the boost ratio α is equal to 1.05 when the rotational speed is less than 40 rps (specifically, when the rotational speed is greater than or equal to 20 rps and less than or equal to 39 rps). FIG. 9 indicates that the conversion efficiency does not decrease when the voltage Vc is small (thus, the boost ratio α is small).

Figure 10:
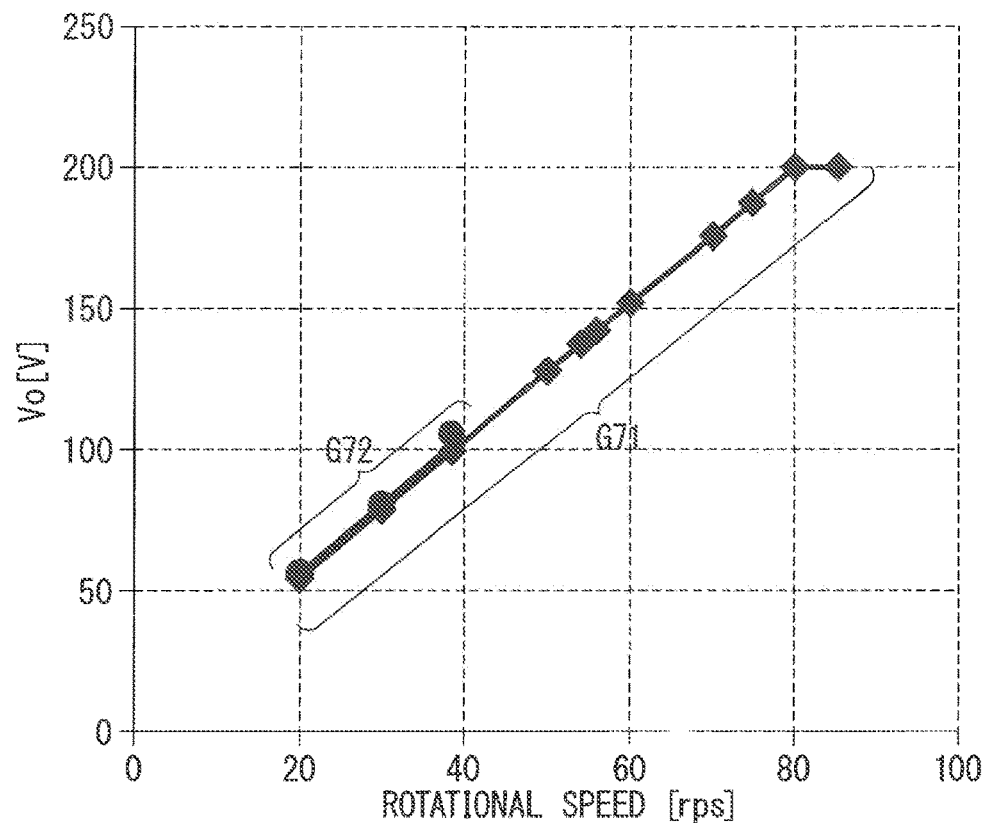
FIG. 10 is a graph illustrating a relationship between a rotational speed and an output voltage amplitude in the first embodiment.
Figure 11:
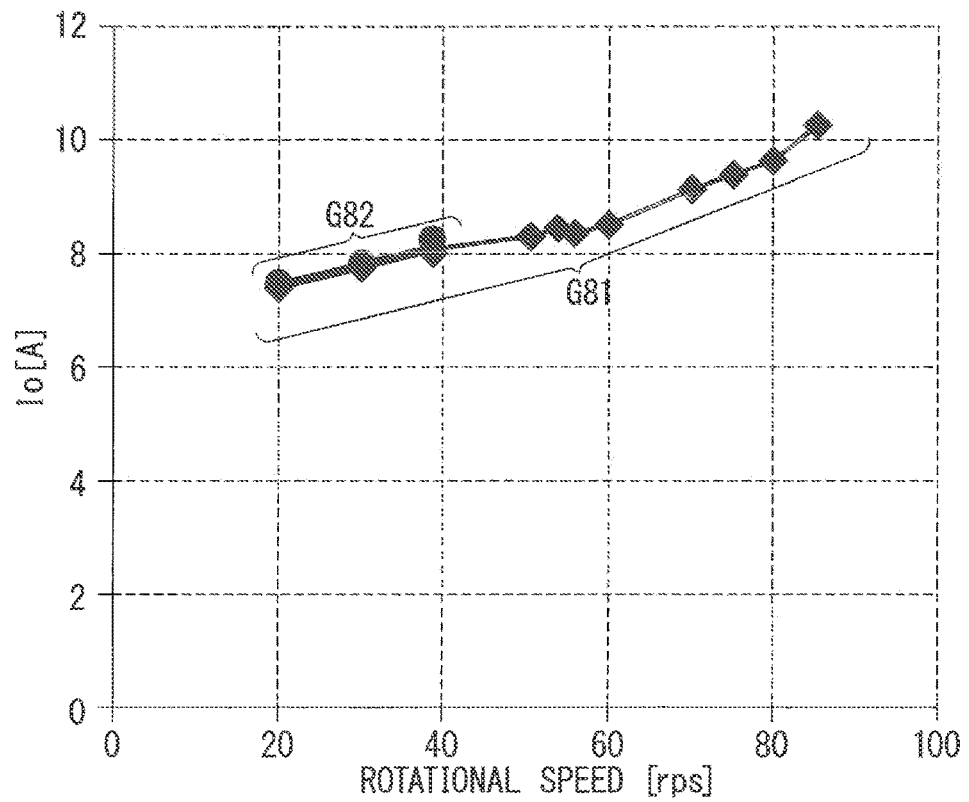
FIG. 11 is a graph illustrating a relationship between a rotational speed and an output current amplitude in the first embodiment.

FIG. 10 is a graph illustrating a relationship between the rotational speed and the output voltage amplitude Vo. FIG. 11 is a graph illustrating a relationship between the rotational speed and the output current amplitude Io. A line G71 (FIG. 10) and a line G81 (FIG. 11) each illustrate the case where the boost ratio α is equal to 1.14 independently of the rotational speed. A line G72 (FIG. 10) and a line G82 (FIG. 11) each illustrate the case where the boost ratio α is equal to 1.05 when the rotational speed is less than 40 rps (specifically, when the rotational speed is greater than or equal to 20 rps and less than or equal to 39 rps).

The line G72 and the line G71 partially coincide with each other. The line G82 and the line G81 partially coincide with each other. This indicates that neither the voltage applied to the inductive load 6 nor the current supplied to the inductive load 6 is dependent on the voltage Vc. Therefore, an influence of the voltage Vc on the output characteristics of the inverter 5 is small.

<Setting of Boost Ratio>

The voltage Vc fluctuates in response to charging and discharging of the capacitor C4. A technique of controlling the average value of the voltage Vc to follow a command value is publicly known from, for example, in Japanese Patent No. 5874800. The voltage Vc used in calculation of the boost ratio α described above is the average value of the voltage Vc. A reason why 1.05 is adopted as the boost ratio α will be described below.

Figure 12:
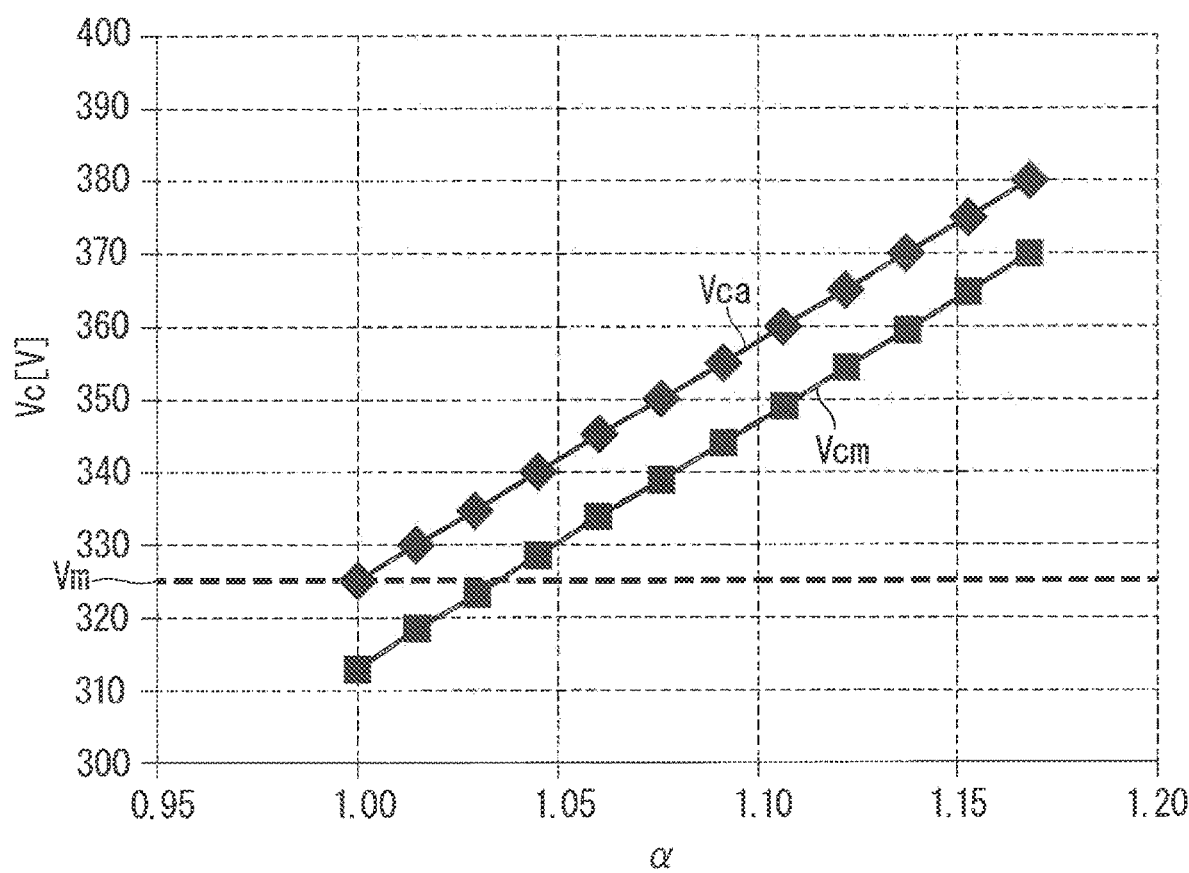
FIG. 12 is a graph illustrating a relationship between a boost ratio and a voltage in the first embodiment.

FIG. 12 is a graph illustrating a relationship between the boost ratio α and the voltage Vc. An average value Vca of the voltage Vc and a minimum value Vcm of the voltage Vc are individually illustrated. Both the average value Vca and the minimum value Vcm increase with an increase in the boost ratio α. However, in order for the equivalent circuit illustrated in FIG. 3 holds, Vcm Vrec need to hold all the time. Thus, Vcm≥Vm is required. In view of FIG. 12, this requirement is equivalent to the boost ratio α being required to be approximately 1.04 or greater. In accordance with this requirement, a value of 1.05 (≥1.04) or greater is adopted as the boost ratio α in FIG. 4 to FIG. 11. Needless to say, 1.05 is an example of the boost ratio α, and another value can be adopted.

It is understood from the above description that the input power factor of the direct power converter 100 is improved by setting the voltage Vc (or the boost ratio α) at a rotational speed that is less than a predetermined threshold (40 rps in the example described above) to be smaller than the voltage Vc (or the boost ratio α) at a rotational speed that is greater than or equal to the predetermined threshold.

In view of the fact that the power Po increases as the rotational speed increases, the input power factor ξ100 of the direct power converter 100 is improved by setting the voltage Vc (or the boost ratio α) when the power Po is less than a predetermined threshold to be smaller than the voltage Vc (or the boost ratio α) when the power Po is greater than or equal to the predetermined threshold.

Alternatively, the predetermined threshold may be set to have a range of a predetermined width. Specifically, the boost ratio α set when the power Po (as described above, the power Pi may be used or the power Pdc may be used instead of the power Po) is less than a first threshold may be smaller than the boost ratio α set when the power Po is less than or equal to a second threshold, the second threshold being greater than or equal to the first threshold. For example, the boost ratio α may be 1.05 when the power Po decreases to be less than the second threshold. The boost ratio α may be 1.14 when the power Po increases to be greater than or equal to the first threshold. In this case, the predetermined threshold can be considered to have a width from the first threshold to the second threshold.

Figure 13:
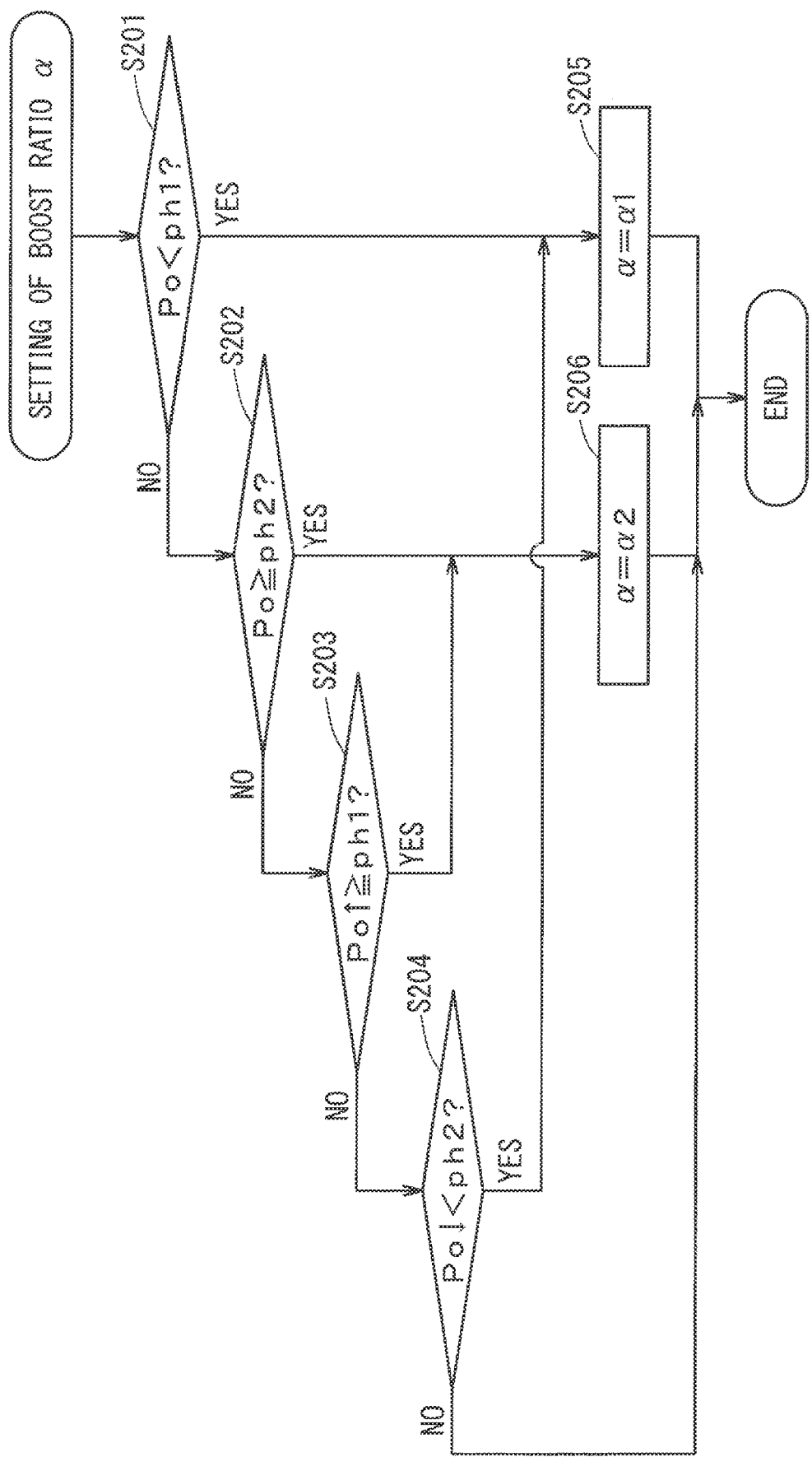
FIG. 13 is a flowchart illustrating a process of setting a boost ratio in the first embodiment.

FIG. 13 is a flowchart illustrating a process of setting the boost ratio α. In step S201, it is determined whether the power Po is less than a first threshold ph1. If the power Po is less than the first threshold ph1, the boost ratio α is set to a value α1 in step S205. In the example described above, α1=1.05. After step S205 is performed, the process illustrated in this flowchart ends.

If it is determined in step S201 that the power Po is not less than the first threshold ph1 (the power Po is greater than or equal to the first threshold ph1), step S202 is performed. In step S202, it is determined whether the power Po is greater than or equal to a second threshold ph2 (≥ph1). If the power Po is greater than or equal to the second threshold ph2, the boost ratio α is set to a value α2 (>α1) in step S206. In the example described above, α2=1.14. After step S206 is performed, the process illustrated in this flowchart ends.

If it is determined in step S202 that the power Po is not greater than or equal to the second threshold ph2 (the power Po is less than the second threshold ph2), step S203 is performed. In step S203, it is determined whether the power Po increases to be greater than or equal to the first threshold ph1. In FIG. 13, a symbol "↑" indicates that the value located on the left side of this symbol increases to be greater than or equal to the value on the right side of this symbol from a value that is less than the value on the right side. If the power Po increases to be greater than or equal to the first threshold ph1, step S206 is performed in which the boost ratio α is set to the value α2.

If it is not determined in step S203 that the power Po increases to be greater than or equal to the first threshold ph1, step S204 is performed. In step S204, it is determined whether the power Po decreases to be less than the second threshold ph2. In FIG. 13, a symbol "↓<" indicates that the value located on the left side of this symbol decreases to be less than the value on the right side of this symbol from a value that is greater than or equal to the value on the right side (the same applies to the followings). If the power Po decreases to be less than the second threshold ph2, step S205 is performed in which the boost ratio α is set to the value α1.

The case where a negative result is obtained for determination in all of steps S201, S202, S203, and S204 is not handled in the process illustrated in the flowchart of FIG. 13, and the process ends. In this case, for example, the processing may be performed to maintain the boost ratio α at the current value.

Likewise, steps S203 and S204 may be omitted and the case where a negative result is obtained for determination in both steps S201 and S202 is not handled in the process illustrated in the flowchart of FIG. 13, and the process may end. Also in this case, for example, the processing may be performed to maintain the boost ratio α at the current value.

Figure 14:
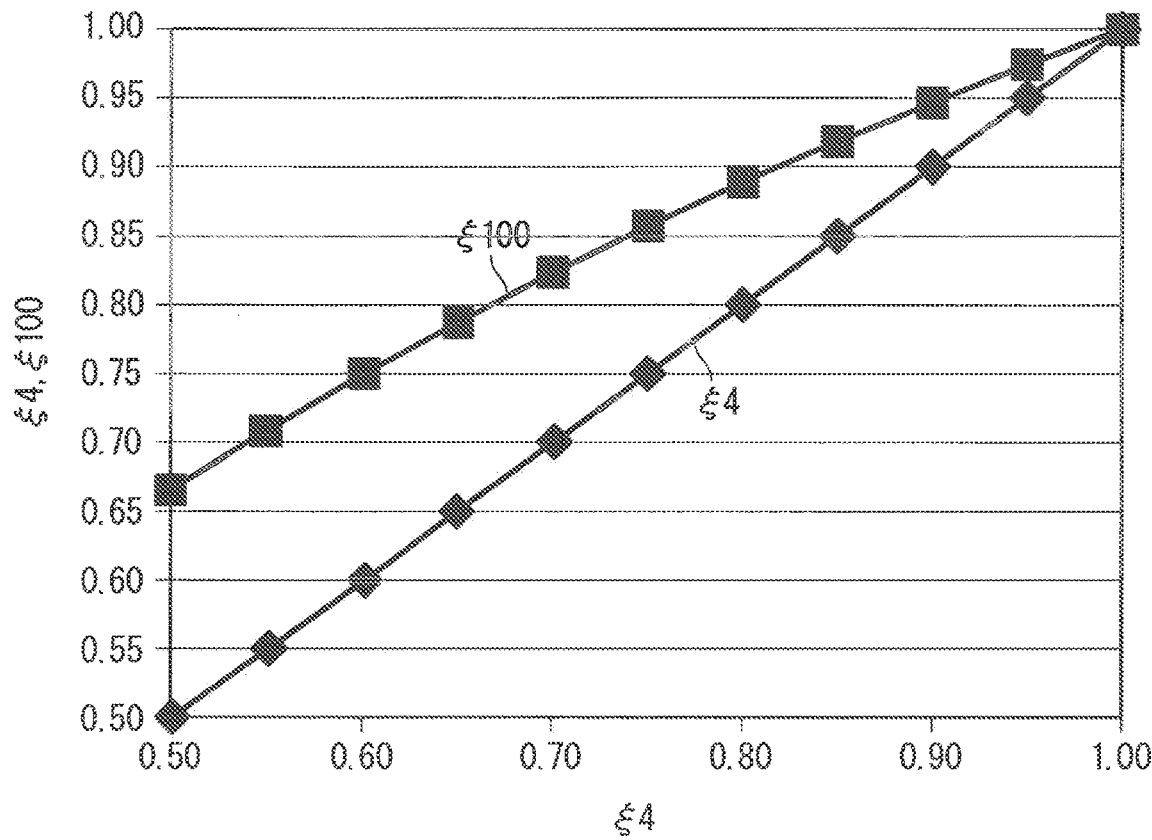
FIG. 14 is a graph illustrating a relationship between the input power factor of the direct power converter and a converted power factor in the first embodiment.

FIG. 14 is a graph illustrating a relationship between the converted power factor ξ4 and the input power factor ξ100 based on Equation (10). FIG. 14 indicates that the lower the input power factor ξ100 is, the more the input power factor ξ100 is improved by the converted power factor ξ4. Thus, for example, the boost ratio α may be changed based on determination using the input power factor ξ100 instead of determination using the power Po, the power Pi, or the power Pdc.

Figure 15:
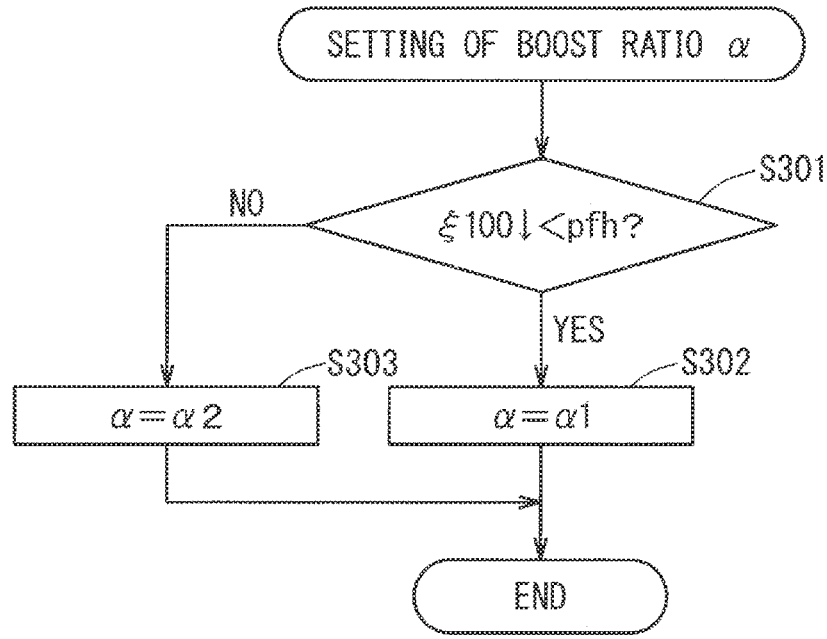
FIG. 15 is a flowchart illustrating a process of setting a boost ratio in the first embodiment.

FIG. 15 is a flowchart illustrating a process of setting the boost ratio α. In step S301, it is determined whether the input power factor ξ100 decreases from a value greater than or equal to a predetermined threshold pfh to be less than the threshold pfh. If the result of the determination in step S301 is positive (if the input power factor ξ100 decreases to be less than the threshold pfh), step S302 is performed in which the boost ratio α is set to the value α1. After step S302 is performed, the process illustrated in this flowchart ends.

If the result of the determination in step S301 is negative, the boost ratio α is set to the value α2 in step S303. After step S303 is performed, the process illustrated in this flowchart ends.

<Introduction of Modulation Index>

The change in the voltage Vc as described above is implemented by a change in the period (hereinafter, referred to as an "on-period") for which the switch SL is in conduction. Thus, a difference between the conduction start phase and the conduction end phase is set dependently on the power Po.

Note that as understood from FIG. 6 and FIG. 10, the larger the power Po is, the larger the output voltage amplitude Vo is. In addition, as understood from Equation (2), the larger the voltage Vc is, the larger the DC voltage Vdc is. A modulation index ks of the inverter 5 is introduced as a ratio of the crest value $\sqrt{2}$Vo of the output voltage amplitude to the DC voltage Vdc.

When the voltage source inverter is adopted as the inverter 5 as described above, the modulation index ks is less than or equal to 1. In consideration of this, it is desirable that the voltage Vc is increased (the boost ratio is increased) when the modulation index ks becomes equal to 1 and the voltage Vc is decreased (the boost ratio is decreased) when the modulation index ks becomes less than 1.

Figure 16:
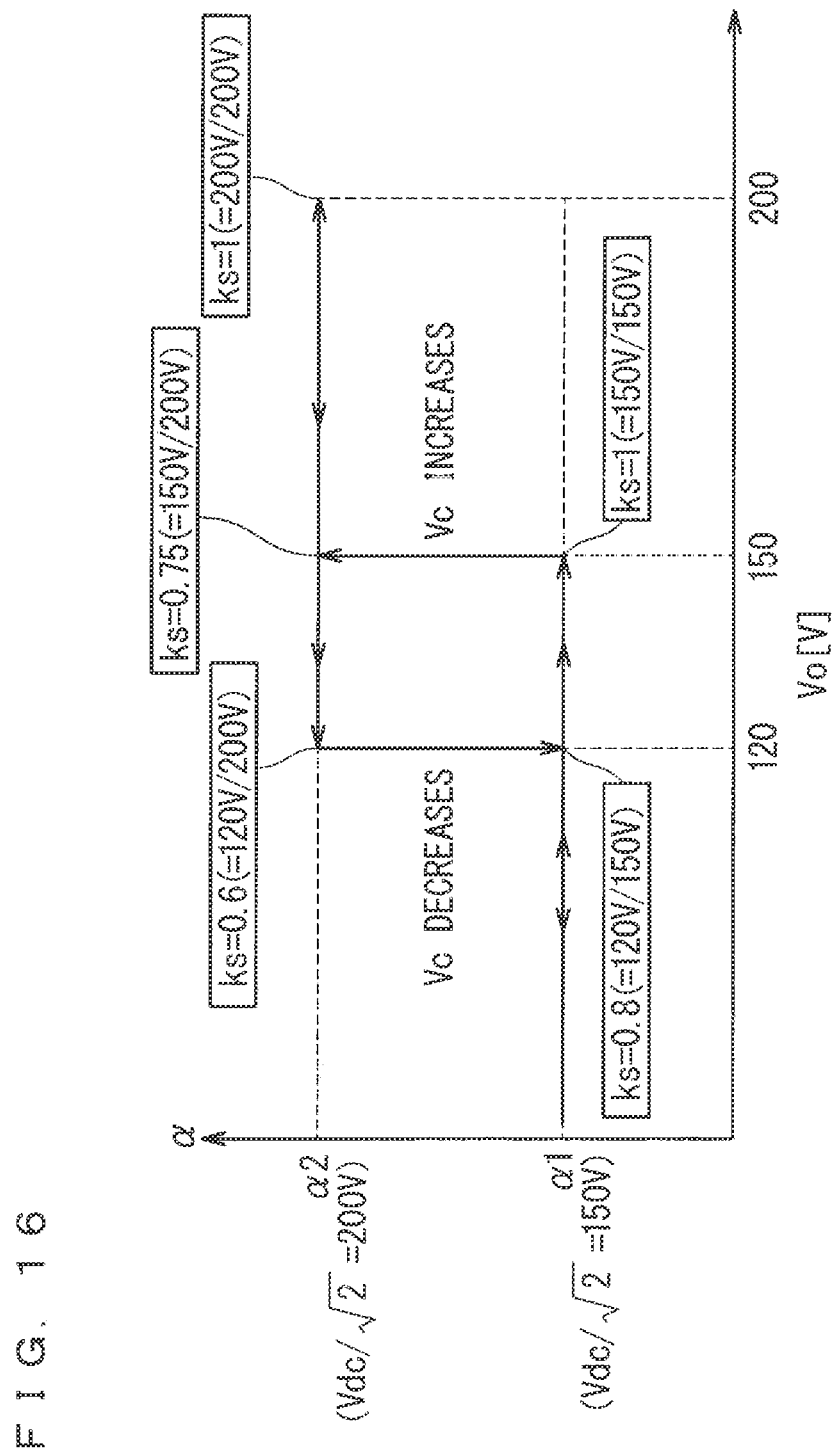
FIG. 16 is a graph illustrating a relationship between the output voltage amplitude and the boost ratio in the first embodiment.

FIG. 16 is a graph illustrating a relationship between the output voltage amplitude Vo and the boost ratio α. The value α1 or α2 is selectively adopted as the boost ratio α. A case is assumed in which the value of the DC voltage Vdc is equal to 150$\sqrt{2}$ V when α=α1 and the value of the DC voltage Vdc is equal to 200$\sqrt{2}$ V when α=α2. In the example described above, α1 corresponds to 1.05 and α2 corresponds to 1.14. For the sake of convenience, FIG. 16 adopts the output voltage amplitude Vo for the horizontal axis and adopts the boost ratio α for the vertical axis. The output voltage amplitude Vo is changed by changing the modulation index ks and the boost ratio α.

A case where the boost ratio α is changed from the value α1 to the value α2 (a case where the voltage Vc and the DC voltage Vdc increase) will be described. When the boost ratio α is equal to the value α1, increasing the modulation index ks can increase the output voltage amplitude Vo and can consequently increase the power Po. The output voltage amplitude Vo obtained when the modulation index ks is equal to 1 is equal to 150$\sqrt{2}$ V which is the value of the DC voltage Vdc obtained when the boost ratio α is equal to the value α1. In this case, the modulation index ks is equal to 1 (=150/150).

The modulation index ks exceeding 1 corresponds to overmodulation, which is undesirable. Thus, when the modulation index ks increases to reach the value of 1, the boost ratio α is changed from the value α1 to the value α2 in order to further increase the power Po. Accordingly, in the case where the same output voltage amplitude Vo is obtained, a small value can be selected for the modulation index ks. In this case, the boost ratio α is changed from the value α1 to the value α2. Consequently, the modulation index ks is updated from the value of 1 to the value of 0.75 (=150/200).

A case where the boost ratio α is changed from the value α2 to the value α1 (a case where the voltage Vc and the DC voltage Vdc decrease) will be described. When the power Po is small, the voltage Vc is reduced in order to increase the input power factor ξ100. The boost ratio α is changed from the value α2 to the value α1.

The modulation index ks needs to be less than 1 even when the boost ratio α is changed from the value α2 to the value α1. Thus, the modulation index ks needs to be smaller than the value of 0.75 when the boost ratio α is changed from the value α2 to the value α1. For example, the boost ratio α is changed from the value α2 to the value α1 when the modulation index ks decreases to be equal to a value of 0.6 (<0.75). This change causes the modulation index ks to increase from 0.6 to 0.8 (=120/150). However, the value of 0.8 provides a margin of a value of 0.2 relative to the desirable upper-limit value of 1 for the modulation index ks.

The above-described updating of the boost ratio α is described as follows from the viewpoint of the output voltage amplitude Vo. When the output voltage amplitude Vo is less than or equal to 120 V, α=α1, Vdc=150$\sqrt{2}$ [V], and ks≤0.8 hold. From this state, the output voltage amplitude Vo increases and the modulation index ks increases, and ks=1 holds when Vo=150 [V]. The modulation index ks taking a value of 1 causes the boost ratio α to increase from the value α1 to the value α2. Consequently, Vdc=200$\sqrt{2}$ [V] holds, and the modulation index ks becomes 150/200=0.75. The output voltage amplitude Vo further increases and the modulation index ks increases to be ks=1 at Vo=200 [V]. At this time, the boost ratio α takes the value α2.

When the output voltage amplitude Vo is greater than or equal to 150 V, ks≥0.75 holds. From this state, the output voltage amplitude Vo decreases and the modulation index ks decreases to be ks=0.6 at Vo=120 [V]. This causes the boost ratio α to decrease from the value α2 to the value α1, making Vdc=150$\sqrt{2}$ [V] and ks=0.8 hold. The output voltage amplitude Vo further decreases, and the modulation index ks decreases.

As described above, the change in the boost ratio α based on the output voltage amplitude Vo or the modulation index ks can have hysteresis. In other words, the input power factor ξ100 is improved by setting the voltage Vc (or the boost ratio α) at the modulation index ks less than a certain threshold to be smaller than the voltage Vc (or the boost ratio α) at the modulation index ks greater than or equal to the certain threshold.

In consideration of the hysteresis, the threshold (1 in the example described above) set when the modulation index ks increases is greater than the threshold (0.6 in the example described above) set when the modulation index ks decreases. In other words, the boost ratio α1 set when the modulation index ks is less than a third threshold is smaller than the boost ratio α2 set when the modulation index ks is greater than or equal to a fourth threshold, the fourth threshold being greater than or equal to the third threshold. In accordance with the example described above, the third threshold is a value of 0.6 and the fourth threshold is a value of 1 when there is hysteresis. The third threshold is equal to the fourth threshold when there is no hysteresis. Needless to say, a value less than 1 may be adopted as the fourth threshold.

<Calculation of On-Period Based on Boost Ratio α>

Figure 17:
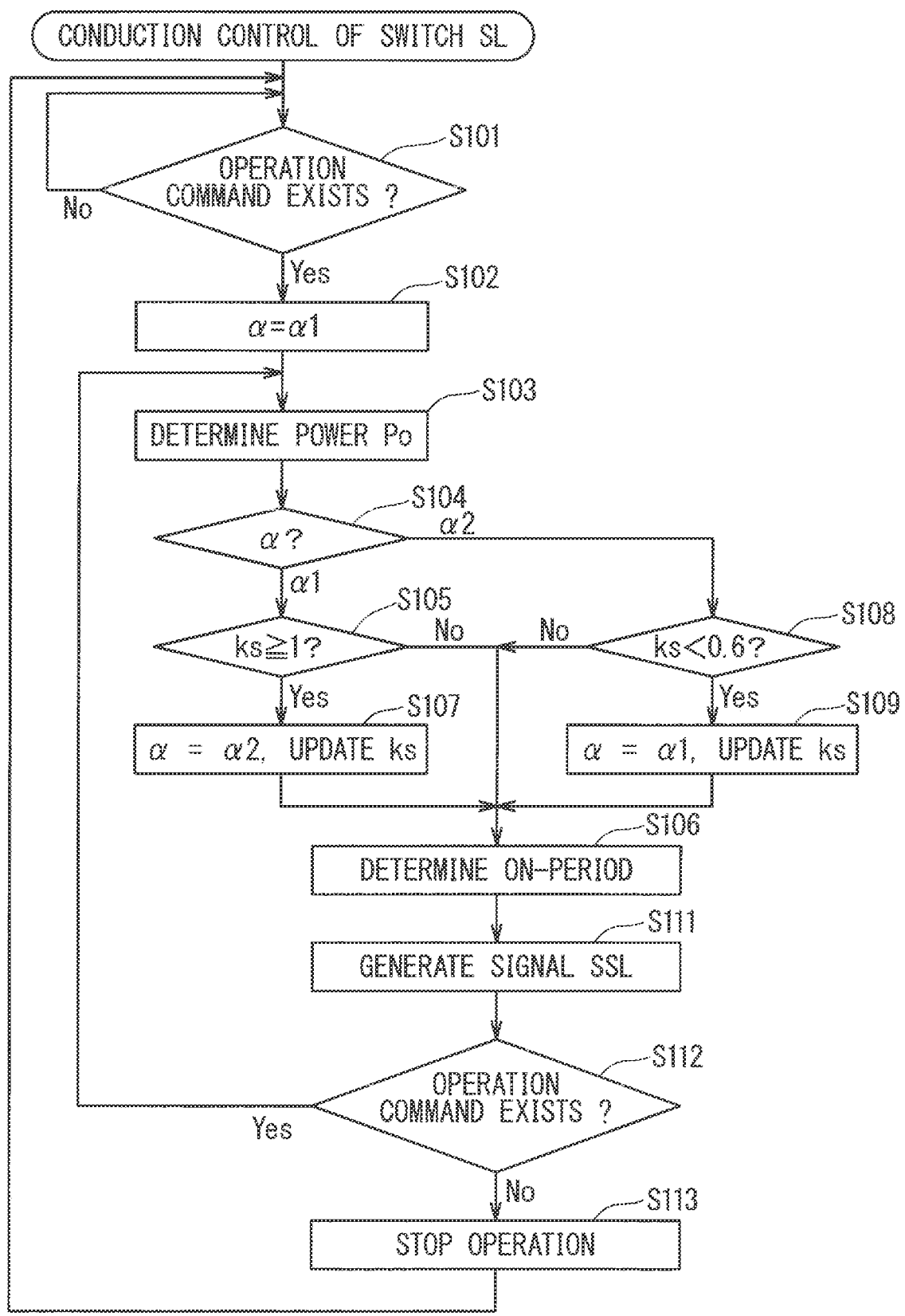
FIG. 17 is a flowchart illustrating a process of controlling conduction of a switch in the first embodiment.

FIG. 17 is a flowchart illustrating a process of controlling conduction of the switch SL. In step S101, it is determined whether there is a command for causing the direct power converter 100 to operate (referred to as an "operation command" hereinafter and in the drawings). If there is no operation command, step S101 is repeatedly performed. If there is an operation command, the process proceeds to step S102 in which the boost ratio α is set to the value α1. After step S102 is performed, the process proceeds to step S103 in which the power Po is determined through calculation. As described later, there is a flow in which step S103 is performed other than a flow in which step S103 is performed after the performance of step S102.

After step S103 is performed, it is determined in step S104 whether the boost ratio α is equal to the value α1 or the value α2. When step S104 is performed after step S102 is performed through step S103, α=α1 holds. In this case, step S105 is performed after step S104 is performed. In step S105, it is determined whether the modulation index ks is greater than or equal to 1.

When the modulation index ks is less than 1, a result of the determination in step S105 is negative (or "false"). In accordance with FIG. 16, this result of the determination corresponds to the case where an operation command is obtained with the output voltage amplitude Vo not exceeding 150 V. Thus, in step S106, the on-period is calculated using α=α1.

After step S106 is performed, a control signal SSL is generated in step S111. The control signal SSL is used in control for bringing the switch SL into conduction. The control signal SSL is determined not only by the on-period but also by the conduction start phase. More specifically, the conduction start phase is determined in advance. Between a time corresponding to the conduction start phase and a time obtained by adding the on-period to the time, the control signal SSL is on (asserts or is active) and the switch SL is in conduction.

After step S111 is performed, it is determined in step S112 whether there is an operation command. If there is no operation command, the operation of the direct power converter 100 stops in step S113 (referred to as "STOP OPERATION" in the drawings). Step S101 is performed again to wait for an operation command.

If it is determined in step S112 that there is an operation command, step S103 is performed again in which the power Po is determined again.

If the operation of the direct power converter 100 is continued in this manner, the process proceeds from step S112 to step S104 through step S103. Thus, the modulation index ks may reach the value of 1 by increasing the output voltage amplitude Vo while the boost ratio α is taking the value α1 by the continued operation of the direct power converter 100.

In such a case, after steps S104 and S105 are performed, step S107 is performed. In step S107, the boost ratio α is changed to the value α2. Consequently, the modulation index ks is updated. In accordance with FIG. 16, the modulation index ks is updated from the value of 1 to the value of 0.75. This change in the boost ratio α corresponds to the increase in the voltage Vc.

Then in step S106, the on-period corresponding to α=α2 is calculated. After step S106 is performed, the process proceeds to step S112 through the processing in step S111.

In the state in which the boost ratio α takes the value α2, step S108 is performed after step S104 is performed. In step S108, it is determined whether the modulation index ks is less than 0.6.

The power Po determined in step S103 decreases, the output voltage amplitude Vo decreases, and thus the modulation index ks decreases. If the modulation index ks becomes less than 0.6 as a result, step S109 is performed in which the boost ratio α is changed to the value α1 and the modulation index ks is updated. In accordance with FIG. 16, the modulation index ks is updated from the value of 0.6 to the value of 0.8. This change in the boost ratio α corresponds to the decrease in the voltage Vc.

Then in step S106, the on-period corresponding to α=α1 is calculated. After step S106 is performed, the process proceeds to step S112 through the processing in step S111.

If the modulation index ks is greater than or equal to 0.6, after step S108 is performed, the on-period corresponding to α=α2 is calculated in step S106. After step S106 is performed, the process proceeds to step S112 through the processing in step S111.

FIG. 18 to FIG. 21 are graphs illustrating a relationship between the on-period and the average value of the receiving power PL. The on-period is based on power input to the power buffer circuit 4 in "Single-Phase Twice voltage PFC Converter for air conditioner", IEEJ Transactions on Industry Applications, Vol. 119 No. 5 (1999). However, in the present embodiment, the on-period is determined based on power (the power Po in this case) to be converted by the inverter 5. In view of Equation (5), the power Po is twice as large as the average value of the receiving power PL. Accordingly, in FIG. 18 to FIG. 21, power Po/2 is written as the receiving power PL at the horizontal axis.

Figure 18:
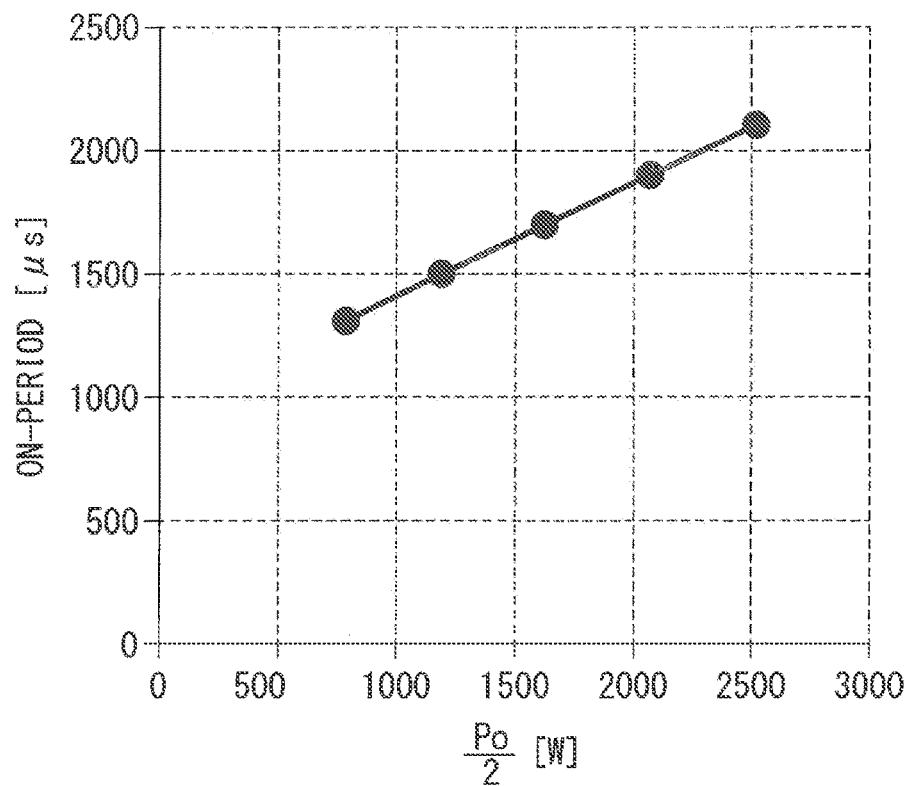
FIG. 18 is a graph illustrating a relationship between an on-period and an average value of receiving power in the first embodiment.
Figure 19:
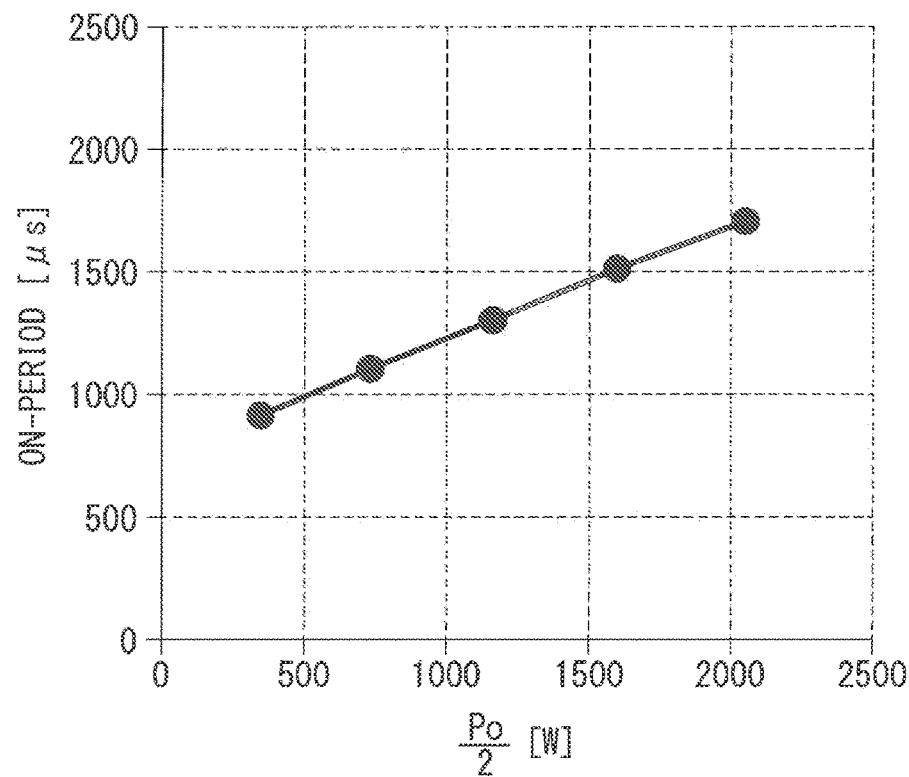
FIG. 19 is a graph illustrating a relationship between the on-period and the average value of receiving power in the first embodiment.
Figure 20:
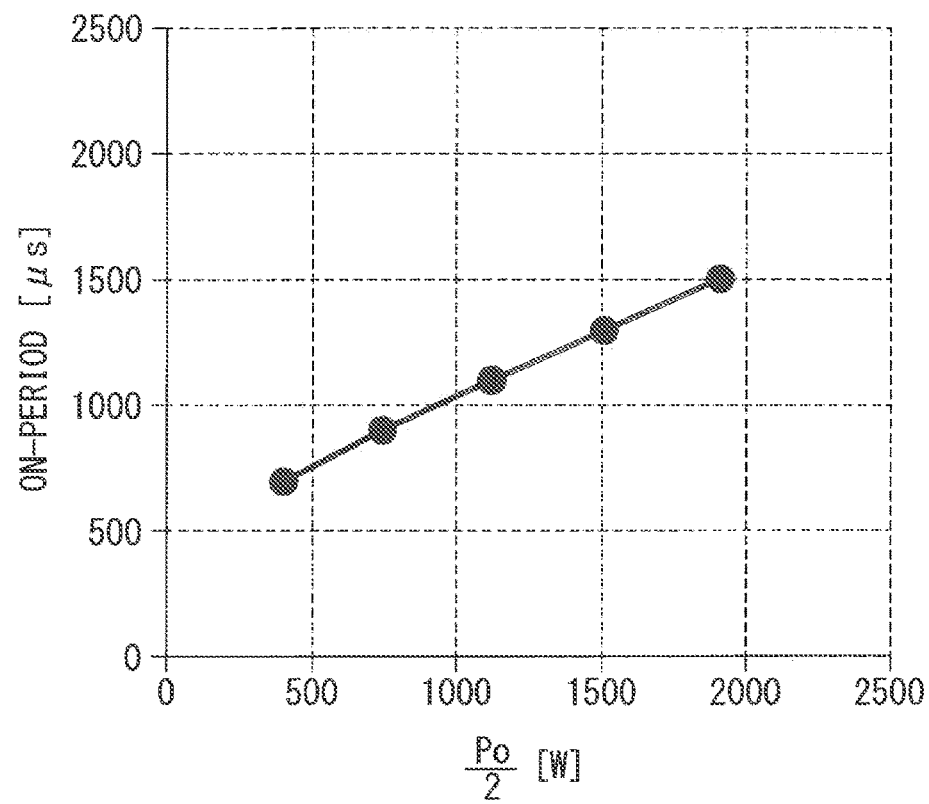
FIG. 20 is a graph illustrating a relationship between the on-period and the average value of receiving power in the first embodiment.
Figure 21:
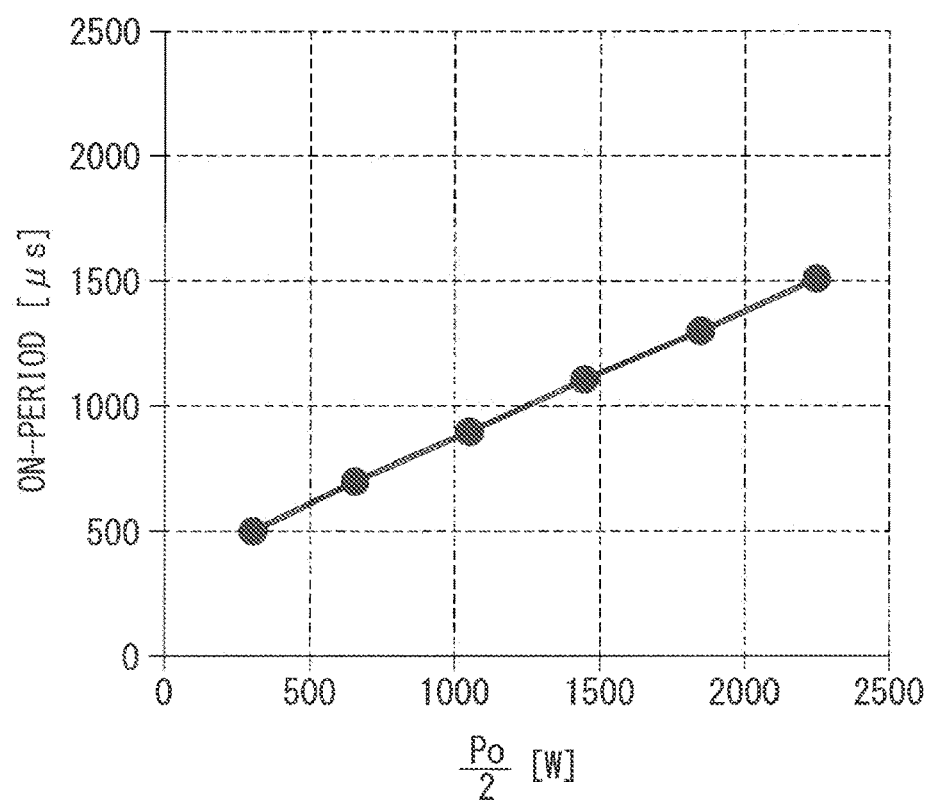
FIG. 21 is a graph illustrating a relationship between the on-period and the average value of receiving power in the first embodiment.

FIG. 18 and FIG. 19 illustrate the case of J=0.075. FIG. 20 and FIG. 21 illustrate the case of J=0.125. FIG. 18 and FIG. 20 illustrate the case of α=1.14. FIG. 19 and FIG. 21 illustrate the case of α=1.05.

It is understood from comparison between FIG. 18 and FIG. 19 or comparison between FIG. 20 and FIG. 21 that the on-period is longer at a larger boost ratio α. It is considered that such dependency of the on-period on the boost ratio is owing to the voltage Vc being generated as a result of charging of the capacitor C4.

It is understood from comparison between FIG. 18 and FIG. 20 or comparison between FIG. 19 and FIG. 21 that the on-period is shorter in a larger conduction start phase. It is considered that such dependency of the on-period on the conduction start phase is owing to flowing of the current iL when the rectified voltage Vrec is large at the larger conduction start phase.

By using the graphs illustrated in FIG. 18 and FIG. 19 or the graphs illustrated in FIG. 20 and FIG. 21, the on-period corresponding to the power Po determined in step S103 in FIG. 17 and to the boost ratio α set in step S102, S107, or S109 is determined. The control signal SSL generated in step S111 changes from non-active to active (activates) at the time corresponding to the conduction start phase set in advance and changes from active to non-active (deactivates) at a time when the on-period has passed from the time.

The period in which the instantaneous power Pout is detected to determine the power Po in step S103 is set larger by one or more digits than the period of the rectified voltage Vrec. The reasonability of adopting the power Po in calculation of the on-period of the switch SL to be switched on and off in the period of the rectified voltage Vrec is ensured. For example, if the frequency of the AC voltage Vin is equal to 50 Hz, the period of the rectified voltage Vrec is equal to 10 ms and the period in which the instantaneous power Pout is detected is set to several hundreds of ms.

As described above, by setting the boost ratio α to be smaller when the power Po is small than when the power Po is large, the input power factor ξ100 improves. When the load torque is constant, the power Po is directly proportional to the rotational speed as described above. The load torque and the output current are directly proportional to each other. Thus, if the load torque is constant, the output current is constant.

In the synchronous machine, the rotational speed and the output voltage amplitude Vo are directly proportional to each other. Since the DC voltage Vdc is normally controlled to be constant, the output voltage amplitude Vo and the modulation index ks are directly proportional to each other. In view of this, setting the voltage Vc (accordingly, the boost ratio α) based on the magnitude of the modulation index ks and determining the on-period based on the boost ratio α and the power Po is reasonable as a technique of improving the input power factor ξ100.

<Configuration Example of Control Device>

Figure 22:
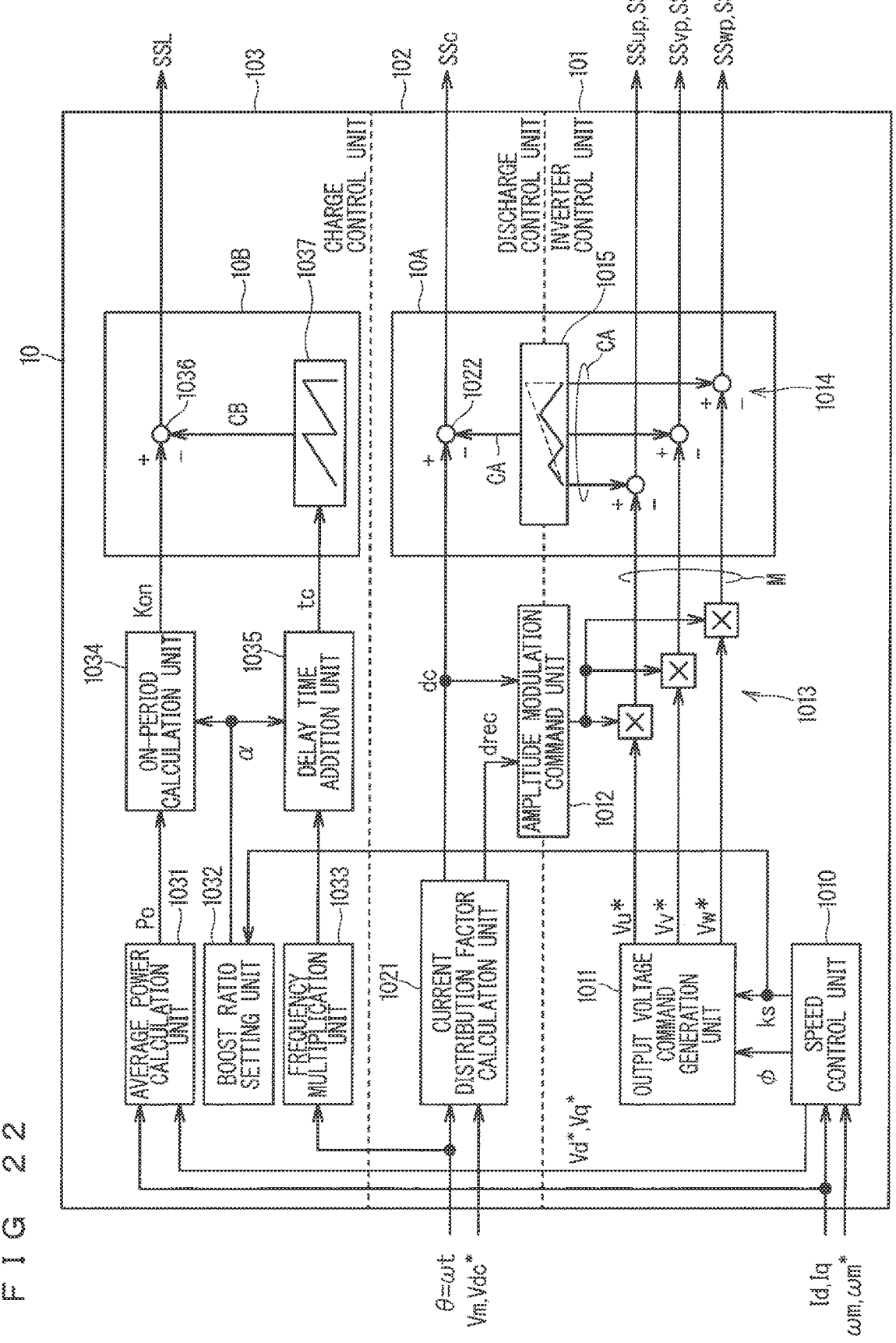
FIG. 22 is a block diagram illustrating a configuration of a control device according to the first embodiment.

FIG. 22 is a block diagram illustrating a configuration of the control device 10. The control device 10 includes an inverter control unit 101, a discharge control unit 102, and a charge control unit 103. The control device 10 can be implemented by, for example, a single-chip microcomputer.

The inverter control unit 101 includes an output voltage command generation unit 1011, an amplitude modulation command unit 1012, a multiply-accumulate calculation unit 1013, a logical calculation unit 1014, and a carrier generation unit 1015.

The output voltage command generation unit 1011 generates voltage command values Vu*, Vv*, and Vw* from the modulation index ks and an output voltage phase 4. The voltage command value Vu* is a command value of the AC voltage output to the output terminal Pu by the inverter 5. The voltage command value Vv* is a command value of the AC voltage output to the output terminal Pv by the inverter 5. The voltage command value Vw* is a command value of the AC voltage output to the output terminal Pw by the inverter 5.

The inverter control unit 101 further includes, for example, a speed control unit 1010. The speed control unit 1010 generates the modulation index ks and the output voltage phase φ based on the q-axis current Iq, the d-axis current Id, the rotation angular velocity ωm, and the command value ωm* of the rotation angular velocity ωm. Note that as described in FIG. 16 and FIG. 17 (steps S107 and S109), the modulation index ks is updated based on the value of the boost ratio α. Alternatively, the modulation index ks may be obtained using another method.

The amplitude modulation command unit 1012 controls the operation of the multiply-accumulate calculation unit 1013 based on the discharge duty dc and the rectifying duty drec. The multiply-accumulate calculation unit 1013 (which is illustrated as symbols for only multipliers for the sake of simplicity) performs multiply-accumulate calculation on the voltage command values Vu*, Vv*, and Vw*, the discharge duty dc, and the rectifying duty drec to generate a signal wave M.

The logical calculation unit 1014 (which is illustrated as symbols for only comparators for the sake of simplicity) performs logical calculation on a result of comparison between the signal wave M and a carrier CA to output control signals SSup, SSvp, SSwp, SSun, SSvn, and SSwn.

The control signal SSup controls the operation of the switching element Sup. The control signal SSvp controls the operation of the switching element Svp. The control signal SSwp controls the operation of the switching element Swp. The control signal SSun controls the operation of the switching element Sun. The control signal SSvn controls the operation of the switching element Svn. The control signal SSwn controls the operation of the switching element Swn.

The carrier CA is generated by the carrier generation unit 1015. The carrier CA may be, for example, a sawtooth wave or may be a triangle wave.

The discharge control unit 102 includes a current distribution factor calculation unit 1021 and a comparator 1022. The current distribution factor calculation unit 1021 generates the discharge duty dc and the rectifying duty drec through calculation based on the phase θ, the amplitude Vm, and the command value Vdc* of the DC voltage Vdc.

The comparator 1022 compares the discharge duty dc and the carrier CA with each other and generates the control signal SSc for controlling the switch Sc into conduction.

Since such operations of the inverter control unit 101 and the discharge control unit 102 are publicly known art (see, for example, Japanese Patent No. 6265297), details of thereof are omitted herein.

The carrier generation unit 1015, the logical calculation unit 1014, and the comparator 1022 can be regarded as a synchronous PWM modulation unit 10A. The synchronous PWM modulation unit 10A can be implemented using, for example, a timer in a single-chip microcomputer.

The charge control unit 103 includes an average power calculation unit 1031, a boost ratio setting unit 1032, a frequency multiplication unit 1033, an on-period calculation unit 1034, a delay time addition unit 1035, a comparator 1036, and a carrier generation unit 1037.

The average power calculation unit 1031 determines the power Po through calculation using Equation (4). Note that the d-axis voltage command Vd* which is a command value which the d-axis voltage Vd is to follow is adopted as the d-axis voltage Vd. The q-axis voltage command Vq* which is a command value which the q-axis voltage Vq is to follow is adopted as the q-axis voltage Vq. Both the d-axis voltage command Vd* and the q-axis voltage command Vq* are generated by the speed control unit 1010.

The boost ratio setting unit 1032 determines the boost ratio α based on the modulation index ks (see FIG. 16, FIG. 17, and steps S107 and S109). For example, the boost ratio setting unit 1032 stores two values α1 and α2, and selectively outputs, as the boost ratio α, one of the two values α1 and α2 in accordance with the modulation index ks.

The on-period calculation unit 1034 determines the on-period for which the switch SL is in conduction through calculation, and outputs a count value Kon equivalent to the on-period. Such an on-period can be determined by the boost ratio α and the power Po. Since such determination is publicly known from, for example, "Single-Phase Twice voltage PFC Converter for air conditioner", IEEJ Transactions on Industry Applications, Vol. 119 No. 5 (1999), details thereof are omitted.

The frequency multiplication unit 1033 sets information for making one period of the AC voltage Vin into two periods using the phase θ. The delay time addition unit 1035 sets a timing tc obtained by adding the delay time td to a zero-crossing timing of the AC voltage Vin (this timing is equivalent to a phase at which the rectified voltage Vrec turns from decrease to increase). The delay time td is a period corresponding to the conduction start phase.

The carrier generation unit 1037 generates, using the timing tc as a trigger, a carrier CB of a triangle wave, for example, a sawtooth wave. The comparator 1036 compares the carrier CB and the count value Kon with each other and outputs the control signal SSL in a pulsed state. The frequency of the carrier CB is twice the frequency of the AC voltage Vin and is, for example, 100 Hz or 120 Hz.

The comparator 1036 and the carrier generation unit 1037 can be regarded as a pulse generation unit 10B that generates a pulse in synchronization with the AC voltage Vin. The pulse generation unit 10B can be implemented using, for example, a timer in a single-chip microcomputer.

Figure 23:
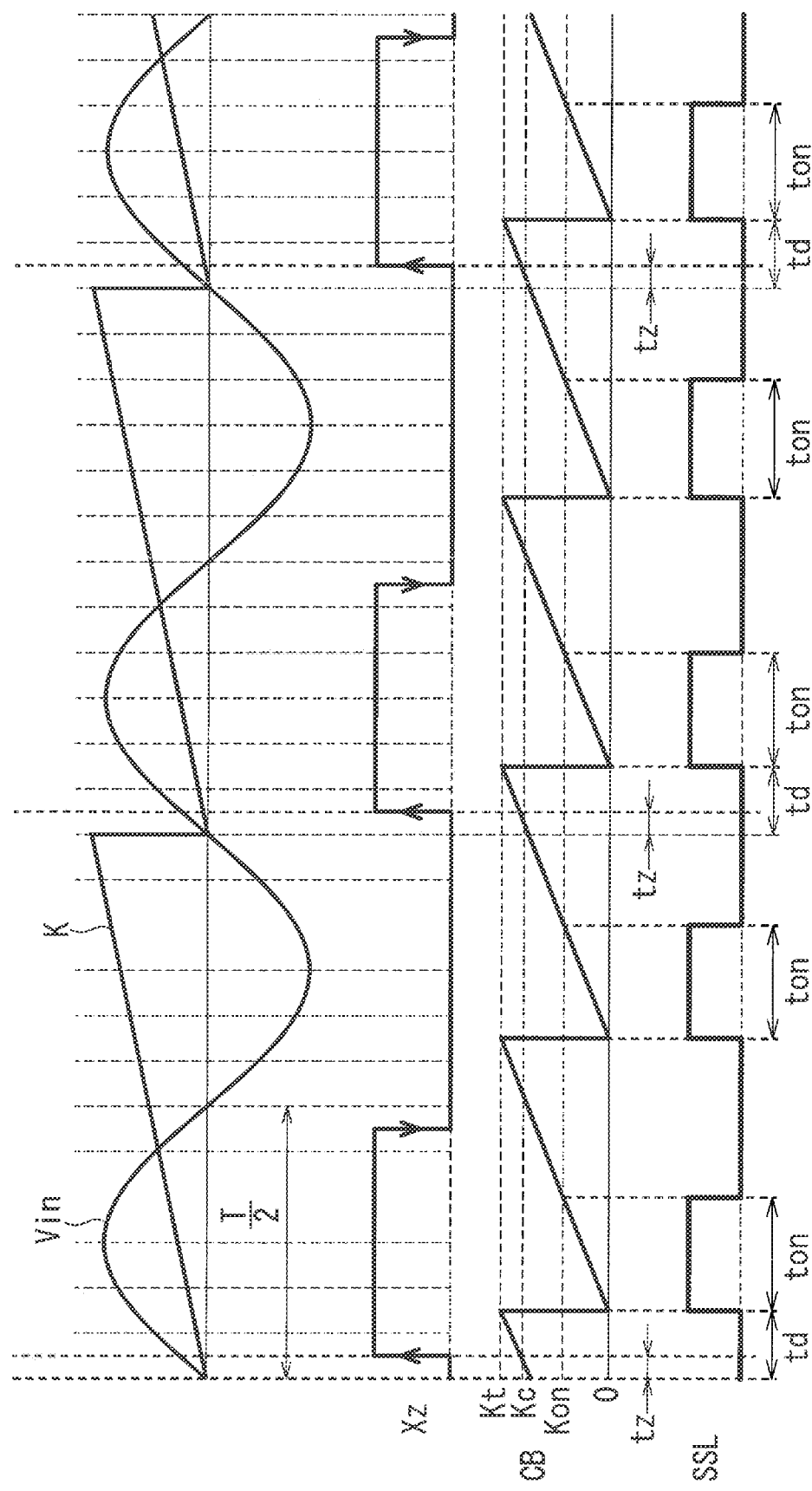
FIG. 23 is a timing chart describing operations of a frequency multiplication unit, a delay time addition unit, a carrier generation unit, and a comparator in the first embodiment.

FIG. 23 is a timing chart describing operations of the frequency multiplication unit 1033, the delay time addition unit 1035, the carrier generation unit 1037, and the comparator 1036.

The frequency multiplication unit 1033 counts one period of the phase θ. A half value Kt of the maximum value of the count value is the maximum value of the carrier CB. In addition, the minimum value of the carrier CB is 0. The rising of a zero-cross signal Xz rises with a delay of a delay time tz with respect to the zero-crossing timing of the AC voltage Vin. When a count value Kz corresponding to the delay time tz and the count value Kd corresponding to the delay time td are introduced, a value Kc of the carrier CB at this time is represented as Kt−Kd+Kz.

In view of the fact that the on-period differs when the conduction start phase differs even if the voltage Vc is the same (comparison between FIG. 18 and FIG. 20 or comparison between FIG. 19 and FIG. 21), the conduction start phase is desirably taken in to account in calculation of the on-period. Comparison between FIG. 4 and FIG. 8 indicates that the input power factor ξ100 is improved at a larger conduction start phase angle if the rotational speed is the same (if the power Po is the same). Thus, when the modulation index ks increases to increase the voltage Vc, a larger conduction start phase angle may be set.

Figure 24:
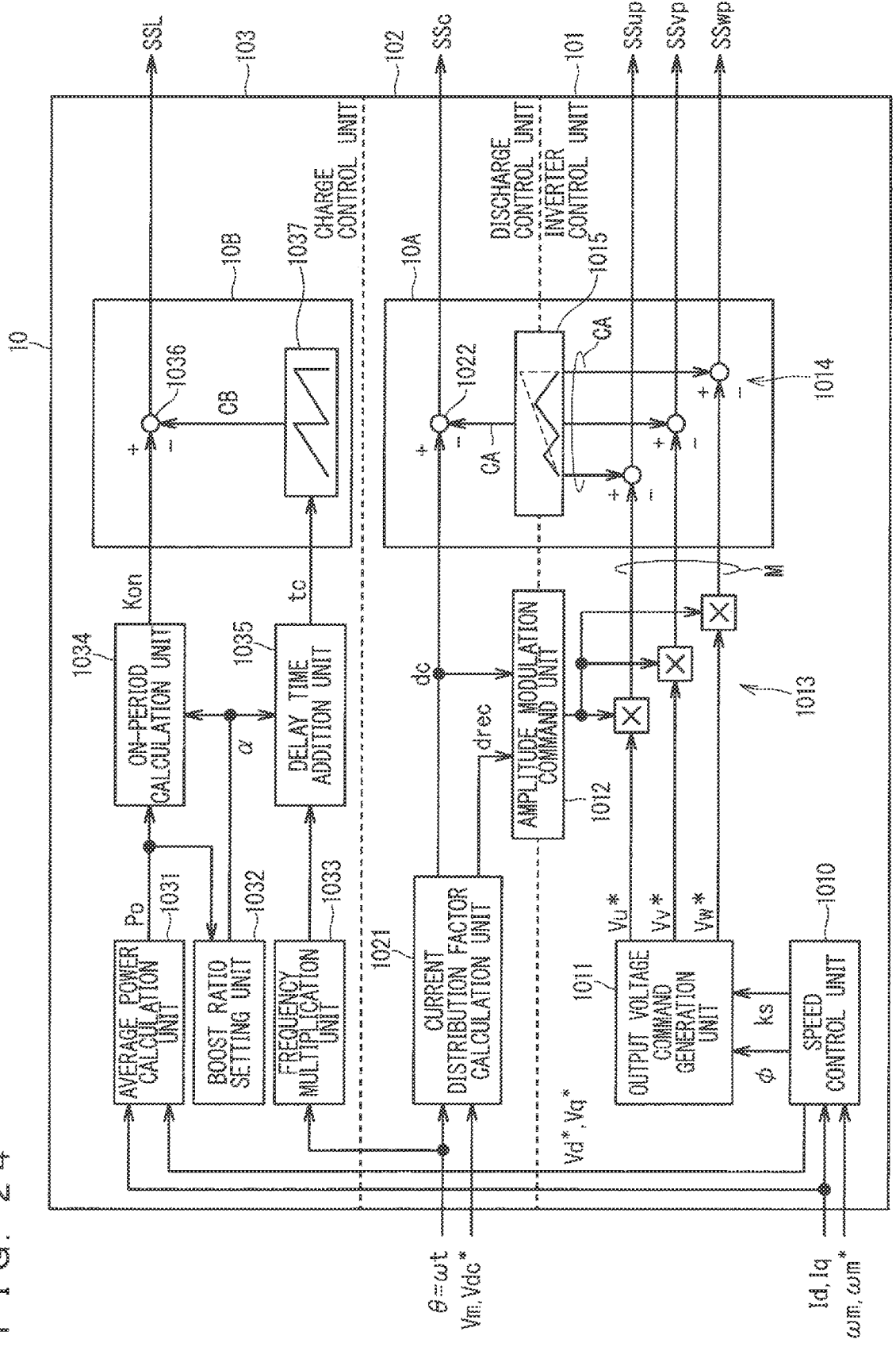
FIG. 24 is a block diagram illustrating a second configuration of the control device according to the first embodiment.

As illustrated in FIG. 13, when the boost ratio α is set based on the power Po, the modulation index ks need not be input to the boost ratio setting unit 1032. FIG. 24 is a block diagram illustrating the configuration of the control device 10 in this case (also referred to as "a second configuration of the control device 10"). The second configuration of the control device 10 differs from the configuration illustrated in FIG. 22 in that the power Po is input to the boost ratio setting unit 1032 instead of the modulation index ks.

In FIG. 24, the boost ratio setting unit 1032 determines the boost ratio α based on the power Po (see FIG. 13). For example, the boost ratio setting unit 1032 stores two values α1 and α2, and selectively outputs, as the boost ratio α, one of the two values α1 and α2 in accordance with the power Po.

Figure 25:
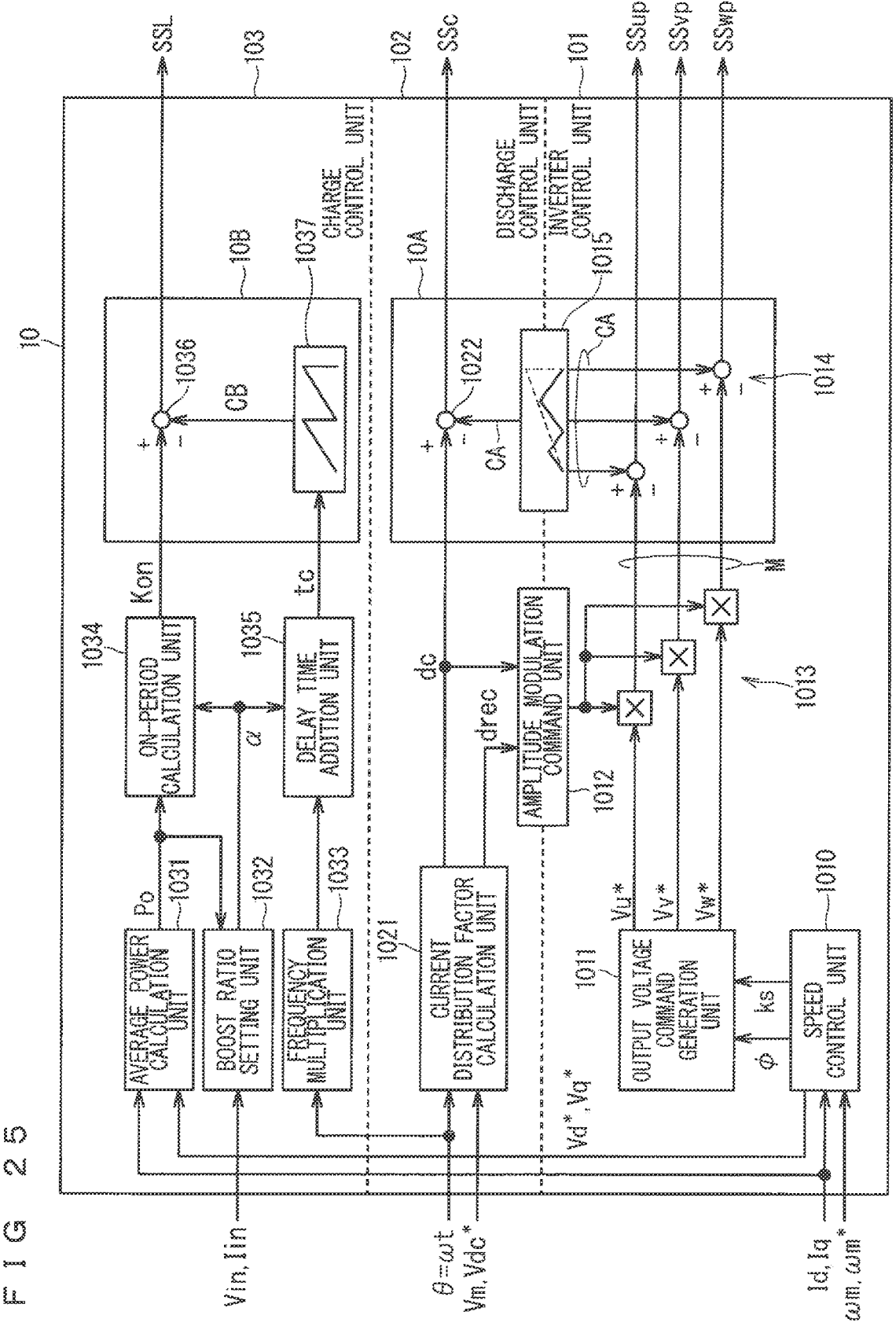
FIG. 25 is a block diagram illustrating a third configuration of the control device according to the first embodiment.

As illustrated in FIG. 15, when the boost ratio α is set based on the input power factor ξ100, the modulation index ks need not be input to the boost ratio setting unit 1032. FIG. 25 is a block diagram illustrating the configuration of the control device 10 in this case (also referred to as "a third configuration of the control device 10"). The third configuration of the control device 10 differs from the configuration illustrated in FIG. 22 in that the AC voltage Vin and the current Iin are input to the boost ratio setting unit 1032 instead of the modulation index ks.

FIG. 1 illustrates the state in which the AC voltage Vin and the current Iin are supplied to the control device 10 using a broken-line arrow. The broken line is shown because the AC voltage Vin and the current Iin need not be supplied to the control device 10 when the process illustrated in FIG. 13 or FIG. 17 is performed.

In FIG. 25, the boost ratio setting unit 1032 determines the input power factor ξ100 from the AC voltage Vin and the current Iin and determines the boost ratio α based on the input power factor ξ100 (see FIG. 15). For example, the boost ratio setting unit 1032 stores two values α1 and α2, and selectively outputs, as the boost ratio α, one of the two values α1 and α2 in accordance with the input power factor ξ100.

In the first embodiment, the charge control unit 103 causes the charge circuit 4b to charge the capacitor C4 to the voltage Vc whose ratio to the amplitude Vm of the rectified voltage Vrec is equal to the boost ratio α. The boost ratio α is smaller when the power Pdc input to the inverter 5, the power Po output by the inverter 5, or the power Pi output by the converter 3 is less than a first threshold than when the power Pdc input by the inverter 5, the power Po output by the inverter 5, or the power Pi output by the converter 3 is greater than or equal to a second threshold (the second threshold is greater than or equal to the first threshold). The smaller the voltage Vc is, the more the converted power factor ξ4 is improved. Thus, if the power Pdc, Pi, or Po decreases, the converted power factor ξ4 is improved by decreasing the boost ratio α. The improvement in the converted power factor ξ4 leads to an improvement in the input power factor ξ100 of the direct power converter 100.

In a specific configuration example of the charge control unit 103, the boost ratio α is selected in accordance with the modulation index ks of the inverter 5 (the modulation index ks is a ratio of the output voltage amplitude Vo to the DC voltage Vdc), and the on-period for which the switch SL for accumulating energy in the reactor L4 is in conduction is set based on the boost ratio α and the power Pdc, Po, or Pi. Thus, the capacitor C4 is charged with the boost ratio α according to the modulation index ks, i.e., with the voltage Vc.

The larger the power Pdc, Po, or Pi is, the larger the output voltage amplitude Vo is. The larger the voltage Vc is, the larger the DC voltage Vdc is. Therefore, the modulation index ks is desirably high when the power Pdc, Po, or Pi is large. For example, the boost ratio α set when the modulation index ks is less than the third threshold is smaller than the boost ratio α set when the modulation index ks is greater than or equal to the fourth threshold (the fourth threshold is greater than or equal to the third threshold).

If the input power factor ξ100 decreases, the converted power factor ξ4 is improved by decreasing the boost ratio α. Consequently, the input power factor ξ100 is improved.

When the power Pdc, Pi, or Po is large or when the modulation index ks is large, the DC voltage Vdc is desirably increased by increasing the boost ratio α and consequently increasing the voltage Vc (the voltage utilization factor R improves).

Second Embodiment

As described above, when a loss caused in power conversion in the inverter 5 is ignored, the power Pdc is equal to all of the DC voltage input to the inverter 5, the average value of the instantaneous power Pout, the Power Pi, and the power Po. Thus, as in the first embodiment, description will be given using the power Po below also in the present embodiment.

For example, "Single-Phase Twice voltage PFC Converter for air conditioner", IEEJ Transactions on Industry Applications, Vol. 119 No. 5 (1999) indicates that the larger the power input to the power-factor improving circuit is, the more the power factor is improved.

When the discharge duty dc is equal to 1, the current irec1 does not flow (irec1=0), and all the current irec flows into the charge circuit 4b as the current iL. The input power factor of the direct power converter 100 in such a case can regarded to be the same as the power factor of the power-factor improving circuit of "Single-Phase Twice voltage PFC Converter for air conditioner", IEEJ Transactions on Industry Applications, Vol. 119 No. 5 (1999).

As described above, a value obtained by converting the conduction period of the reverse current blocking circuit 8 into the input power factor of the direct power converter 100 is equal to 1. Thus, Equation (11) holds for apparent power similarly to Equation (9), introducing an input power factor ξ1 of the direct power converter 100 when dc=1 holds and an input power factor ξ0 of the direct power converter 100 when the instantaneous power Pin is equally divided into two, i.e., the instantaneous power Prec1 and PL.

$$2/\xi 0 = 1/\xi 1 + 1/1 \tag{11}$$

The current irec is obtained through full-wave rectification of the current Iin by the converter 3. Thus, the input power factor ξ1 is determined by a current (Iin−irec1) (in a period in which the current Iin is positive) or a current (Iin+irec1) (in a period in which the current Iin is negative), and the AC voltage Vin.

Equation (12) is obtained from Equation (11). Equation (12) indicates that an improvement in the input power factor ξ1 provides an improvement in the input power factor ξ0.

$$\xi 0 = 2/(1/\xi 1 + 1) \tag{12}$$

Thus, the present embodiment discloses control for setting the receiving power PL input to the power buffer circuit 4 to be larger when the power Po is small than when the power Po is large. Such control improves the input power factor ξ1 and consequently leads to avoidance of a marked decrease in the input power factor ξ0 also when the power Po is small.

As an extreme example thereof, description will be given below of a case where Equation (8) is satisfied by setting dc<1 when the power Po is large and Equation (13) is satisfied by setting dc=1 when the power Po is small. When dc=1, the instantaneous power Prec1 is equal to 0 and serves as the buffering power Pbuf. The power buffer circuit 4 of the direct power converter 100 is adopted as the power-factor improving circuit.

$$Pin = PL = Pc = Pdc \tag{13}$$

Figure 26:
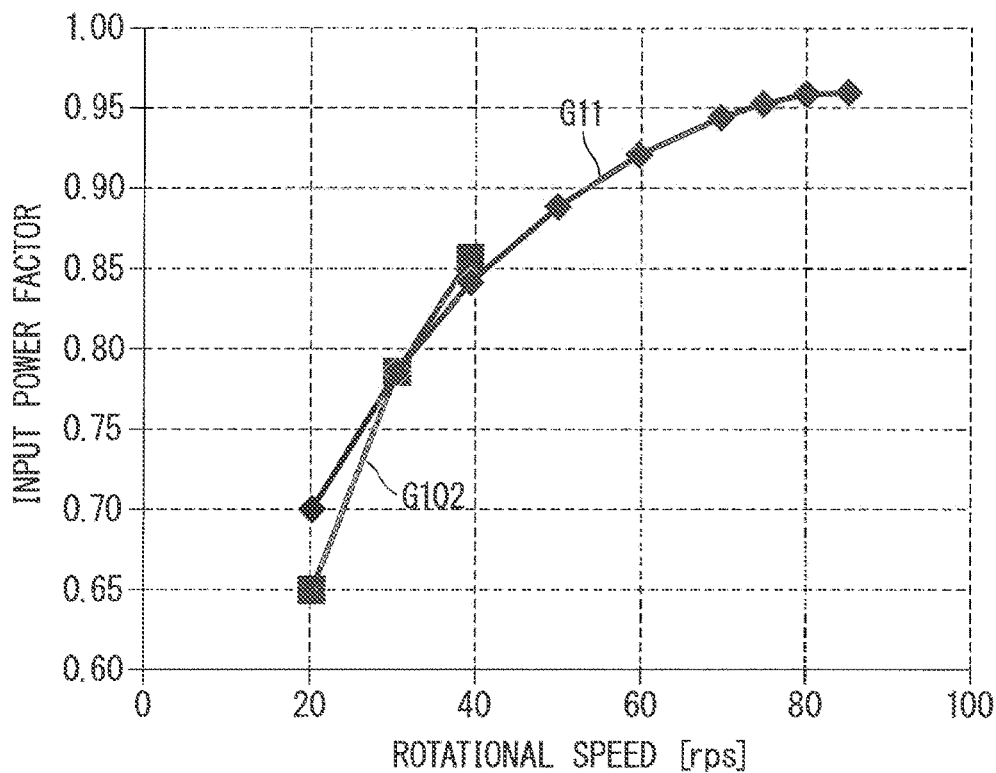
FIG. 26 is a graph illustrating a relationship between a rotational speed and an input power factor of a direct power converter in a second embodiment.

FIG. 26 is a graph illustrating a relationship between the rotational speed and the input power factor of the direct power converter 100. FIG. 26 is an example of the graph obtained in the case of J=0.075.

In FIG. 26, the line G11 illustrates the case where Equations (5) and (8) are satisfied when the boost ratio α is equal to 1.14 independently of the rotational speed (the line G11 in FIG. 4 is illustrated again). A line G102 illustrates a case where Equation (13) is satisfied by setting dc=1 when the boost ratio α is equal to 1.05 and the rotational speed is less than 40 rps (specifically, when the rotational speed is greater than or equal to 20 rps and less than or equal to 39 rps).

When dc=1, the input power factor of the direct power converter 100 is equal to 41. Since the input power factor ξ100 exemplifies the case where the instantaneous power Pin is equally divided into two, i.e., the instantaneous power Prec1 and the instantaneous power PL in the first embodiment, 40=ξ100 holds in view of this example. The first embodiment indicates that the input power factor ξ100 is improved at a smaller boost ratio α.

Accordingly, the input power factor indicated by the line G102 should be improved not only at a point where the receiving power PL is increased but also at a point where the boost ratio α is decreased, compared with the input power factor indicated by the line G11.

However, while the line G102 indicates a higher input power factor than the line G11 when the rotational speed is equal to 39 rps, the input power factor indicated by the line G102 decreases when the rotational speed is equal to 20 rps.

A cause of such a phenomenon is considered that the reactor L4 is connected to the input side of the filter 2 and there is a period of a phase in which the current iL actually does not flow even in a phase after the conduction start phase when the charge accumulated in the capacitor C2 is not discharged. The presence of such a period decreases energy accumulated in the reactor L4.

Accordingly, the current iL is desirably made less affected by the capacitor C2. The conduction start phase is delayed in order to cause the current iL to flow after an elapse of a period longer than the discharge period of the capacitor C2 or than a reciprocal of the resonance frequency of the filter 2. By increasing the value of the coefficient J, the current iL is caused to flow after an elapse of a period longer than the discharge period of the capacitor C2 or than a reciprocal of the resonance frequency of the filter 2.

An improvement in the input power factor by increasing the conduction start phase angle is already described in the first embodiment through comparison between FIG. 4 and FIG. 8. The second embodiment also describes that the input power factor is improved by increasing the conduction start phase angle also in the case where the receiving power PL input to the power buffer circuit 4 is made larger when the power Po is small than when the power Po is large.

Figure 27:
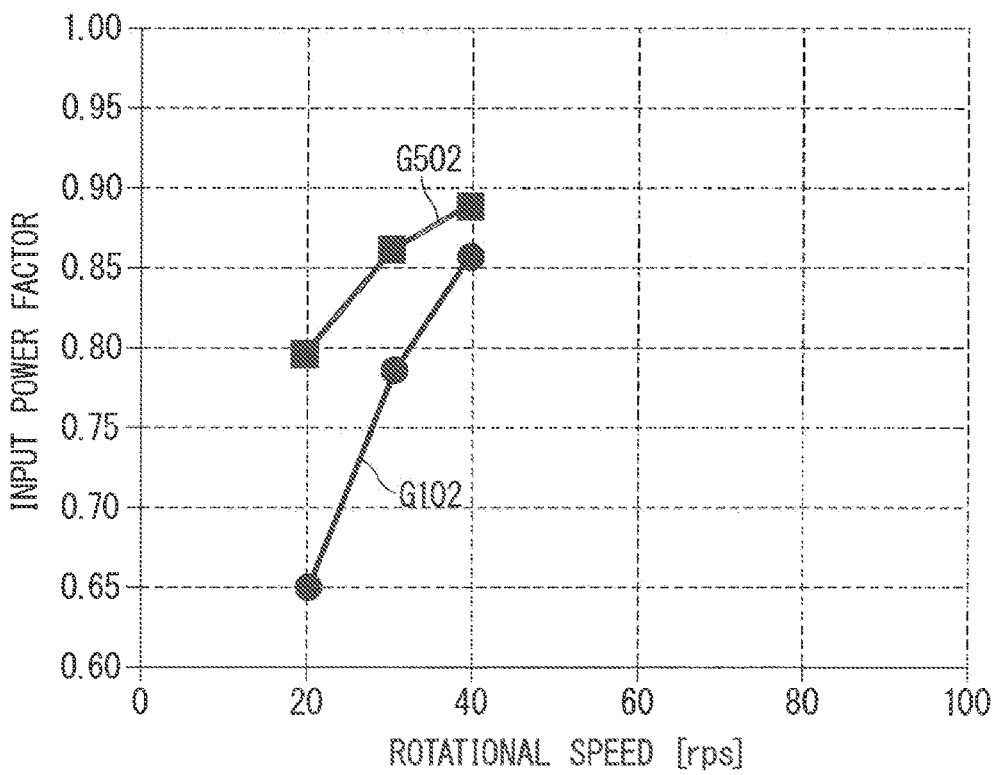
FIG. 27 is a graph illustrating a relationship between the rotational speed and the input power factor of the direct power converter in the second embodiment.

FIG. 27 is a graph illustrating a relationship between the rotational speed and the input power factor of the direct power converter. The line G102 in FIG. 26 is illustrated again as the line G102 in FIG. 27.

Both the line G102 and a line G502 indicate a case where Equation (13) is satisfied (dc=1) when the boost ratio α is equal to 1.05 and the rotational speed is less than 40 rps (specifically, when the rotational speed is greater than or equal to 20 rps and less than or equal to 39 rps). Note that the line G102 illustrates the case of J=0.075 similarly to the above case, whereas the line G502 illustrates the case of J=0.125. It is understood that the line G502 indicates a higher input power factor than the line G102 and the input power factor is improved particularly in a region where the power Po is low by increasing the conduction start phase angle also in the present embodiment.

Figure 28:
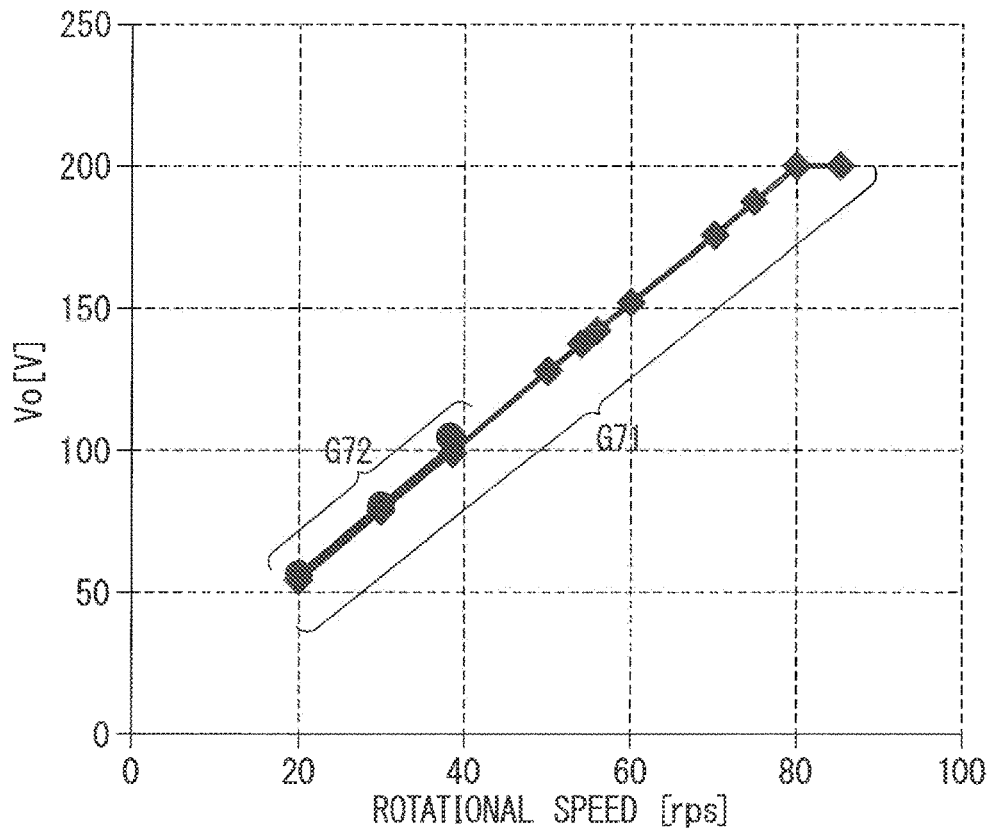
FIG. 28 is a graph illustrating a relationship between the rotational speed and an amplitude of a voltage applied to an inductive load in the second embodiment.
Figure 29:
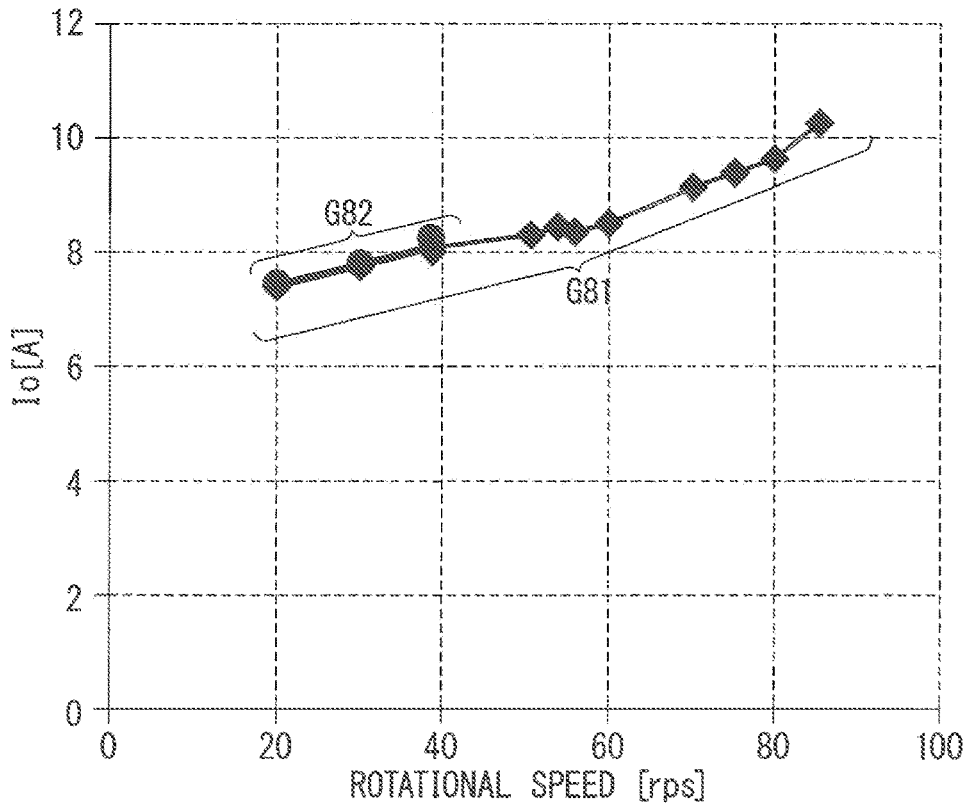
FIG. 29 is a graph illustrating a relationship between the rotational speed and an amplitude of a current that flows through the inductive load in the second embodiment.

FIG. 28 is a graph illustrating a relationship between the rotational speed and the output voltage amplitude Vo. FIG. 29 is a graph illustrating a relationship between the rotational speed and the output current amplitude Io. Both FIG. 28 and FIG. 29 illustrate the case where J=0.125 is adopted.

Both a line G71 and a line G81 indicates the case where Equation (5) and Equation (8) are satisfied (dc<1) independently of the rotational speed. Both a line G72 and a line G82 indicate the case where Equation (13) is satisfied (dc=1) when the rotational speed is less than 40 rps (specifically, when the rotational speed is greater than or equal to 20 rps and less than or equal to 39 rps). The line G72 and G82 are hardly different between the boost ratio α of 1.14 and the boost ratio α of 1.05.

The line G72 partially coincides with the line G71, and the line G82 partially coincides with the line G81. This indicates that neither the voltage applied to the inductive load 6 nor the current supplied to the inductive load 6 is dependent on the discharge duty dc and the boost ratio α. In other words, it is understood that the voltage utilization factor R and output characteristics of the inverter 5 are not affected by the discharge duty dc and the voltage Vc.

The dependency of the output voltage amplitude Vo on the rotational speed illustrated and the dependency of the output current amplitude Io on the rotational speed illustrated in in FIG. 28 and FIG. 29 mostly coincide with the dependency of the output voltage amplitude Vo on the rotational speed and the dependency of the output current amplitude Io on the rotational speed in the case of J=0.075 (see FIG. 6 and FIG. 7), respectively. In other words, an influence of the coefficient J on the output characteristics of the inverter 5 (accordingly, an influence of the conduction start phase) is small.

<Change in Circuit Configuration>

FIG. 30 is a circuit diagram illustrating part of the configuration of the direct power converter 100 according to the second embodiment. Differences between this configuration and the configuration of the direct power converter 100 according to the first embodiment illustrated in FIG. 1 are only the configuration of the converter 3 and a connection relationship among the converter 3, the filter 2, and the power buffer circuit 4. Thus, only the different portions are extracted and are illustrated in FIG. 30.

The converter 3 includes two diode bridges 3a and 3b each perform single-phase full-wave rectification. The diode bridge 3a has the same structure as the converter 3 illustrated in FIG. 1 and includes diodes D31, D32, D33, and D34. The diode bridge 3b includes diodes D32, D34, D35, and D36. FIG. 30 illustrates the case where the diodes D32 and D34 are adopted in both the diode bridge 3a and the diode bridge 3b.

The diode bridge 3b may include a diode connected in parallel with the diode D32, a diode connected in parallel with the diode D34, and the diodes D35 and D36. Such a structure is advantageous from the viewpoint of relaxing the rated currents required for the diodes D32 and D34.

Each of the diode bridges 3a and 3b has a pair of input terminals to which the AC voltage Vin is applied. The cathode of the diode D32 and the cathode of the diode D34 function as the pair of input terminals.

The diode bridge 3a has the high-potential terminal 3A and the low-potential terminal 3B, and these function as a pair of output terminals connected to the filter 2. The pair of output terminals of the diode bridge 3a applies the rectified voltage Vrec to the series connection of the reactor L2 and the capacitor C2. The current irec1 flows from the diode bridge 3a to the reverse current blocking circuit 8 through the filter 2.

The diode bridge 3b also has a pair of output terminals. One of the output terminals constituting the pair of output terminals is a connecting point 3C of the cathode of the diode D35 and the cathode of the diode D36. The other of the output terminals constituting the pair of output terminals is the low-potential terminal 3B. The pair of output terminals of the diode bridge 3b applies a rectified voltage Vrec2 to the charge circuit 4b. Similarly to the rectified voltage Vrec, the rectified voltage Vrec2 is a voltage obtained through single-phase full-wave rectification of the AC voltage Vin. The current iL flows from the diode bridge 3b to the charge circuit 4b.

The diodes D31 and D35 are connected in series with each other between the reactors L2 and L4 with the polarities inversed with each other. The diodes D33 and D36 are connected in series with each other between the reactors L2 and L4 with the polarities inversed with each other. Accordingly, the pair of output terminals of the diode bridge 3a and the pair of output terminals of the diode bridge 3b are not electrically connected to each other.

The above configuration allows the current iL to flow from the conduction start phase without waiting for discharging of the capacitor C2.

Figure 31:
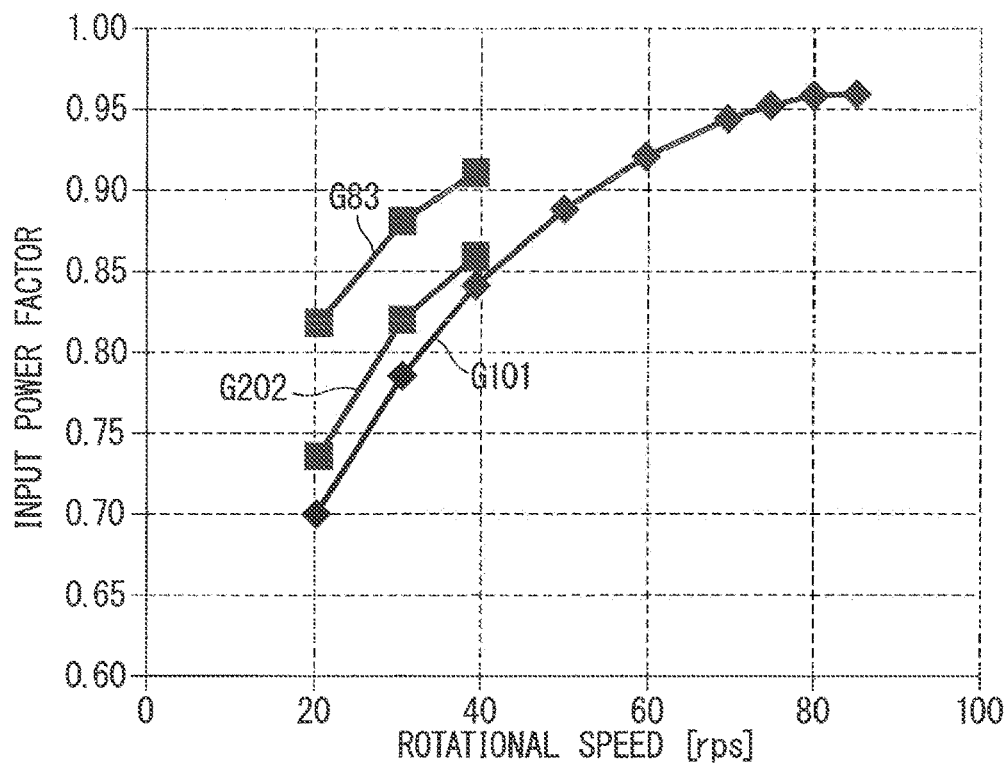
FIG. 31 is a graph illustrating a relationship between the rotational speed and the input power factor of the direct power converter in the second embodiment.

FIG. 31 is a graph illustrating a relationship between the rotational speed and the input power factor of the direct power converter 100. As in FIG. 26, the rotational speed of the rotary machine in the case where the inductive load 6 serves as the rotary machine is adopted for the horizontal axis of the graph in FIG. 31. FIG. 31 also illustrates a graph obtained when the coefficient J is equal to 0.075. FIG. 26 illustrates the case where the configuration illustrated in FIG. 1 (hereinafter, referred to as a "conventional configuration") is adopted as the converter 3, whereas FIG. 31 illustrates the case where the configuration illustrated in FIG. 30 (hereinafter, referred to as an "improved configuration") is adopted as the converter 3.

Similarly to the line G11 in FIG. 26, a line G101 in FIG. 31 illustrates the case where Equations (5) and (8) are satisfied when the boost ratio α is equal to 1.14 independently of the rotational speed. The line G101 indicating the case where the improved configuration is adopted in the converter 3 mostly coincides with the line G11 indicating the case where the conventional configuration is adopted in the converter 3. The reason of this is presumed that the influence of the configuration of the converter 3 on the input power factor is small when the instantaneous power Pin is equally divided into two, i.e., the instantaneous power Prec1 and the instantaneous power PL.

In FIG. 31, a line G202 illustrates the case where Equation (13) is satisfied by setting dc=1 when the boost ratio α is equal to 1.14 and the rotational speed is less than 40 rps (specifically, when the rotational speed is greater than or equal to 20 rps and less than or equal to 39 rps).

Unlike the line G102 illustrated in FIG. 26, the line G202 indicates that the power factor is improved when the rotational speed is less than 40 rps. Comparison between the line G101 and the line G202 indicates that when the improved configuration is adopted in the converter 3, the input power factor is improved at a larger discharge duty dc even if the coefficient J takes the same small value (J=0.075 in this case) and the boost ratio α is the same.

In FIG. 31, a line G83 illustrates the input power factor obtained by setting dc=1 and decreasing the boost ratio α when the rotational speed is less than 40 rps (specifically, when the rotational speed is greater than or equal to 20 rps and less than or equal to 39 rps). Decreasing the boost ratio α corresponds to decreasing the voltage Vc. Decreasing the voltage Vc is implemented by decreasing the conduction end phase. Specifically, the line G83 indicates the case where the boost ratio α is equal to 1.05.

It is understood from comparison of the line G102 and the line G83 both of which indicate the case of dc=1 that the input power factor is improved more when the improved configuration is adopted in the converter 3 than when the conventional configuration is adopted in the converter 3 even if the rotational speed is the same, the boost ratio α is the same (α=1.05 in this case), and the coefficient J is the same (J=0.075 in this case).

It is understood from comparison of the line G202 and the line G83 both of which indicate the case of dc=1 that the input power factor of the direct power converter 100 is improved by decreasing the boost ratio α if the rotational speed is the same. This improvement matches the tendency, indicated by "Single-Phase Twice voltage PFC Converter for air conditioner", IEEJ Transactions on Industry Applications, Vol. 119 No. 5 (1999), that the power factor is improved more as the voltage obtained by boosting is smaller if the power input to the power-factor improving circuit is the same.

Figure 32:
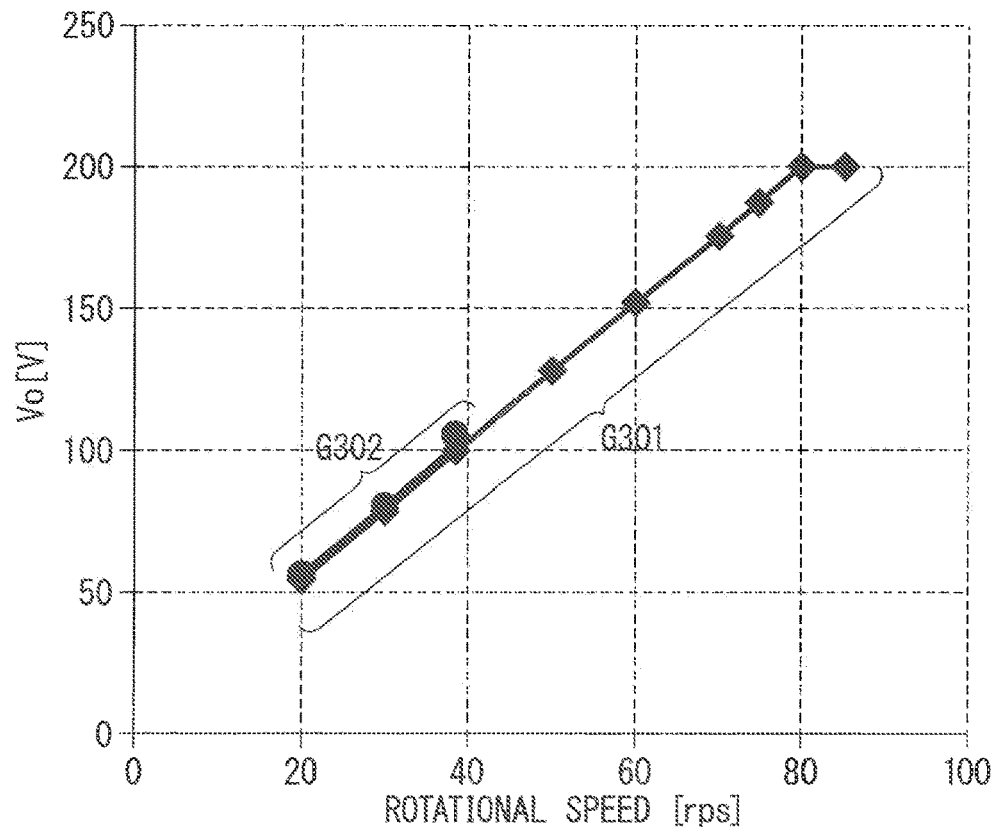
FIG. 32 is a graph illustrating a relationship between the rotational speed and the amplitude of the voltage applied to an inductive load in the second embodiment.
Figure 33:
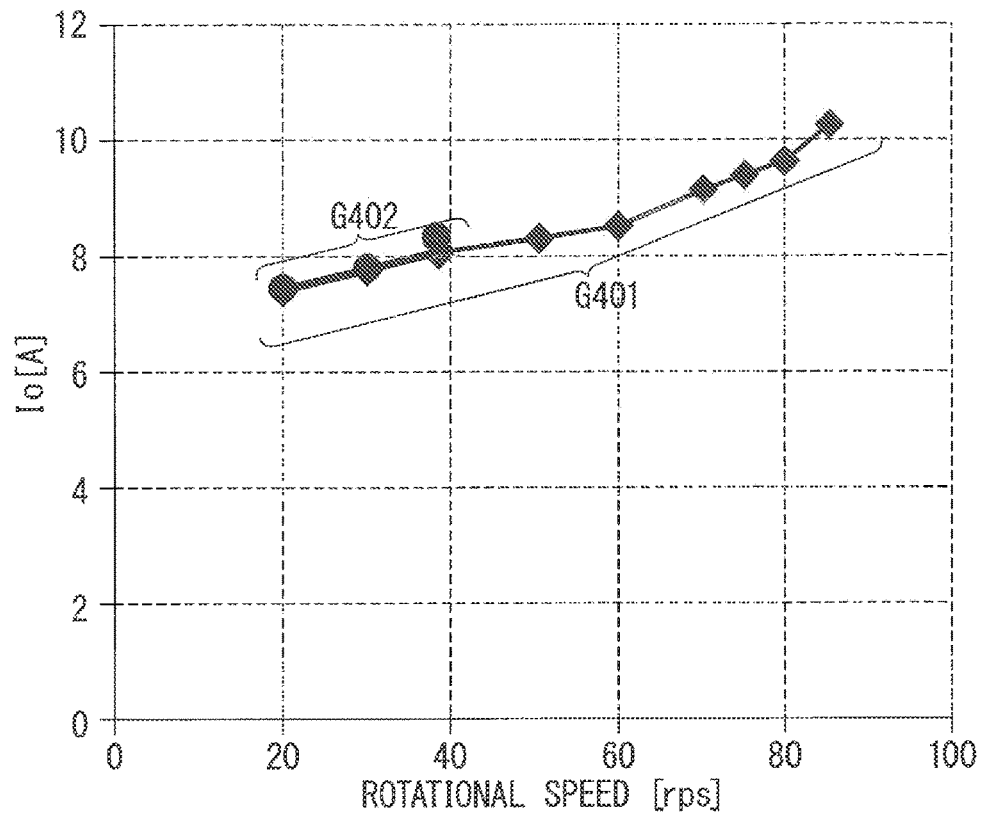
FIG. 33 is a graph illustrating a relationship between the rotational speed and the amplitude of the current that flows through the inductive load in the second embodiment.

FIG. 32 is a graph illustrating a relationship between the rotational speed and the output voltage amplitude Vo. FIG. 33 is a graph illustrating a relationship between the rotational speed and the output current amplitude Io. Both FIG. 32 and FIG. 33 illustrate the case where the coefficient J is equal to 0.075 and the improved configuration is adopted in the converter 3.

Both a line G301 and a line G401 illustrate the case where Equation (5) and Equation (8) are satisfied (dc<1) independently of the rotational speed. Both a line G302 and a line G402 illustrate the case where Equation (13) is satisfied (dc=1) when the rotational speed is less than 40 rps (specifically, when the rotational speed is greater than or equal to 20 rps and less than or equal to 39 rps). The line G302 and G402 are hardly different between the boost ratio α of 1.14 and the boost ratio α of 1.05.

The line G302 partially coincides with the line G301. The line G402 partially coincides with the line G401. Such a coincidence indicates that neither the voltage applied to the inductive load 6 nor the current supplied to the inductive load 6 is dependent on the discharge duty dc and the boost ratio α. In other words, an influence of the discharge duty dc and the voltage Vc on the output characteristics of the inverter 5 is small.

Both the dependency of the output voltage amplitude Vo on the rotational speed and the dependency of the output current amplitude Io on the rotational speed in the present embodiment mostly coincide with those in the first embodiment (see FIG. 6 and FIG. 7) and with those in the case where the conventional configuration is adopted in the converter 3 (FIG. 28 and FIG. 29). Thus, it is understood that an influence of the configuration of the converter 3 on the output characteristics of the inverter 5 is small.

Figure 34:
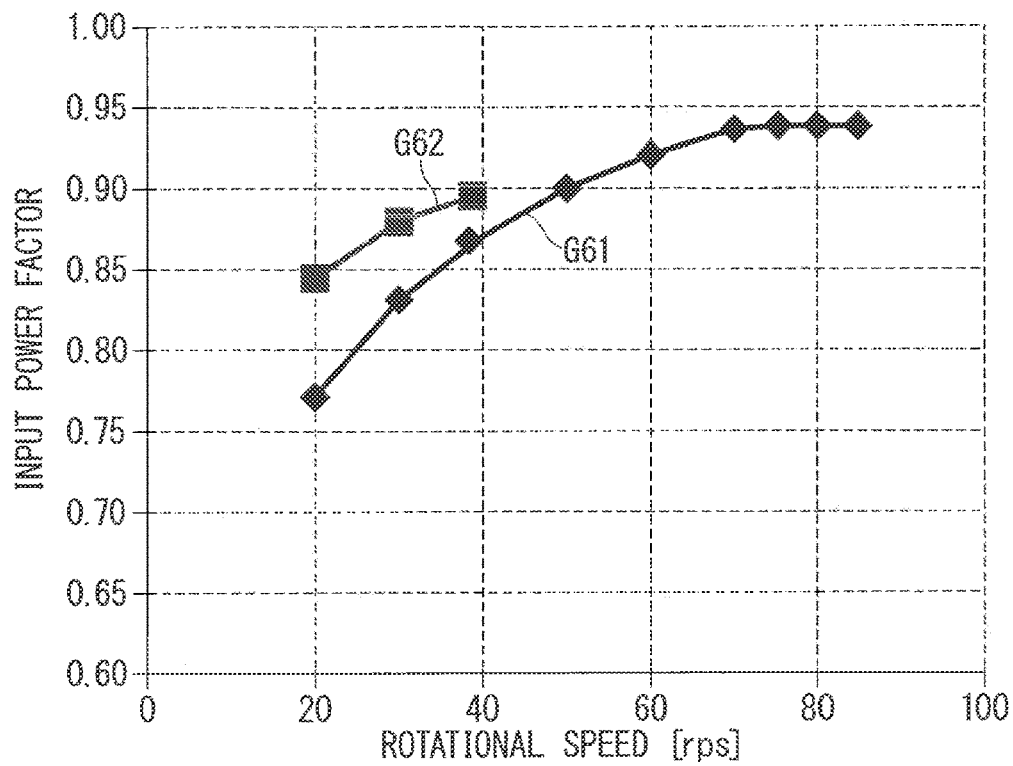
FIG. 34 is a graph illustrating a relationship between the rotational speed and the input power factor of the direct power converter in the second embodiment.

FIG. 34 is a graph illustrating a relationship between the rotational speed and the input power factor of the direct power converter 100. FIG. 34 is common to FIG. 31 in that FIG. 34 illustrates the case where the improved configuration is adopted in the converter 3 and is different from FIG. 31 (which illustrates the case of J=0.075) in that FIG. 34 illustrates the case of J=0.125.

In FIG. 34, a line G61 illustrates the case where Equation (5) and Equation (8) are satisfied independently of the rotational speed when the boost ratio α is equal to 1.14. The line G61 mostly coincides with the line G51 (see FIG. 8) for the case where Equation (5) and Equation (8) are satisfied independently of the rotational speed when the boost ratio α is equal to 1.14 and where the conventional configuration is adopted in the converter 3. The reason for this is presumed to be the same as the reason why the line G101 (FIG. 31) mostly coincides with the line G11 (FIG. 26).

The line G62 indicates the case where Equation (13) is satisfied by setting dc=1 when the rotational speed is less than 40 rps (specifically, when the rotational speed is greater than or equal to 20 rps and less than or equal to 39 rps). Note that the boost ratio α is equal to 1.05.

In FIG. 34, the line G62 indicates a higher input power factor than the line G61. This is substantially the same as that the line G83 indicates a higher input power factor than the line G101 in FIG. 31.

Figure 35:
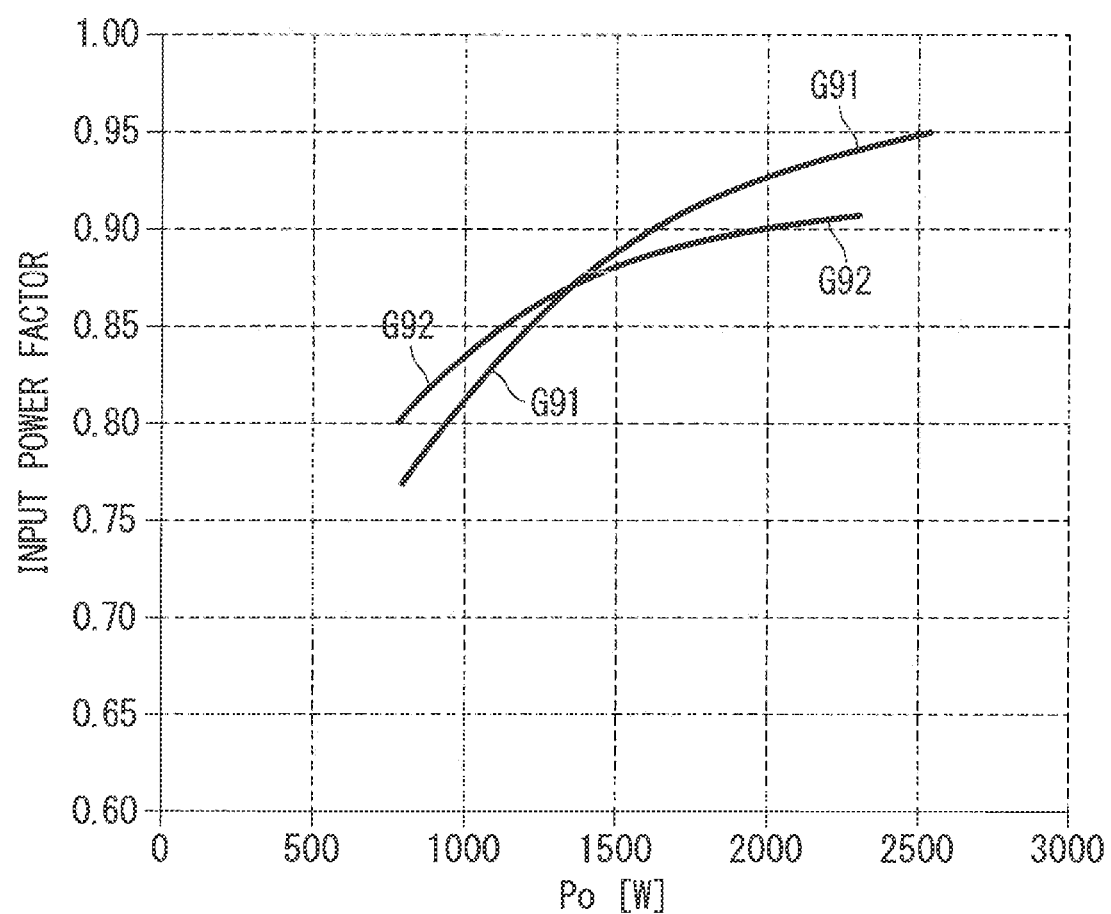
FIG. 35 is a graph illustrating a relationship between an average value of receiving power and the input power factor of the direct power converter in the second embodiment.

FIG. 35 is a graph illustrating a relationship between the average value (=Po) of the receiving power PL and the input power factor in the case where Equation (13) is satisfied (dc=1) independently of the rotational speed. Note that 1.14 is adopted as the boost ratio α. A curve G91 indicates the case of J=0.075. A curve G92 indicates the case of J=0.125. It is understood also from this graph that the input power factor is improved by delaying the conduction start phase in a region where the power Po is small.

Figure 36:
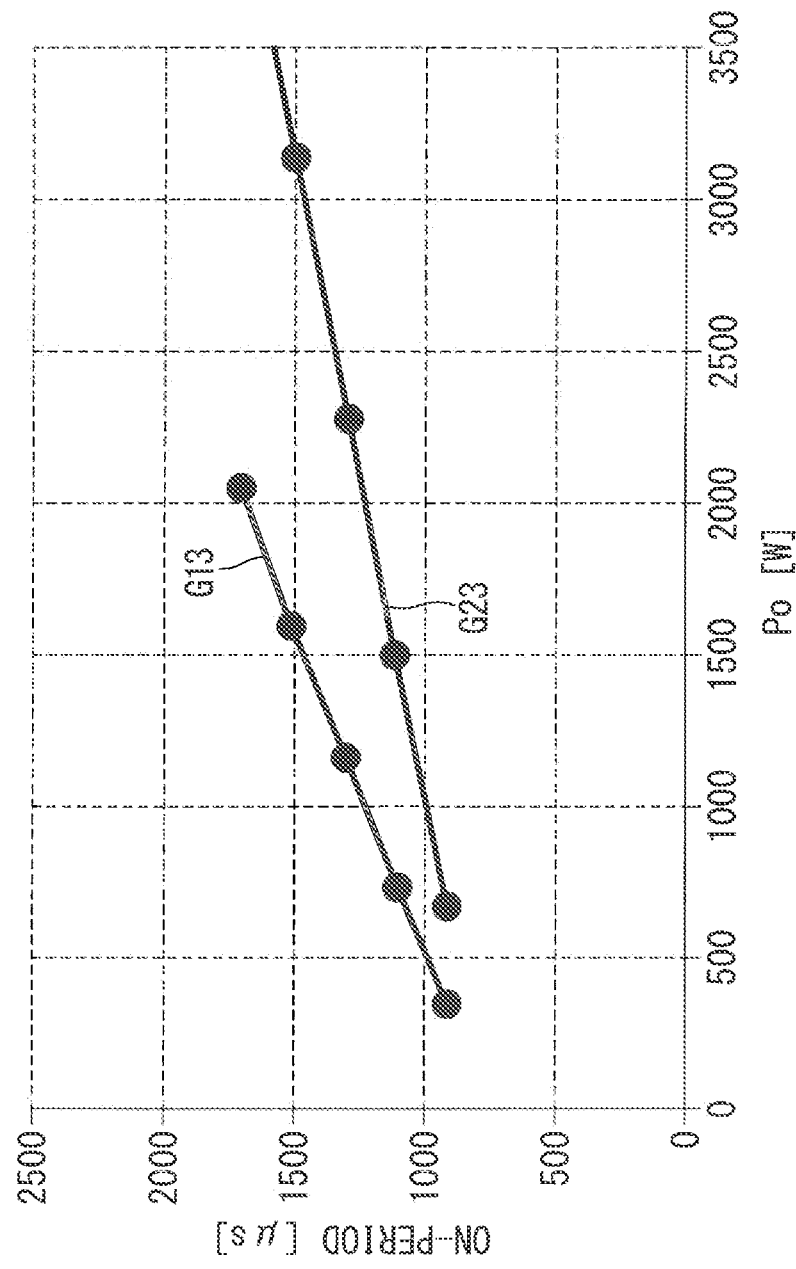
FIG. 36 is a graph illustrating a relationship between an on-period and power to be converted by an inverter in the second embodiment.
Figure 37:
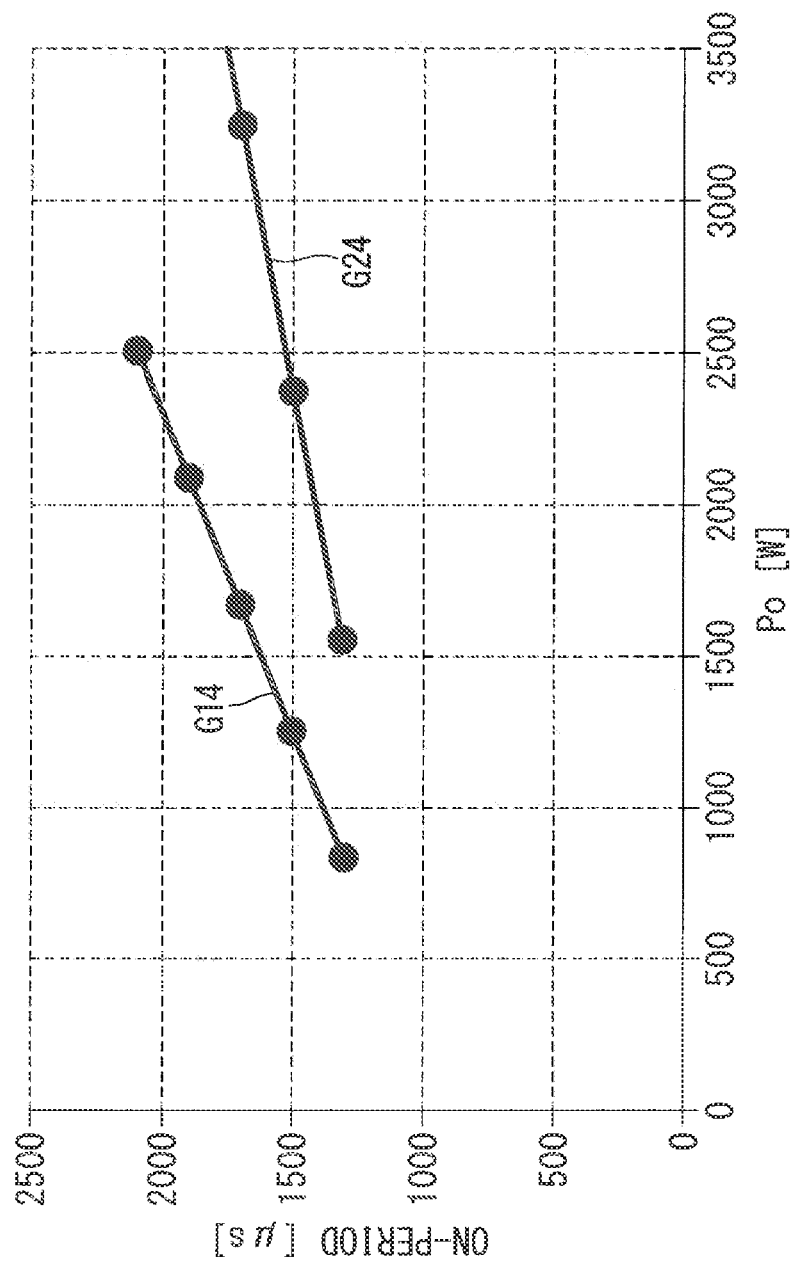
FIG. 37 is a graph illustrating a relationship between the on-period and the power to be converted by the inverter in the second embodiment.
Figure 39:
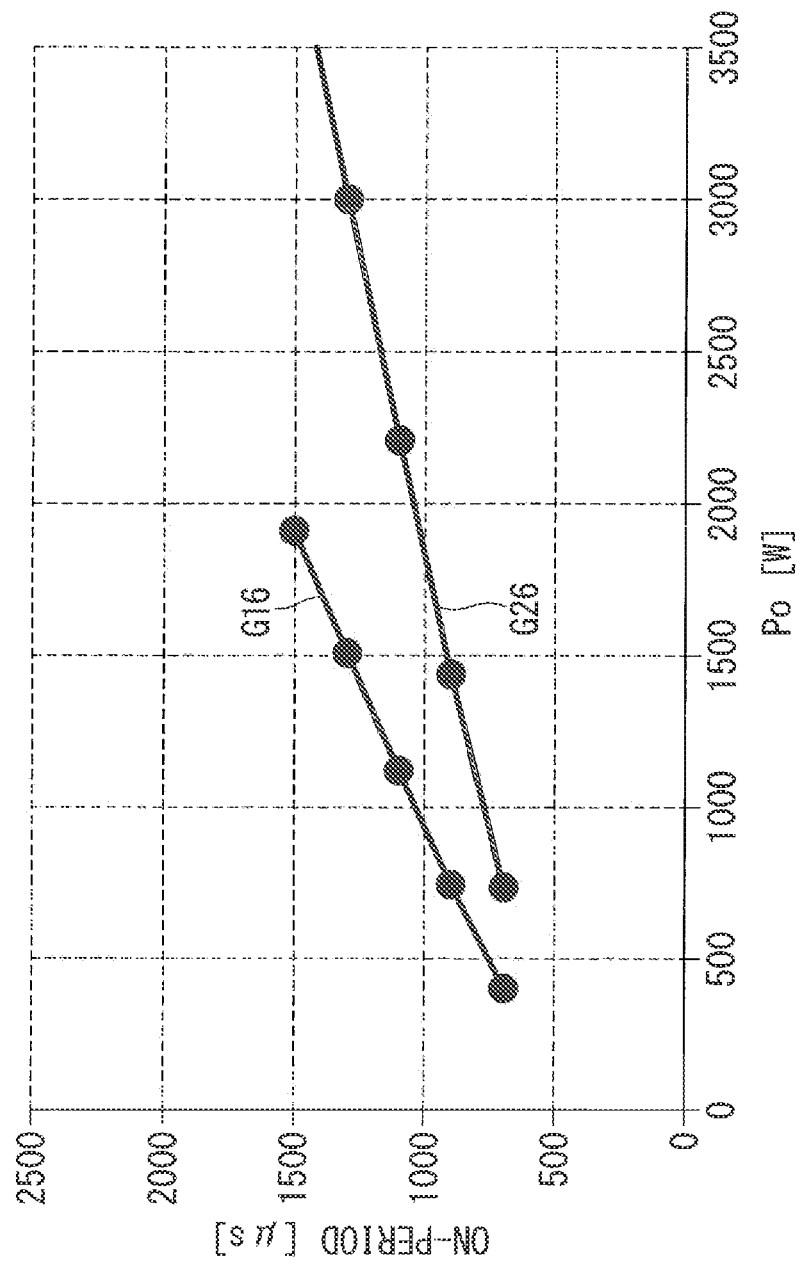
FIG. 39 is a graph illustrating a relationship between the on-period and the power to be converted by the inverter in the second embodiment.

FIG. 36 to FIG. 39 are graphs illustrating a relationship between the on-period and the power Po. FIG. 36 and FIG. 37 illustrate the case of J=0.075. FIG. 38 and FIG. 39 illustrate the case of J=0.125. FIG. 36 and FIG. 38 illustrate the case of α=1.05. FIG. 37 and FIG. 39 illustrate the case of α=1.14. All of FIG. 36 to FIG. 39 illustrate the case where the improved configuration is adopted in the converter 3.

The on-period is based on power input to the power-factor improving circuit in "Single-Phase Twice voltage PFC Converter for air conditioner", IEEJ Transactions on Industry Applications, Vol. 119 No. 5 (1999). However, in the present embodiment, the on-period is determined based on power (the power Po in this case) converted by the inverter 5. In view of Equation (5), the average value of the receiving power PL is a half value (Po/2) of the power Po when Equation (8) holds. On the other hand, the average value of the receiving power PL is equal to the power Po when Equation (13) holds.

Thus, in FIG. 36 to FIG. 39, the case where Equation (13) holds is illustrated by lines G13, G14, G15, and G16, and the case where Equation (8) holds is illustrated by lines G23, G24, G25, and G26.

The power Po that requires the on-period illustrated by line G13 is a half value of the power Po that requires the on-period illustrated by the line G23. The power Po that requires the on-period illustrated by the line G14 is a half value of the power Po that requires the on-period illustrated by the line G24. The power Po that requires the on-period illustrated by the line G15 is a half value of the power Po that requires the on-period illustrated by the line G25. The power Po that requires the on-period illustrated by the line G16 is a half value of the power Po that requires the on-period illustrated by the line G26.

For example, a case is assumed in which Equation (5) and Equation (8) hold (the average value of the receiving power PL in this case is a half value of the power Po) by setting dc<1 if the power Po is greater than or equal to 1400 [W] (equivalent to the rotational speed of about 40 [rps]) and Equation (13) holds (the average value of the receiving power PL in this case is equal to the power Po) by setting dc=1 if the power Po is less than 1400 [W]. In this case, if the power Po is greater than or equal to 1400 [W], the on-period is determined based on the lines G23, G24, G25, and G26. If the power Po is less than 1400 [W], the on-period is determined based on the lines G13, G14, G15, and G16.

It is understood from comparison between FIG. 36 and FIG. 37 or comparison between FIG. 38 and FIG. 39 that the on-period is longer at a larger boost ratio α. It is considered that such a long on-period is owing to the voltage Vc being generated as a result of charging of the capacitor C4. It is also understood from comparison between FIG. 36 and FIG.

38 or comparison between FIG. 37 and FIG. 39 that the on-period is shorter at a larger conduction start phase. It is considered that such a short on-period is owing to the current iL being caused to flow by the larger rectified voltage Vrec at a larger conduction start phase.

The on-period corresponding to the power Po is determined using the graph illustrated in FIG. 36 or FIG. 37. The on-period corresponding to the power Po and to the boost ratio α is determined using the graphs of FIG. 36 and FIG. 37. The on-period is determined in the similar manner also using the graphs illustrated in FIG. 38 and FIG. 39.

The predetermined threshold compared with the power Po may be set as a range having a predetermined width. Specifically, the discharge duty dc set when the power Po (the power Pi may be used or the power Pdc may be used instead of the power Po as described above) is less than the first threshold may be larger than the discharge duty dc set when the power Po is greater than or equal to the second threshold that is greater than or equal to the first threshold. For example, Equation (13) may hold as a result of the discharge duty dc becoming equal to 1 when the power Po decreases to be less than the second threshold. Equation (5) and Equation (8) may hold as a result of the discharge duty dc becoming less than 1 when the power Po increases to be greater than or equal to the first threshold. In this case, the predetermined threshold can be considered to have a width from the first threshold to the second threshold.

Figure 40:
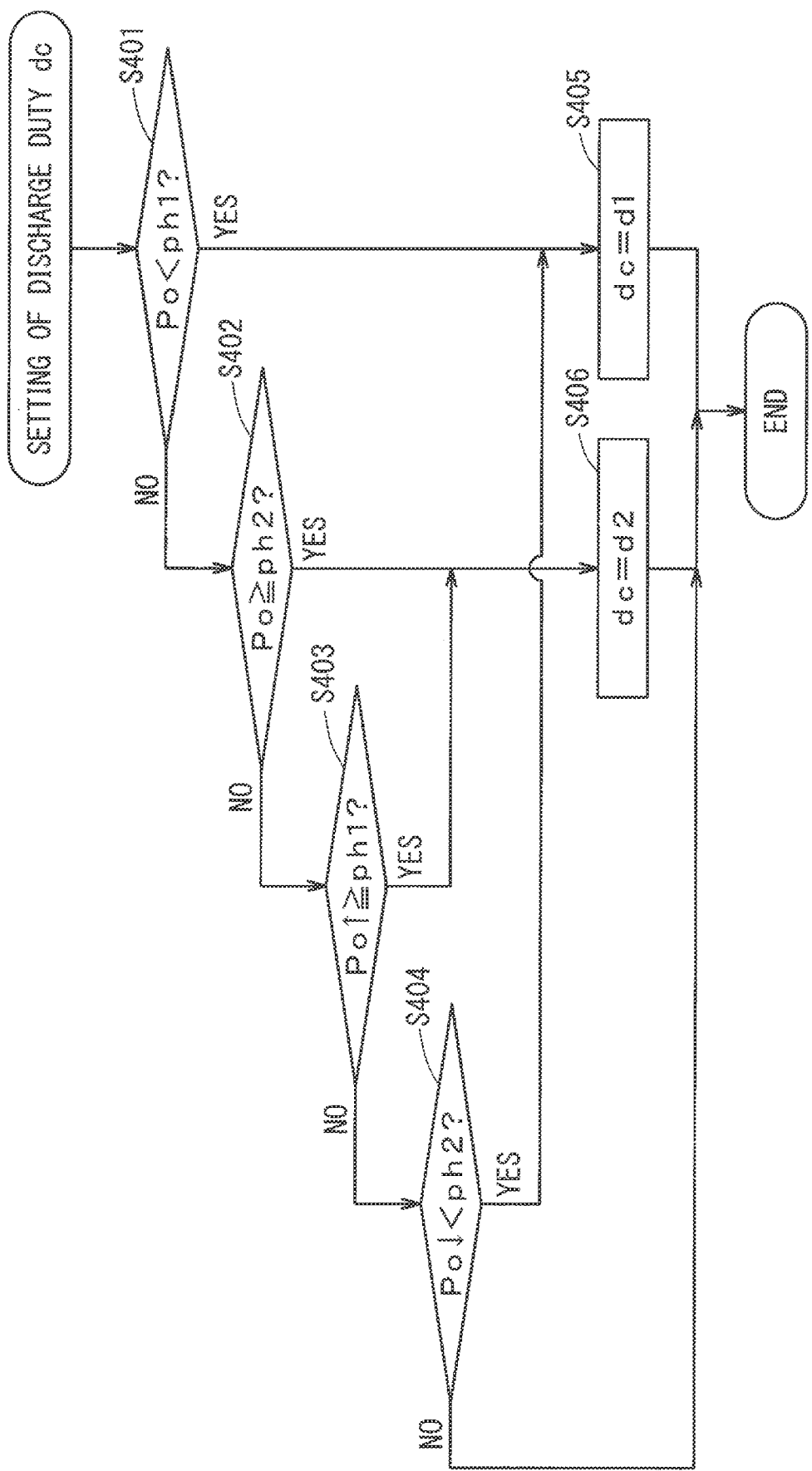
FIG. 40 is a flowchart illustrating a process of setting a discharge duty in the second embodiment.

FIG. 40 is a flowchart illustrating a process of setting the discharge duty dc. In step S401, it is determined whether the power Po is less than the first threshold ph1. If the power Po is less than the first threshold ph1, the discharge duty dc is set to a value d1 in step S405. In the example described above, d1=1. After step S405 is performed, the process illustrated in this flowchart ends.

If it is determined in step S401 that the power Po is not less than the first threshold ph1 (the power Po is greater than or equal to the first threshold ph1), step S402 is performed. In step S402, it is determined whether the power Po is greater than or equal to the second threshold ph2 (≥ph1). If the power Po is greater than or equal to the second threshold ph2, the discharge duty dc is set to a value d2 (<d1) in step S406. In example described above, d2<1 holds and the value d2 is a value of the discharge duty dc that satisfies Equation (5) and Equation (8). After step S406 is performed, the process illustrated in this flowchart ends.

If it is determined in step S402 that the power Po is not greater than or equal to the second threshold ph2 (the power Po is less than the second threshold ph2), step S403 is performed. In step S403, it is determined whether the power Po increases to be greater than or equal to the first threshold ph1. If the power Po increases to be greater than or equal to the first threshold ph1, step S406 is performed in which the discharge duty dc is set to the value d2.

If it is not determined in step S403 that the power Po increases to be greater than or equal to the first threshold ph1, step S404 is performed. In step S404, it is determined whether the power Po decreases to be less than the second threshold ph2. If the power Po decreases to be less than the second threshold ph2, step S405 is performed in which the discharge duty dc is set to the value d1.

The case where a negative result is obtained for determination in all of steps S401, S402, S403, and S404 is not handled in the process illustrated in the flowchart of FIG. 40, and the process ends. In this case, for example, the processing may be performed to maintain the discharge duty do at the current value.

Likewise, steps S403 and S404 may be omitted and the case where a negative result is obtained for determination in both steps S401 and S402 is not handled in the process illustrated in the flowchart of FIG. 40, and the process may end. Also in this case, for example, the processing may be performed to maintain the discharge duty do at the current value.

Similarly to the first embodiment, the discharge duty do set when the modulation index ks is less than the third threshold may be larger than the discharge duty dc set when the modulation index ks is greater than or equal to the fourth threshold that is greater than or equal to the third threshold. For example, Equation (13) may hold as a result of the discharge duty dc becoming equal to 1 when the modulation index ks decreases to be less than the fourth threshold. Equation (5) and Equation (8) may hold as a result of the discharge duty dc becoming less than 1 when the modulation index ks increases to be greater than or equal to the third threshold.

<Calculation of On-Period for Each Discharge Duty>

Figure 41:
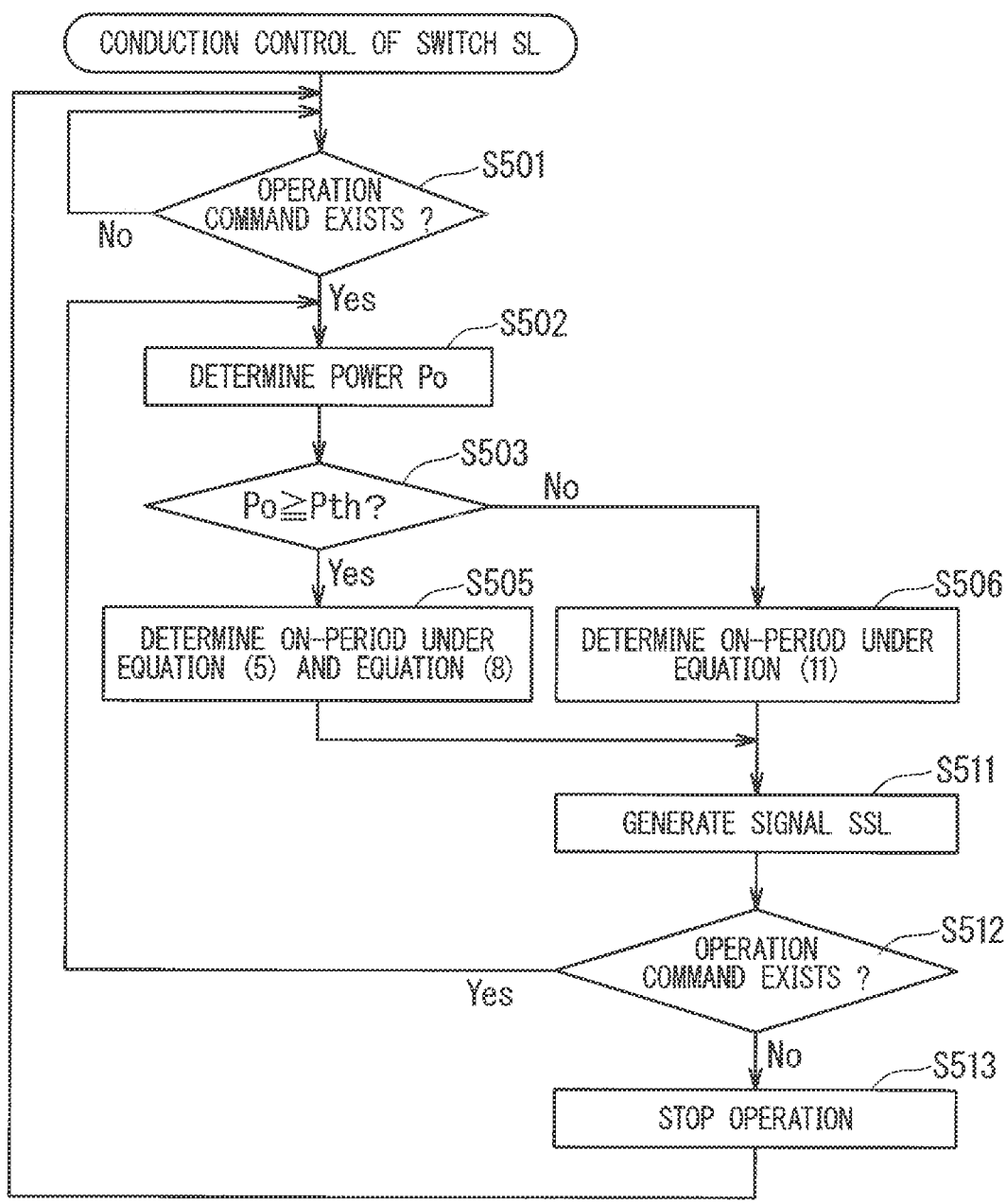
FIG. 41 is a flowchart illustrating a process of controlling conduction of a switch in the second embodiment.

FIG. 41 is a flowchart illustrating a process of controlling conduction of the switch SL. In step S501, it is determined whether there is an operation command. If there is no operation command, step S501 is repeatedly performed. If there is an operation command, the process proceeds to step S502 in which the power Po is determined through calculation. As described later, there is a flow in which step S502 is performed other than a flow in which step S502 is performed after the performance of step S501.

After step S502 is performed, it is determined in step S503 whether the power Po is greater than or equal to a threshold Pth. If the power Po is greater than or equal to the threshold Pth, the process proceeds to step S505 in which the on-period is determined under Equation (5) and Equation (8). When the power Po is less than the threshold Pth, step S506 is executed in which the on-period is determined under Equation (13).

As described above, the threshold Pth may have a width. In such a case, the result of the determination in step S503 does not matter when the power Po is in a range of the width. For example, when the power Po decreases to be less than the lower limit of the width (equivalent to the first threshold described above), the process may proceed to step S506 from step S503. When the power Po increases to be greater than or equal to the upper limit of the width (equivalent to the second threshold described above), the process may proceed to step S505 from step S503.

After either S505 or S506 is performed, the control signal SSL is generated in step S511.

After step S511 is performed, it is determined in step S512 whether there is an operation command. If there is no operation command, the operation of the direct power converter 100 stops in step S513. Step S501 is performed again to wait for an operation command.

If it is determined in step S512 that there is an operation command, step S502 is performed again.

Note that as indicated in FIG. 27, the input power factor is improved at a larger conduction start phase angle if the rotational speed is the same (if the power Po is the same) from comparison between the line G83 (FIG. 31) and the line G62 (FIG. 34) (particularly, when the rotational speed is less than 30 [rps]). Thus, in the case where the discharge duty dc is increased when the power Po is small, the conduction start phase angle may also be set to be large.

<Configuration Example of Control Device>

As described above, the input power factor is improved by setting the discharge duty dc to be larger when the power Po is small than when the power Po is large. As described using FIG. 36 to FIG. 39, the on-period is desirably determined based on the boost ratio α and the conduction start phase as well as the power Po. Description will be given below of the case of determining the on-period dependently on the power Po and the boost ratio α as an example.

Figure 42:
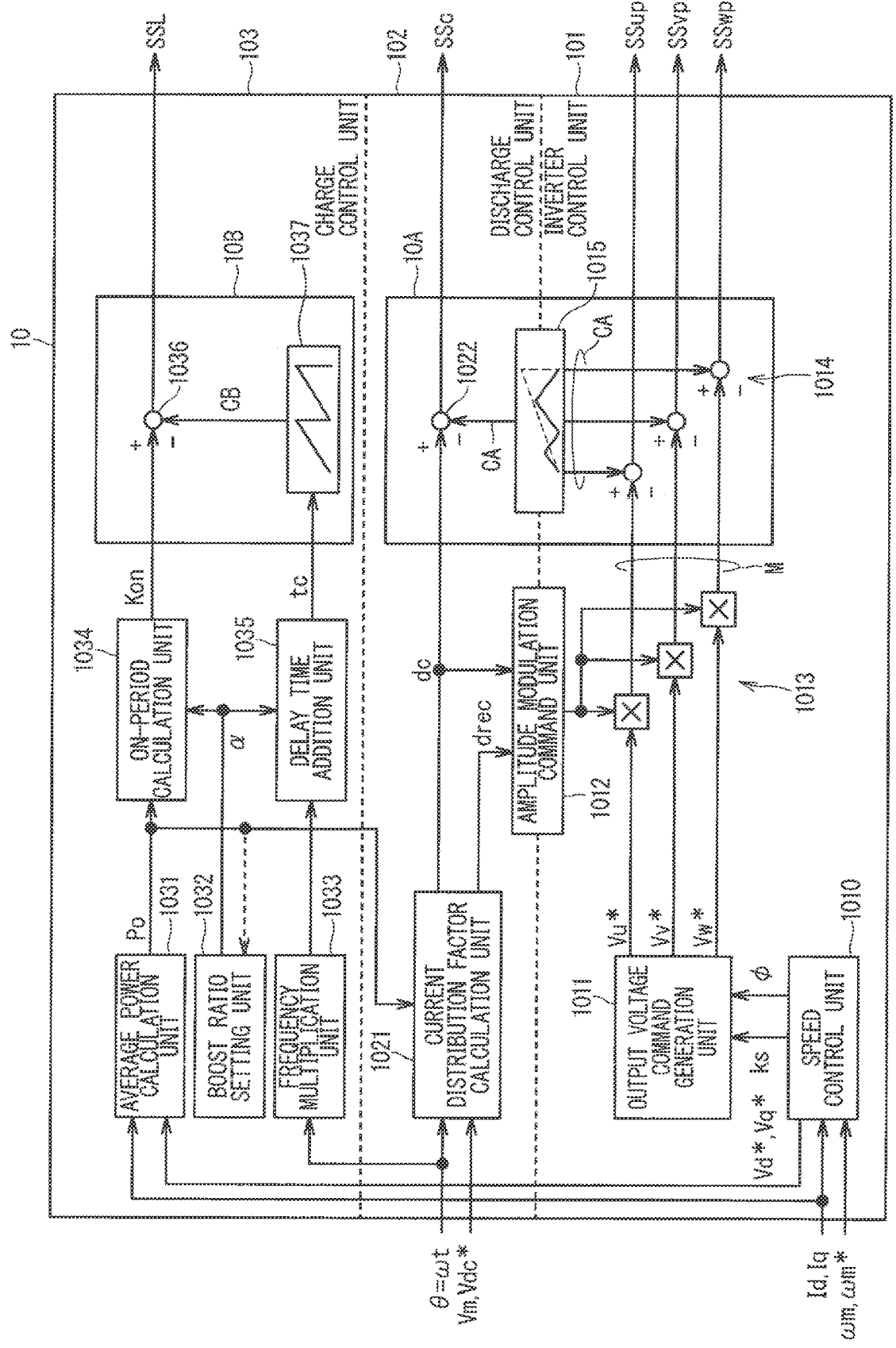
FIG. 42 is a block diagram illustrating a fourth configuration of a control device according to the second embodiment.

FIG. 42 is a block diagram illustrating the configuration of the control device 10 according to the present embodiment (also referred to as "a fourth configuration of the control device 10"). The fourth configuration differs from the second configuration of the control device 10 (see FIG. 24) in that the power Po is input to the current distribution factor calculation unit 1021 instead of the boost ratio setting unit 1032. The other constituent elements and functions are common to the second configuration of the control device 10 in the first embodiment.

This difference is caused because the boost ratio α set by the boost ratio setting unit 1032 is set smaller in the first embodiment but the discharge duty do set by the current distribution factor calculation unit 1021 is set larger in the second embodiment when the power Po is small than when the power Po is large.

In the present embodiment, the current distribution factor calculation unit 1021 sets the discharge duty dc based on comparison of the power Po with the threshold ph1 and with the threshold ph2 in accordance with the flowchart illustrated in FIG. 40, for example. In the present embodiment, the on-period calculation unit 1034 determines the on-period based on comparison of the power Po with the threshold Pth in accordance with the flowchart illustrated in FIG. 41, for example.

The input power factor tends to decrease as the power Po decreases. Thus, the discharge duty dc may be changed based on determination using the input power factor instead of the determination using the power Po, Pi, or Pdc.

Figure 43:
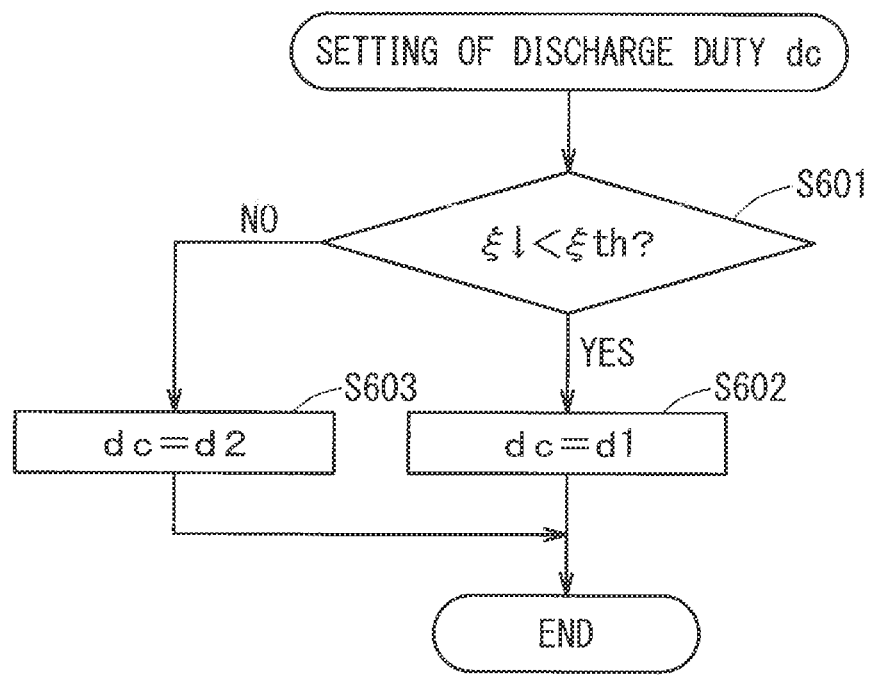
FIG. 43 is a flowchart illustrating another process of setting a discharge duty dc in the second embodiment.

FIG. 43 is a flowchart illustrating another process of setting the discharge duty dc. In step S601, it is determined whether the input power factor ξ of the direct power converter 100 decreases from a value greater than or equal to a predetermined threshold ξth to be less than the threshold ξth. If the result of the determination in step S601 is positive (if the input power factor ξdecreases to be less than the threshold ξth), step S602 is performed in which the discharge duty dc is set to the value d1. After step S602 is performed, the process illustrated in this flowchart ends.

If the result of the determination in step S601 is negative, step S603 is performed in which the discharge duty dc is set to the value d2. After step S603 is performed, the process illustrated in this flowchart ends.

As a result of the processing described above, if the discharge duty dc takes the value d2, and if the input power factor ξ decreases to be less than the value ξth, the discharge duty dc increases to the value d1. Consequently, the input power factor ξ is improved.

Figure 44:
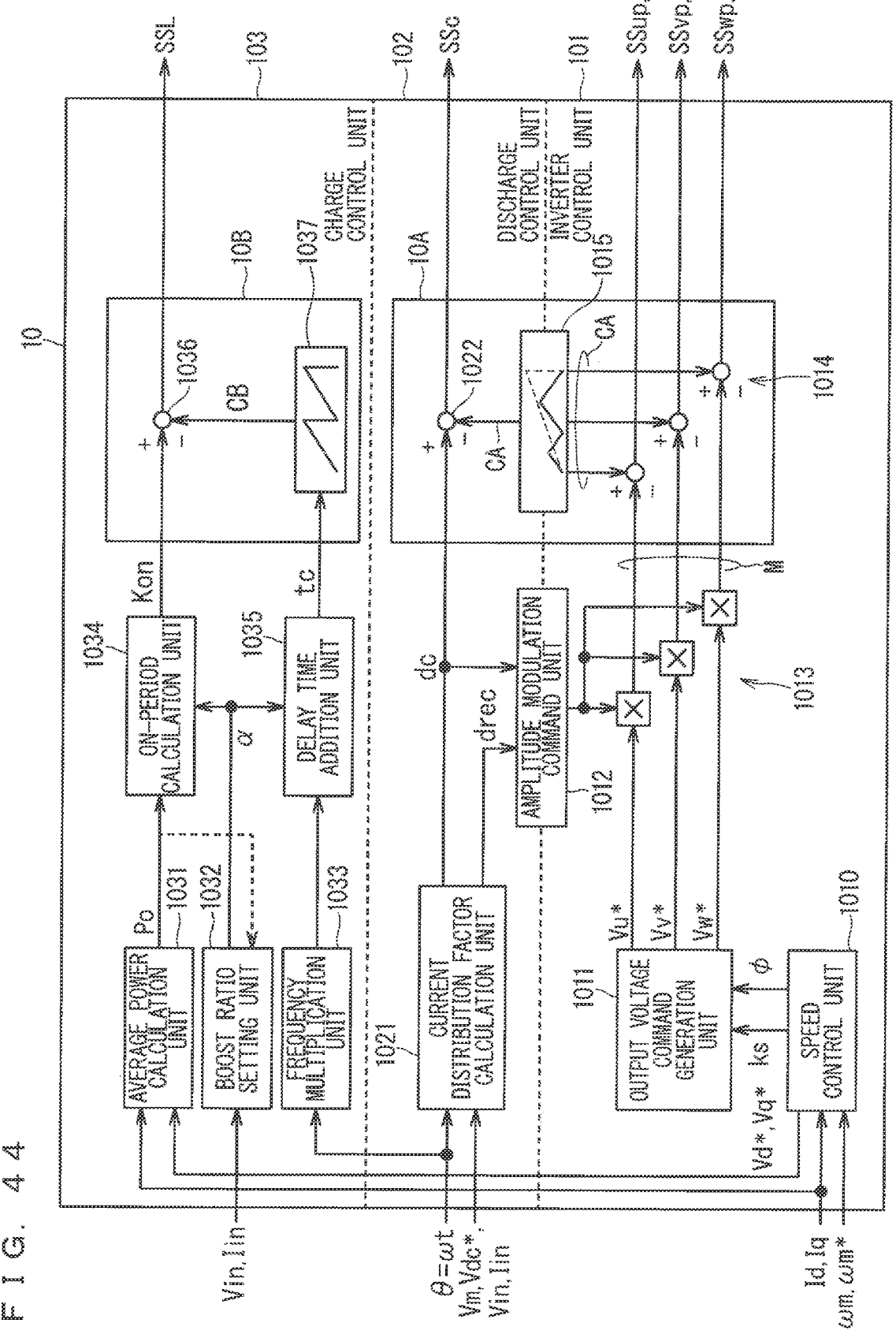
FIG. 44 is a block diagram illustrating a fifth configuration of the control device according to the second embodiment.

FIG. 44 is a block diagram illustrating the configuration of the control device 10 in this case (also referred to as "a fifth configuration of the control device 10"). The fifth configuration of the control device 10 differs from the fourth configuration (FIG. 42) of the control device 10 in that the AC voltage Vin and the current Iin are input to the current distribution factor calculation unit 1021 instead of the power Po.

In FIG. 44, the current distribution factor calculation unit 1021 determines the input power factor from the AC voltage Vin and the current Iin, and determines the discharge duty dc based on the input power factor ξ in accordance with the flowchart illustrated in FIG. 43, for example.

As described above, in the second embodiment, the discharge control unit 102 controls the discharge circuit 4a to cause the capacitor C4 to discharge in the discharge duty dc. The discharge duty dc is larger when the power Pdc input to the inverter 5, the power Po output by the inverter 5, or the power Pi output by the converter 3 is less than the first threshold than when the power Pdc input by the inverter 5, the power Po output by the inverter 5, or the power Pi output by the converter 3 is greater than or equal to the second threshold (the second threshold is greater than or equal to the first threshold). The larger the contribution of the power discharged from the capacitor C4 to the power Pdc, Pi, or Po, the more the input power factor is improved. Thus, even if the power Pdc, Pi, or Po decreases, the input power factor is improved by increasing the discharge duty dc. For example, when the power Pdc, Pi, or Po is less than the first threshold, the discharge duty dc is equal to 1.

In a specific configuration example of the charge control unit 103, the discharge duty dc can be selected in accordance with the modulation index ks of the inverter 5 (the modulation index ks is a ratio of the output voltage amplitude Vo to the DC voltage Vdc). The larger the power Pdc, Po, or Pi is, the larger the output voltage amplitude Vo is. The larger the voltage Vc is, the larger the DC voltage Vdc is. Therefore, the modulation index ks is desirably high when the power Pdc, Po, or Pi is large. Accordingly, the discharge duty dc set when the modulation index ks is less than the third threshold is smaller than the discharge duty dc set when the modulation index ks is greater than or equal to the fourth threshold (which is greater than or equal to the third threshold).

Note that when the power Pdc, Pi, or Po is large, the discharge duty dc is desirably decreased to enhance the buffering function of the power buffer circuit 4 to reduce the ripple in the instantaneous power Pdc (see Equation (7)).

In the filter 2 including the capacitor C2, the input side thereof (the both ends of the series connection of the capacitor C2 and the reactor L2 illustrated in FIG. 1) and the input side of the charge circuit 4b (the both ends of the series connection of the reactor L4 and the switch SL illustrated in FIG. 1) are connected in parallel with each other on the output side of the converter 3 (the high-potential terminal 3A and the low-potential terminal 3B illustrated in FIG. 1). The reverse current blocking circuit 8 is connected between the output side of the filter 2 (the connecting point of the reactor L2 and the capacitor C2 illustrated in FIG. 1) and the DC link 7 (the DC power source line LH illustrated in FIG. 1) and blocks charging of the capacitor C2 from the DC link 7.

The switch SL for accumulating energy in the reactor L4 is in conduction in the on-period. The phase at which conduction of the switch SL starts is set by a delay amount corresponding to the delay time td. It is advantageous that this delay amount is longer than the discharge period of the capacitor C2 or a reciprocal of a resonance frequency of the filter 2, from the viewpoint that the current iL that flows through the reactor L4 is less affected by the capacitor C2.

The converter 3 may include the diode bridges 3a and 3b. The diode bridge 3a includes a pair of input terminals (cathodes of the diodes D32 and D34 illustrated in FIG. 30) to which the AC voltage Vin is applied and a pair of output terminals (the high-potential terminal 3A and the low-potential terminal 3B illustrated in FIG. 30) connected to the DC link 7 and performs single-phase full-wave rectification. The diode bridge 3b includes a pair of input terminals (the cathodes of the diodes D32 and D34 illustrated in FIG. 30) to which the AC voltage Vin is applied and a pair of output terminals (the cathodes of the diodes D35 and D36 and the low-potential terminal 3B illustrated in FIG. 30).

The diode bridge 3b performs single-phase full-wave rectification on the AC voltage and supplies the resulting rectified voltage Vrec2 to the charge circuit 4b from the pair of output terminals of the diode bridge 3b. There are diodes connected with conduction directions thereof reversed through the pair of input terminals between the pair of output terminals of the diode bridge 3a and the pair of output terminals of the diode bridge 3b. Specifically, there are series connection of the diodes D31 and D35 and series connection of the diodes D33 and D36 between the reactors L2 and L4. Thus, the pair of output terminals of the diode bridge 3a and the pair of output terminals of the diode bridge 3b are not electrically connected to each other. This is advantageous from the viewpoint that the current iL that flows the reactor L4 is less affected by the capacitor C2.

It is understood from the result of FIG. 31 (comparison between the line G202 and the line G83) that when the rotational speed is small, the power factor can be improved by decreasing the voltage Vc. From the viewpoint of increasing the voltage utilization factor R, the voltage Vc is desirably large. Thus, it is advantageous that the voltage Vc set when the power Po is less than a fifth threshold is smaller than the voltage Vc set when the power Po is greater than or equal to a sixth threshold (this is greater than or equal to the fifth threshold), from the viewpoint of improving the power factor of the power buffer circuit 4.

In the case of changing the boost ratio $\alpha$ to set the voltage Vc depending on the power Po in this manner, the power Po is input to the boost ratio setting unit 1032 (broken-line arrows in FIG. 42 and FIG. 44). The boost ratio $\alpha$ may be changed based on the input power factor $\xi$. Note that the change of the boost ratio $\alpha$ is not necessarily adopted in the second embodiment.

It is advantageous that, if the input power factor $\xi$ decreases from a value that is greater than or equal to the predetermined threshold $\xi$th to a value that is less than the threshold $\xi$th, the discharge duty dc increases, from the viewpoint of improving the input power factor $\xi$. In the example described above, the discharge duty dc increases from the value d2 that is less than 1 to the value d1 (=1).

[Dependency of Input Power Factor on Conduction Period]

It is understood from Equation (10) and Equation (12) that the higher the power factor of the charge circuit 4b, the higher the input power factor of the direct power converter 100. From this, it is considered that the longer the conduction period which is a period in which the current iL flows, the more the input power factor is improved.

It is considered that both the control of decreasing the boost ratio $\alpha$, which is introduced in the first embodiment, and the control of increasing the discharge duty dc, which is introduced in the second embodiment, increase the conduction period. In other words, both of these controls are considered to be examples of a technique of increasing the conduction period.

Accordingly, it is described that any of these controls increases the conduction period using the case of J=0.075 as an example.

[Relationship Between Increase in Conduction Period Due to Decrease in Boost Ratio $\alpha$ and Improvement in Input Power Factor]

Figure 45:
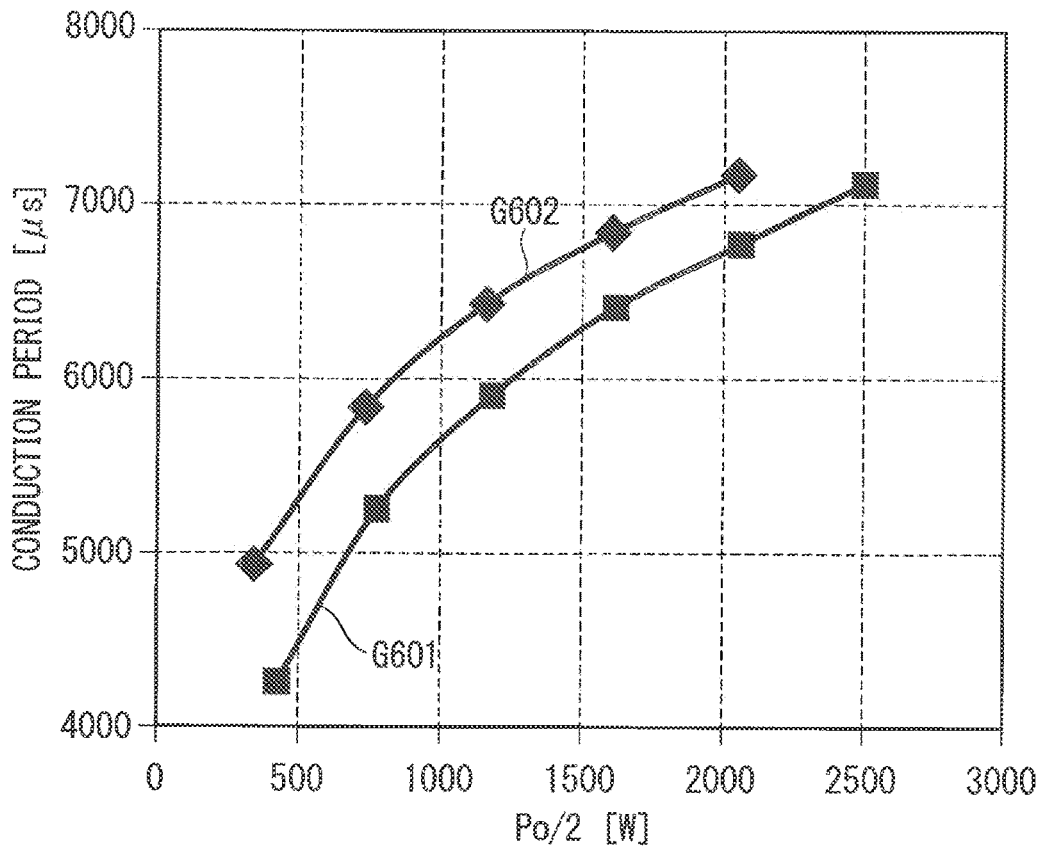
FIG. 45 is a graph illustrating a relationship between power and a conduction period.

FIG. 45 is a graph illustrating a relationship between the instantaneous power PL (=Po/2) and the conduction period. FIG. 45 corresponds to FIG. 18 and FIG. 19. A line G601 in FIG. 45 illustrates the case of $\alpha$=1.14 and corresponds to FIG. 18. A line G602 in FIG. 45 illustrates the case of $\alpha$=1.05 and corresponds to FIG. 19.

As described in the first embodiment, the on-period is longer at a larger boost ratio $\alpha$. However, as understood from FIG. 45, the conduction period is longer when the boost ratio $\alpha$ is smaller. The conduction period increases by setting the boost ratio $\alpha$ smaller. This tendency is not dependent on the instantaneous power PL.

Figure 46:
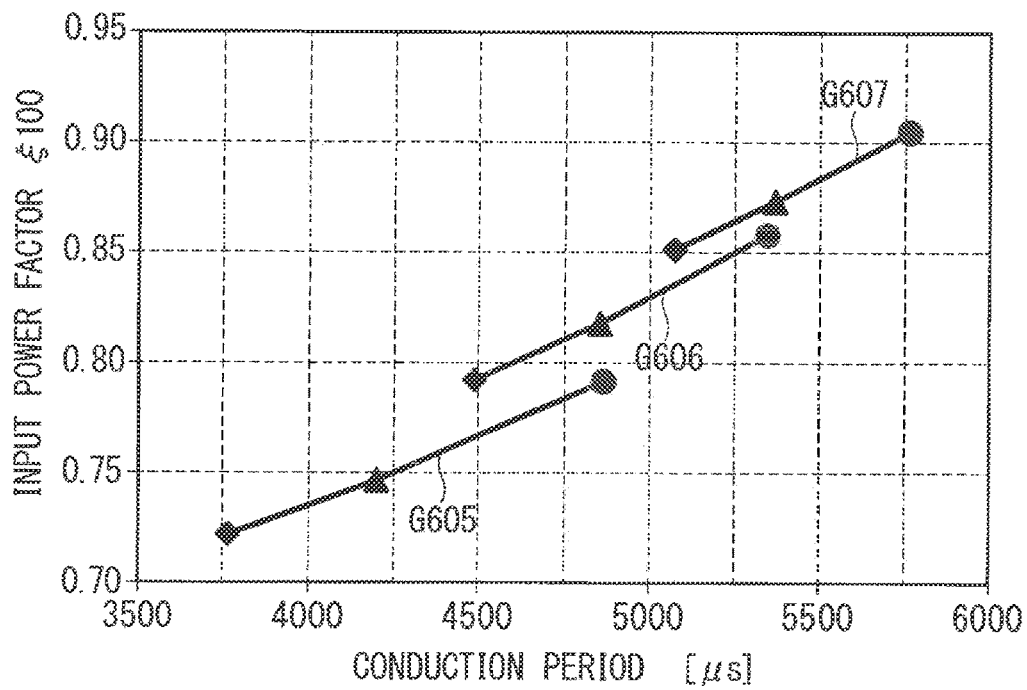
FIG. 46 is a graph illustrating a relationship between an input power factor and a conduction period.

FIG. 46 is a graph illustrating a relationship between the input power factor $\xi$100 and the conduction period. Lines G605, G606, and G607 indicate cases where the power Po is equal to 700 W, 1000 W, and 1400 W, respectively. In each of the lines G605, G606, and G607, black rhombuses (♦) indicate the case of $\alpha$=1.14, black triangles (▲) indicate the case of $\alpha$=1.10, and black dots (●) indicate the case of $\alpha$=1.05. As understood from FIG. 46, the smaller the boost ratio $\alpha$ is, the more both a conduction period and the input power factor $\xi$100 increase. This tendency is not dependent on the power Po.

[Relationship Between Increase in Conduction Period Due to Increase in Discharge Duty Dc and Improvement in Input Power Factor]

FIG. 47 is a graph illustrating a relationship between the input power factor and the conduction period and illustrates the case of the boost ratio $\alpha$=1.14. Lines G608, G609, and G610 indicate the cases where the power Po is equal to 700 W, 1000 W, and 1400 W, respectively. In each of the lines G608, G609, and G610, black dots (●) indicate the case of dc<1 (the case where Equation (5) and Equation (8) are satisfied and PL=Po/2 holds), and black triangles (▲) indicate the case of dc=1 (the case where Equation (13) is satisfied and PL=Po holds). As understood from FIG. 47, both a conduction period and the input power factor $\xi$100 increase due to an increase in the discharge duty dc. This tendency is not dependent on the power Po.

It is understood from the foregoing that the input power factor is improved by increasing the conduction period, and decreasing the boost ratio $\alpha$ and increasing the discharge duty dc can be adopted as examples of a technique of increasing the conduction period.

Such a conduction period can be grasped as a period in which the current iL continuously flows in a period shorter than a half-period of the AC voltage Vin. Thus, a technique of improving the input power factor of the direct power converter 100 by increasing the conduction period can be described as a generic concept of the first embodiment and the second embodiment as follows: a period for which the current iL continuously flows in a period shorter than a half-period of the AC voltage Vin is longer when the power Pdc, the power Po, or the power Pi is less than the first threshold than when the power Pdc, the power Po, or the power Pi is greater than or equal to the second threshold.

The control device 10 includes, for example, a microcomputer and a storage device. The microcomputer performs each processing step (in other words, each procedure) written in a program to implement functions of various blocks constituting the control device 10 illustrated in FIG. 22 and various processing of the flowchart illustrated in FIG. 17.

Alternatively, the microcomputer performs each processing step (in other words, each procedure) written in a program to implement functions of various blocks constituting the second configuration of the control device 10 illustrated in FIG. 24 and various processing of the flowchart illustrated in FIG. 13.

Alternatively, the microcomputer performs each processing step (in other words, each procedure) written in a program to implement functions of various blocks constituting the third configuration of the control device 10 illustrated in FIG. 25 and various processing of the flowchart illustrated in FIG. 15.

Alternatively, the microcomputer performs each processing step (in other words, each procedure) written in a program to implement functions of various blocks constituting the fourth configuration of the control device 10 illustrated in FIG. 42 and various processing of the flowchart illustrated in FIG. 40 or FIG. 41.

Alternatively, the microcomputer performs each processing step (in other words, each procedure) written in a program to implement functions of various blocks constituting the fifth configuration of the control device 10 illustrated in FIG. 44.

The control device 10 does not necessarily include a microcomputer and a storage device. Various procedures performed by the control device 10 or some or all of various means or various functions implemented by the control device 10 may be implemented by hardware.

In the description above, the speed detector 9 and the control device 10 are separately described for the sake of convenience. The speed detector 9 can be implemented, along with the control device 10, by the microcomputer described above. The rotation angular velocity ωm can be determined using, for example, information on a phase voltage at the output terminals Pu, Pv, and Pw and a constant of the inductive load 6. The information on the phase voltage can be determined from the voltage Vc, the amplitude Vm, and the angular velocity ω that are input to the control device 10 in the description above and the control signals SSup, SSvp, SSwp, SSun, SSvn, and SSwn obtained by the control device 10 in the description above. From this viewpoint, the calculation of the speed detector 9 and the calculation of the control device 10 are preferably performed together by the microcomputer.

While the embodiments have been described above, it should be understood that various modifications can be made on the configurations and details without departing from the gist and the scope of the claims. The various embodiments and modifications described above can be combined with each other.

REFERENCE SIGNS LIST

2 filter
3 converter
3a, 3b diode bridge
4 power buffer circuit
4a discharge circuit
4b charge circuit
5 inverter
7 DC link
8 reverse current blocking circuit
10 control device
10B pulse generation unit
100 direct power converter
101 inverter control unit
102 discharge control unit
103 charge control unit
1032 boost ratio setting unit
1034 on-period calculation unit
1035 delay time addition unit
C2, C4 capacitor
L4 reactor
Pdc, Pi, Po power
Pbuf, Pin, Prec1 instantaneous power ph1 first threshold
ph2 second threshold
Sc, SL switch
SSc, SSup, SSvp, SSwp, SSun, SSvn, SSwn control signal
Vc voltage
Vin AC voltage
Vrec, Vrec2 rectified voltage
d1, d2, α1, α2 value
dc discharge duty
iL current
ks modulation index
Pth, pfh, ξth threshold
α boost ratio
ξ, ξ100 input power factor

The invention claimed is:

1. A direct power converter comprising:
a DC link;
a converter that rectifies a single-phase AC voltage, converts an AC power into a DC power, and outputs a first instantaneous power;
a power buffer circuit that receives and supplies power between the converter and the DC link and performs buffering of a second instantaneous power; and
an inverter that converts a DC voltage at the DC link into a second AC voltage and outputs the second AC voltage,
wherein a part of a power flowing from the converter and a power flowing from the power buffer circuit are respectively input to the DC link,
wherein a period for which a current that flows from the converter to the power buffer circuit continuously flows in a period shorter than a half-period of the AC voltage, the period is longer when a third power input to the inverter, a fourth power output by the inverter, or an average value of the first instantaneous power decreases to a value which is less than a first threshold, from a value which is greater than or equal to a second threshold that is greater than or equal to the first threshold, and
wherein the third power input to the inverter is a combination of the first instantaneous power and the second instantaneous power.

2. A control device that controls the direct power converter comprising:
a DC link;
a converter that rectifies a single-phase AC voltage, converts an AC power into a DC power, and outputs a first instantaneous power;
a power buffer circuit that receives and supplies power between the converter and the DC link and performs buffering of a second instantaneous power; and
an inverter that converts a DC voltage at the DC link into a second AC voltage and outputs the second AC voltage,
the power buffer circuit including
a capacitor,
a charge circuit that charges the capacitor, and
a discharge circuit including a first switch that connects the capacitor to the DC link,
a part of a power flowing from the converter and a power flowing from the power buffer circuit being respectively input to the DC link,
a part of the first instantaneous power output by the converter being input to the charge circuit,
the control device comprising:
a discharge control unit; and
a charge control unit, wherein the discharge control unit outputs a first control signal for controlling conduction of the first switch,
wherein the charge control unit controls the charge circuit to charge the capacitor to a voltage whose ratio to an amplitude of a rectified voltage output by the converter is equal to a boost ratio, and
wherein a first ratio is smaller than a second ratio,
wherein the boost ratio is set to the first ratio when a third power input to the inverter, a fourth power output by the inverter, or an average value of the first instantaneous power is less than a first threshold,
wherein the boost ratio is set to the second ratio when the third power, the fourth power, or the average value is greater than or equal to a second threshold that is greater than or equal to the first threshold.

3. A control device that controls the direct power converter comprising:
a DC link;
a converter that rectifies a single-phase AC voltage, converts an AC power into a DC power, and outputs a first instantaneous power;
a power buffer circuit that receives and supplies power between the converter and the DC link and performs buffering of a second instantaneous power; and
an inverter that converts a DC voltage at the DC link into a second AC voltage and outputs the second AC voltage,
the power buffer circuit including
a capacitor,
a charge circuit that charges the capacitor, and
a discharge circuit including a first switch that connects the capacitor to the DC link,
a part of a power flowing from the converter and a power flowing from the power buffer circuit being respectively input to the DC link,
a part of the first instantaneous power output by the converter being input to the charge circuit,
the control device comprising:
a discharge control unit; and
a charge control unit,
wherein the discharge control unit outputs a first control signal for controlling conduction of the first switch,
wherein the charge control unit controls the charge circuit to charge the capacitor to a voltage whose ratio to an amplitude of a rectified voltage output by the converter is equal to a boost ratio,
wherein the charge circuit includes
a reactor that accumulates energy in the capacitor, and
a second switch that connects the converter to the reactor and causes the reactor to accumulate energy,
wherein a current that flows from the converter to the power buffer circuit flows through the reactor,
wherein the charge control unit includes
a boost ratio setting unit that selectively outputs two values as the boost ratio in accordance with a modulation index of the inverter,
an on-period calculation unit that sets an on-period which is a period for which the second switch is in conduction from the boost ratio and from an average value of the first instantaneous power, a third power input to the inverter, or a fourth power output by the inverter, and
a pulse generation unit that outputs a second control signal for controlling conduction of the second switch in the on-period, and
wherein a first ratio is smaller than a second ratio,
wherein the boost ratio is set to the first ratio when the modulation index is less than a third threshold,
wherein the boost ratio is set to the second ratio when the modulation index is greater than or equal to a fourth threshold that is greater than or equal to the third threshold.

4. A control device that controls the direct power converter comprising:
a DC link;
a converter that rectifies a single-phase AC voltage, converts an AC power into a DC power, and outputs a first instantaneous power;
a power buffer circuit that receives and supplies power between the converter and the DC link and performs buffering of a second instantaneous power; and
an inverter that converts a DC voltage at the DC link into a second AC voltage and outputs the second AC voltage,
the power buffer circuit including
a capacitor,
a charge circuit that charges the capacitor, and
a discharge circuit including a first switch that connects the capacitor to the DC link,
a part of a power flowing from the converter and a power flowing from the power buffer circuit being respectively input to the DC link,
a part of the first instantaneous power output by the converter being input to the charge circuit,
the control device comprising:
a discharge control unit; and
a charge control unit,
wherein the discharge control unit outputs a first control signal for controlling conduction of the first switch,
wherein the charge control unit controls the charge circuit to charge the capacitor to a voltage whose ratio to an amplitude of a rectified voltage output by the converter is equal to a boost ratio, and
wherein the boost ratio decreases in response to a decrease in an input power factor of the direct power converter from a value that is greater than or equal to a predetermined threshold to a value that is less than the predetermined threshold.

5. A control device that controls the direct power converter comprising:
a DC link;
a converter that rectifies a single-phase AC voltage, converts an AC power into a DC power, and outputs a first instantaneous power;
a power buffer circuit that receives and supplies power between the converter and the DC link and performs buffering of a second instantaneous power; and
an inverter that converts a DC voltage at the DC link into a second AC voltage and outputs the second AC voltage,
the power buffer circuit including
a first capacitor,
a charge circuit that charges the first capacitor to a predetermined voltage, and
a discharge circuit including a first switch that connects the first capacitor to the DC link,
a part of a power flowing from the converter and a power flowing from the power buffer circuit being respectively input to the DC link,
a part of the first instantaneous power output by the converter being input to the charge circuit,
wherein the direct power converter further comprises
a filter including a second capacitor, and
a reverse current blocking circuit that is connected between an output side of the filter and the DC link and that blocks a current that flows back from the discharge circuit to the filter, wherein an input side of the filter and an input side of the charge circuit are connected in parallel with each other on an output side of the converter, wherein the char e circuit includes a reactor that accumulates energy in the first capacitor, and a second switch that connects the converter to the reactor and causes the reactor to accumulate energy, wherein the current that flows from the converter to the power buffer circuit flows through the reactor, the control device comprising:

a discharge control unit that outputs a first control signal for bringing the first switch into conduction at a first duty, wherein a first value is greater than a second value, wherein the first duty is set to the first value when a third power input to the inverter, a fourth power output by the inverter, or an average value of the first instantaneous power is less than a first threshold, wherein the first duty is set to the second value when the third power, the fourth power, or the average value is greater than or equal to a second threshold that is greater than or equal to the first threshold.

6. A control device that controls the direct power converter comprising:

a DC link;

a converter that rectifies a single-phase AC voltage, converts an AC power into a DC power, and outputs a first instantaneous power;

a power buffer circuit that receives and supplies power between the converter and the DC link and performs buffering of a second instantaneous power; and an inverter that converts a DC voltage at the DC link into a second AC voltage and outputs the second AC, voltage, the power buffer circuit including a first capacitor, a charge circuit that charges the first capacitor to a predetermined voltage, and a discharge circuit including a first switch that connects the first capacitor to the DC link, a part of the power flowing from the converter and the power flowing from the power buffer circuit being respectively input to the DC link, a part of the first instantaneous power output by the converter being input to the charge circuit, the control device comprising:

a discharge control unit that outputs a first control signal for bringing the first switch into conduction at a first duty, wherein the first duty increases in response to a decrease in an input power factor of the direct power converter from a value that is greater than or equal to a predetermined threshold to a value that is less than the predetermined threshold.

7. The control device according to claim 6, wherein the direct power converter further comprises a filter including a second capacitor, and a reverse current blocking circuit that is connected between an output side of the filter and the DC link and that blocks a current that flows back from the discharge circuit to the filter, wherein an input side of the filter and an input side of the charge circuit are connected in parallel with each other on an output side of the converter, wherein the charge circuit includes a reactor that accumulates energy in the first capacitor, and a second switch that connects the converter to the reactor and causes the reactor to accumulate energy, and wherein the current that flows from the converter to the power buffer circuit flows through the reactor.

8. The control device according to claim 5, further comprising:

a charge control unit, wherein the charge control unit includes an on-period calculation unit that sets an on-period which is a period for which the second switch is in conduction, a delay time addition unit that delays, by a delay amount, a phase at which conduction of the second switch starts relative to a phase at which a rectified voltage output by the converter turns from decrease to increase, and a pulse generation unit that outputs a second control signal for bringing the second switch into conduction in the on-period with delaying by the delay amount, and wherein the delay amount is greater than a discharge period of the second capacitor or a reciprocal of a resonance frequency of the filter.

9. The control device according to claim 7, further comprising:

a charge control unit, wherein the charge control unit includes an on-period calculation unit that sets an on-period which is a period for which the second switch is in conduction, a delay time addition unit that delays, by a delay amount, a phase at which conduction of the second switch starts relative to a phase at which a rectified voltage output by the converter turns from decrease to increase, and a pulse generation unit that outputs a second control signal for bringing the second switch into conduction in the on-period with delaying by the delay amount, and wherein the delay amount is greater than a discharge period of the second capacitor or a reciprocal of a resonance frequency of the filter.

10. The control device according to claim 5, wherein the converter includes a first diode bridge that includes a pair of input terminals to which the AC voltage is applied and a first pair of output terminals connected to the filter and that performs single-phase full-wave rectification, and a second diode bridge that includes the pair of input terminals and a second pair of output terminals that supplies the charge circuit with a rectified voltage obtained through single-phase full-wave rectification of the AC voltage, and wherein a first terminal of the first pair of output terminals and a first terminal of the second pair of output terminals are not electrically connected to each other.

11. The control device according to claim 7, wherein the converter includes a first diode bridge that includes a pair of input terminals to which the AC voltage is applied and a first pair of output terminals connected to the filter and that performs single-phase full-wave rectification, and a second diode bridge that includes the pair of input terminals and a second pair of output terminals that supplies the charge circuit with a rectified voltage obtained through single-phase full-wave rectification of the AC voltage, and wherein a first terminal of the first pair of output terminals and a first terminal of the second pair of output terminals are not electrically connected to each other.

12. The control device according to claim 6, wherein a first voltage is smaller than a second voltage, wherein the predetermined voltage is set to the first voltage when a third power input to the inverter, a fourth power output by the inverter, or an average value of the first instantaneous power is less than a fifth threshold, wherein the predetermined voltage is set to the second voltage when the third power, the fourth power, or the average value of the first instantaneous power is greater than or equal to a sixth threshold that is greater than or equal to the fifth threshold.

* * * * *